(12) United States Patent
Yamakawa et al.

(10) Patent No.: US 7,016,144 B2
(45) Date of Patent: Mar. 21, 2006

(54) ROBOT HAND FOR TRANSFERRING AN ARTICLE IN A HOUSING, AND A LIBRARY APPARATUS EQUIPPED WITH THE ROBOT HAND FOR TRANSFERRING AND ARTICLE STORED IN A RACK

(75) Inventors: Kengo Yamakawa, Kawasaki (JP); Kenji Aoki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 276 days.

(21) Appl. No.: 10/375,849

(22) Filed: Feb. 26, 2003

(65) Prior Publication Data
US 2004/0012878 A1    Jan. 22, 2004

(30) Foreign Application Priority Data
Jul. 16, 2002    (JP) .............................. 2002-207260

(51) Int. Cl.
*G11B 15/68* (2006.01)
*G11B 17/08* (2006.01)

(52) U.S. Cl. ...................................... 360/92; 360/98.04
(58) Field of Classification Search .................. 360/92, 360/98.04, 91, 93, 90, 88; 369/30.06, 30.43, 369/30.45, 30.55, 30.57; 414/935, 940, 941
See application file for complete search history.

(56) References Cited

U.S. PATENT DOCUMENTS 5,781,517 A * 7/1998 Nakajima ................. 369/30.43

FOREIGN PATENT DOCUMENTS

| JP | 63-083949 | 4/1988 |
|---|---|---|
| JP | 5-342721 | 12/1993 |
| JP | 6-236610 | 8/1994 |
| JP | 6-325450 | 11/1994 |
| JP | 7-235114 | 9/1995 |
| JP | 8-127402 | 5/1996 |
| JP | 10-040631 | 2/1998 |
| JP | 10-261254 | 9/1998 |
| JP | 10-312620 | 11/1998 |
| JP | 11-328816 | 11/1999 |

* cited by examiner

Primary Examiner—Julie Anne Watko
(74) Attorney, Agent, or Firm—Greer, Burns & Crain, Ltd

(57) ABSTRACT

A robot hand that does not depend on cartridge types wherein high reliability can be ensured and the size and cost can be reduced with a simple construction. In a library apparatus including a recording and reproducing device for cartridge type media and cartridge accommodating racks, a robot hand is configured to include a hand mechanism including hooks for holding the cartridge and actuators for performing to and fro movement and opening and closing movement of the hooks, and a mounter for pushing the cartridge when the cartridge is inserted into the recording and reproducing device by the hand mechanism, wherein the to and fro movement and the opening and closing movement of the robot hand and the pushing movement of the mounter is performed by one motor. The cartridge is grasped/released efficiently by the movement of the hooks, the actuators and the mounter.

10 Claims, 37 Drawing Sheets

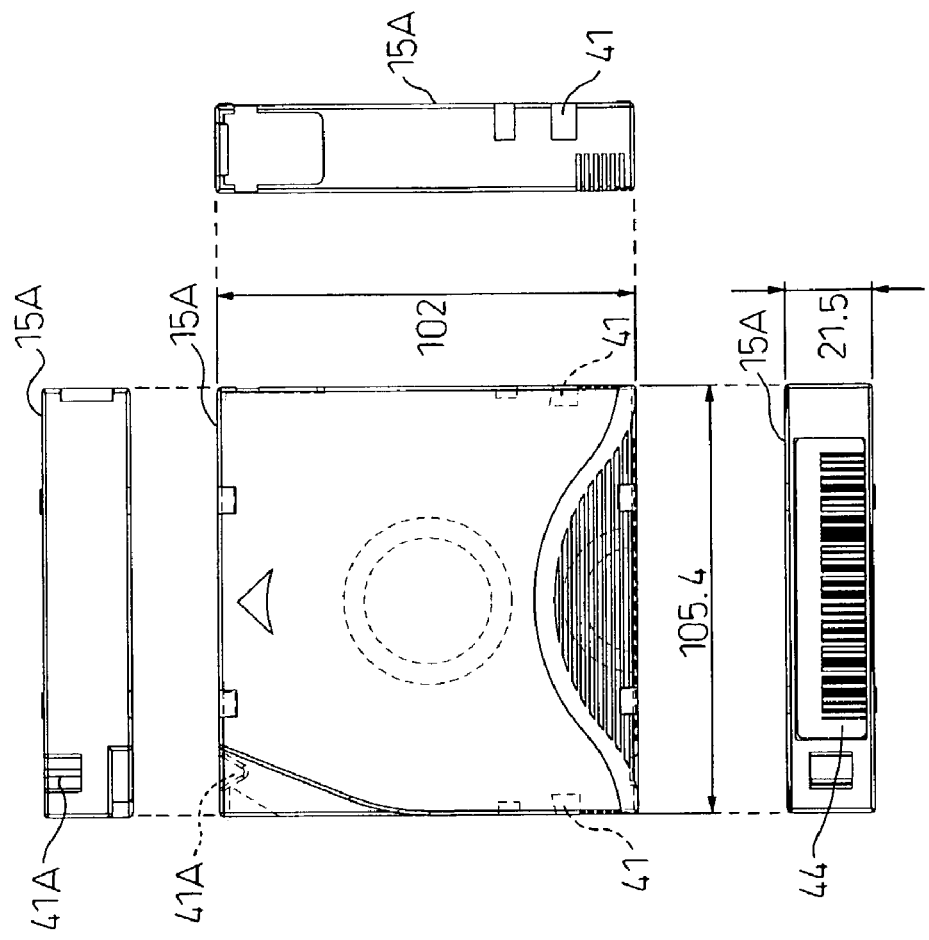
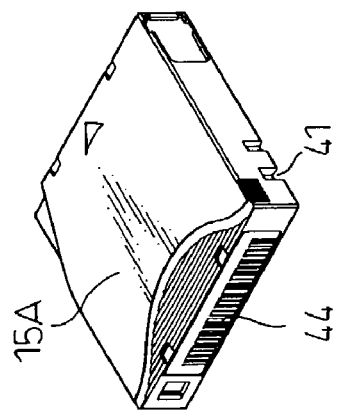

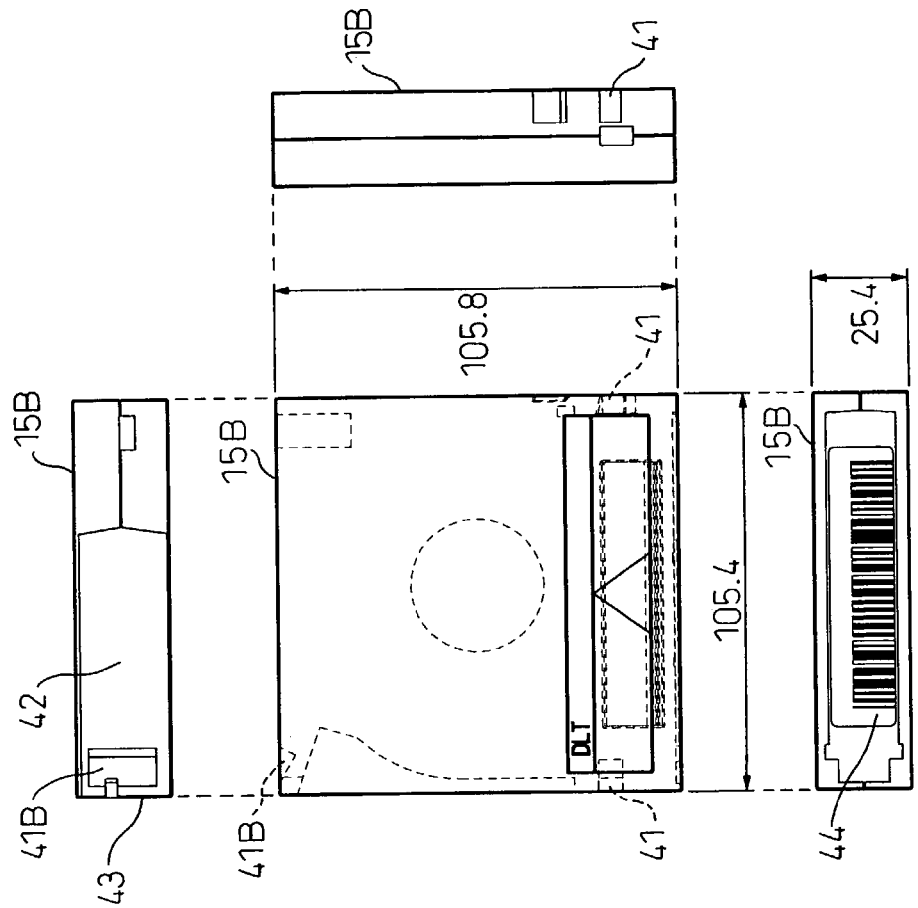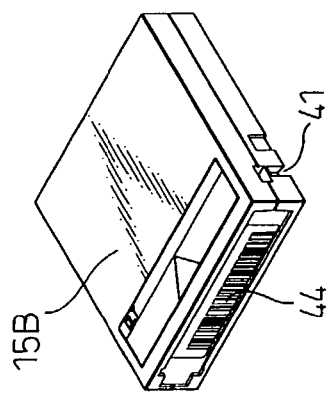

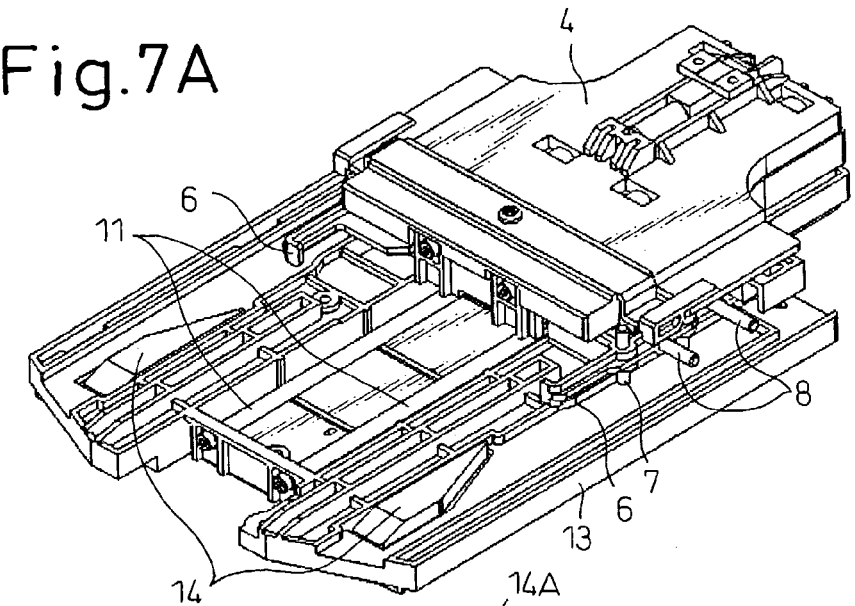
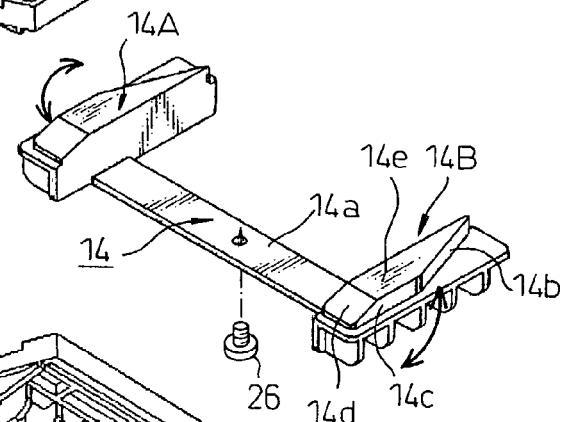
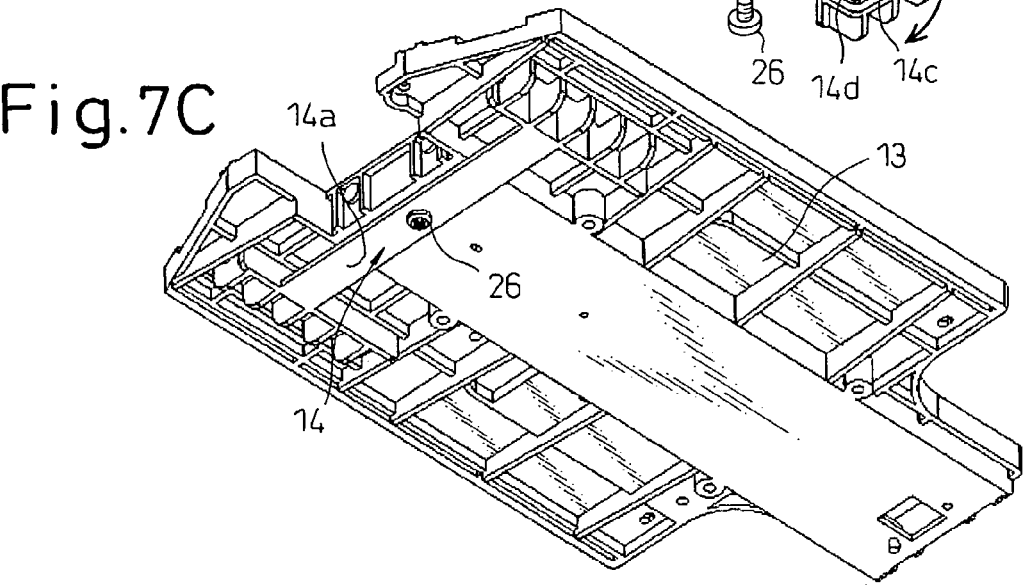

Fig.20A
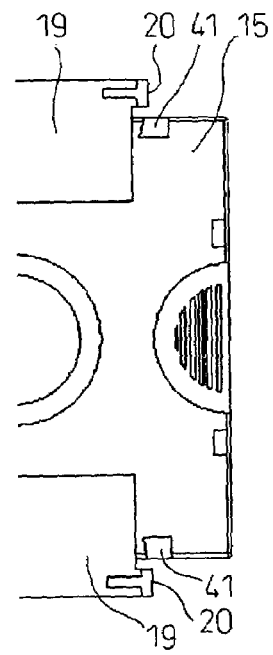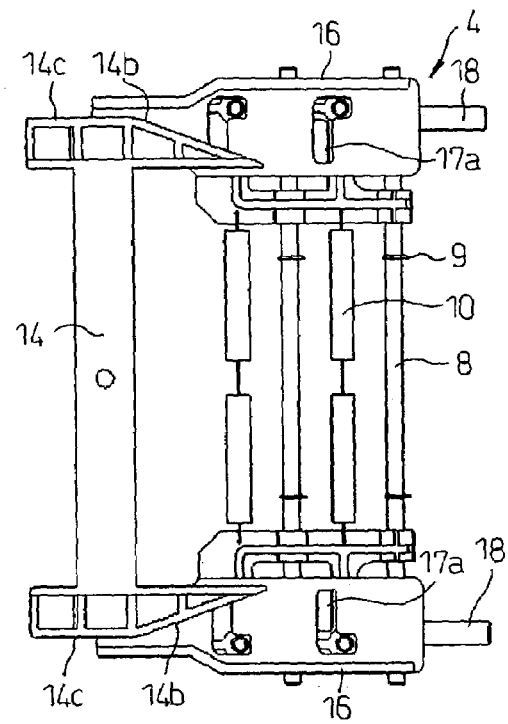
Fig.20B
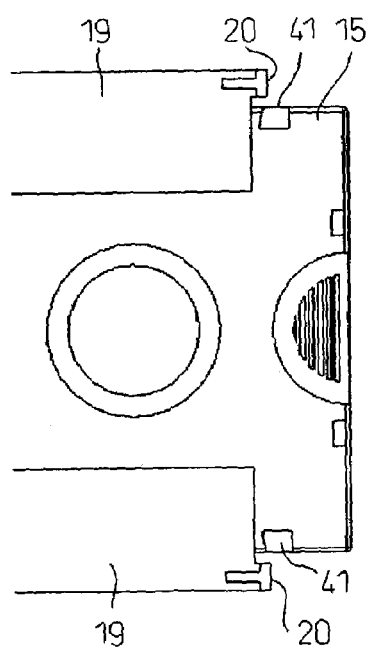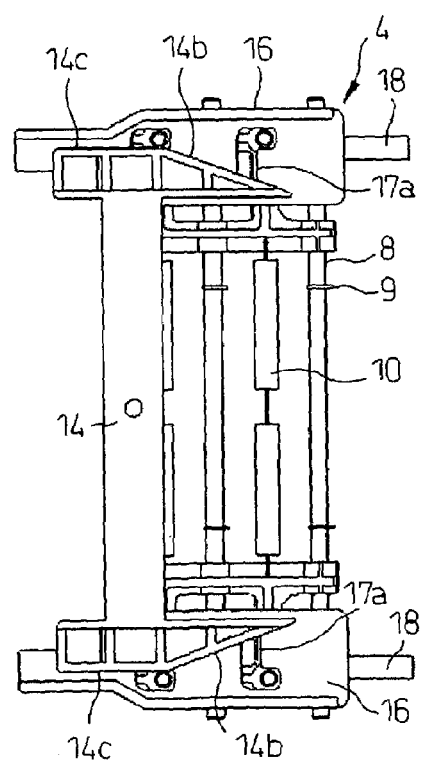

ROBOT HAND FOR TRANSFERRING AN ARTICLE IN A HOUSING, AND A LIBRARY APPARATUS EQUIPPED WITH THE ROBOT HAND FOR TRANSFERRING AND ARTICLE STORED IN A RACK

CROSS-REFERENCE TO RELATED APPLICATION

This application claims priority from, and incorporates by reference the entire disclosure of, Japanese Patent Application No. 2002-207260, filed on Jul. 16, 2002.

BACKGROUND OF THE INVENTION

1. Field of the Invention

The present invention relates to a robot hand and a library apparatus and, in particular, it relates to a robot hand provided in a library apparatus wherein the library apparatus is connected to a computer and the like via a network. The library apparatus in the present invention can hold a plurality of cartridges, that have a magnetic tape and the like therein, inside the apparatus, and can record and reproduce information on the cartridge. The robot hand in the present invention can move the cartridge in the apparatus.

2. Description of the Related Art

Conventionally, as the amount of information increases in a computer system, there is provided an information storage device for storing a large amount of information such as a library apparatus (including a cartridge automatic loading device) using cartridge type recording media (hereinafter simply referred to as the "cartridges") having magnetic tapes (or magneto-optical disks, digital video disks and the like) therein. Such an apparatus includes a recording and reproducing device for recording or reproducing data on the cartridge type recording media, a plurality of racks in which the media are accommodated, and a robot hand for transferring the recording media or the cartridges.

The robot hand can be movable in all three dimensional directions for automatically performing insertion/withdrawal of the cartridge into/from the recording and reproducing device and the racks and transferring the cartridge. Further, when the cartridge is transferred, the robot hand takes out the cartridge from the recording and reproducing device or the racks and stores it in the robot itself temporarily, then transfers it, and then puts the cartridge in the target recording and reproducing device or the racks. A handling mechanism by which the robot hand handles the cartridge is called a picker. The picker handles the cartridge by engaging hooks with grooves and the like provided on the cartridge to grasp the cartridge, or by grasping the cartridge directly.

Further, the robot hand of the library apparatus using the magnetic tape cartridge typically has respective dedicated mechanisms and driving sources for to and fro movement of the picker and for opening and closing movement of the hooks for grasping the cartridge in an independent manner. Still further, when the cartridge is inserted into the recording and reproducing device or the cartridge accommodating racks, a mechanism for such a purpose, called a mounter, may be provided, wherein a dedicated driving source for operating the mounter is also typically provided.

In this connection, there is also a robot hand that is configured so that the to and fro movement of the picker and the opening and closing movement of the hooks can be operated by one driving source.

On the other hand, the cartridges used for such library apparatus are divided broadly into three types of the magnetic tape cartridges: ½ inch cartridges that are used in information storage devices and the like in a mainframe market, and LTO cartridges and DLT/S-DLT cartridges that are used in information storage devices and the like in an open market. The different types of the cartridges have different sizes of cartridges. Even in a recording and reproducing devices using cartridges of the same type, the protruding lengths of the cartridges that protrude from the recording and reproducing devices differ depending upon the type of the recording and reproducing devices. Therefore, the library apparatus that can accommodate all three types of cartridges will result in a higher cost.

Also, in the case of magnetic tape library apparatus that can handle a plural types of the cartridges, the plural types of the cartridges can be stored in identical racks by designing the cartridge storing racks so that the size of the cartridge storing racks corresponds to the size of the largest one in the plural types of the cartridges. Further, there is also another type of magnetic tape library apparatus for handling the plural types of the cartridges that accommodates the plural types of the cartridges by preparing cells dedicated for each of the types of the cartridges.

However, in an apparatus having a plurality of driving sources including a driving source dedicated for to and fro movement of the picker, a driving source dedicated for opening and closing movement of the hooks, and a driving source dedicated for movement of the mounter, the increased number of the driving sources will result in a more complicated control circuit and a higher cost. Further, when the number of the driving sources is increased, in order to ensure mounting space for the driving sources, there is a problem in that mounting space for other mechanisms may be constricted, the construction of the robot may be complicated and the number of parts may be increased, which will also result in a higher cost.

On the other hand, though the to and fro movement of the picker and the opening and closing movement of the hooks may be operated by one driving source in some mechanisms, the timing to close the hooks is always constant in such mechanism. As a consequence, when the distance between the robot hand and the recording and reproducing device or the cartridge accommodating rack differs in every apparatus due to cumulative dispersion of dimensional tolerances of the parts in the apparatus or other mechanisms and the like, a phenomenon in which the hooks cannot be closed at the optimal closing position with respect to the cartridges may occur. More specifically, when the specified distance between the robot hand and the recording and reproducing device or the cartridge accommodating rack is too long, the hooks are closed before reaching the optimal position inconveniently and therefore the hooks cannot grasp the cartridge. In contrast, when the distance between the robot hand and the recording and reproducing device or the cartridge accommodating rack is too short, the hooks are not closed though it has reached the position where the hooks should be closed, and therefore a malfunction in that the hooks cannot grasp the cartridge will also occur.

On the other hand, when an option to specify the type of the cartridge as well as the recording and reproducing device to be used is selected, fluctuating or uncertain factors in operating the library apparatus including the cartridge automatic loading device can be reduced and the robot mechanism in the library apparatus can be simplified, which will result in stable operation of the apparatus.

However, in the open market, that is expanding rapidly in recent years, the library apparatus and the cartridge automatic loading devices that specify the type of the usable cartridge and the recording and reproducing device may fail to meet the needs of users or may even lose business opportunities. For example, a demand to equip one library apparatus or cartridge automatic loading device with recording and reproducing devices of plural types and manufactures though only one type of cartridge is sufficient, or a demand to equip one library apparatus or cartridge automatic loading device with one recording and reproducing device for LTO and the other recording and reproducing device for S-DLT simultaneously can never be satisfied. Further, all the more in a situation where it can never be foreseen which one of the LTO and DLT/S-DLT cartridges will expand and which one will experience a decline in the open market, it is not desirable to specify the type of the usable cartridge and the recording and reproducing device.

Further, when media of different sizes are stored in identical accommodating racks, since the LTO cartridge and the DLT/S-DLT cartridge have different depth dimensions, the focal distance when the robot hand reads a bar code attached to the cartridge may vary, and consequently, bar codes on some cartridges may not be read accurately. In order to solve this problem, a bar code reader unit must be movable, which may result in a higher cost of the apparatus. Further, in the insertion/withdrawal of the cartridge, a mechanism for accommodating differences of distances to the cartridge must be added. Moreover, at the time of initialization, it is necessary to know which type of cartridge is stored in which racks in advance, and still further, sensors and other elements for recognizing the type of the cartridge stored in the rack will also be necessary. Such addition/modification will increase the size of the apparatus itself and thus result in a higher cost.

SUMMARY OF THE INVENTION

It is an object of the present invention to solve the problems in the robot hand in said conventional library apparatus and provide a robot hand and a library apparatus that are inexpensive and reliable.

In order to achieve the above object, characteristics of the present invention are shown as a first to fourth embodiments in the following.

According to a first embodiment, there is provided a robot hand for transferring an article from a rack accommodating the article to be transferred to other position, comprising: a housing consisting of a base, a side wall, and a ceiling plate; a hand mechanism configured to be slidable in to and fro directions in internal space of the housing; a pair of hooks provided on the hand mechanism that is able to perform opening and closing movement in a direction perpendicular to the movement of the hand mechanism and grasp the article in a closed state; a pair of left and right guides provided on the base for allowing the opening and closing movement of the hooks when the hand mechanism is moved; and only one driving source for allowing the to and fro movement of the hand mechanism and the opening and closing movement of the hooks.

According to a second embodiment, there is provided a library apparatus comprising: a recording and reproducing device for recording and reproducing data on cartridges containing recording media therein; and a plurality of racks that can accommodate the cartridges, wherein the library apparatus has the robot hand according to the first embodiment of the present invention.

According to a third embodiment, there is provided a library apparatus for handling plural types of cartridges comprising: a recording and reproducing device for recording and reproducing data on the cartridges containing recording media therein; and a plurality of racks that can accommodate the cartridges, wherein the plurality of racks are configured so that, when the plural types of cartridges are accommodated in the respective racks, protruding lengths of the plural types of cartridges from the racks are identical irrespective of the types of cartridges.

According to a fourth embodiment, the library apparatus according to the third embodiment of the present invention further has a robot hand for transferring a cartridge accommodated in the rack to other position, the robot hand comprising: a housing consisting of a base, a side wall, and a ceiling plate; a hand mechanism configured to be slidable in to and fro directions in internal space of the housing; a pair of hooks provided on the hand mechanism that is able to perform opening and closing movement in a direction perpendicular to the movement of the hand mechanism and grasp the cartridge in a closed state; a pair of left and right guides provided on the base for allowing the opening and closing movement of the hooks when the hand mechanism is moved; and only one driving source for allowing the to and fro movement of the hand mechanism and the opening and closing movement of the hooks.

According to the present invention, there is provided a robot hand and a library apparatus comprising the robot hand that can perform to and fro movement of a hand mechanism, opening and closing movement of hooks and movement of a mounter by means of one driving source, can always perform the closing movement of the hooks at an optimal position even when a distance between the hand mechanism and a recording and reproducing device or a distance between the hand mechanism and cartridge accommodating racks differs in every apparatus due to cumulative dispersion of dimensional tolerances of the parts in the apparatus or other mechanisms and the like, and can accommodate recording and reproducing devices that handle three types of magnetic tape cartridges for information storage devices differently or use different cartridges, or recording and reproducing devices of various manufacturers.

Also, there is achieved a robot hand and a library apparatus comprising the robot hand that is reliable, occupies small mounting space and has simple construction, is suitable for downsizing and cost reduction, and can be used with any cartridge and can be incorporated into any type of recording and reproducing device of any manufacturer.

Further, in a library apparatus that can use both DLT media and LTO media, control for positioning a robot hand can be simplified and, due to such simplification of the control, the operational speed can be increased as the positional relationship between the DLT media, LTO media and the robot hand can be configured so that the distance between the DLT media and the robot hand and the distance between the LTO media and the robot hand are identical by aligning protruding lengths of the DLT media and the LTO media from racks. Still further, as the reading distance of an optical non-contact bar code reader attached to the robot hand can be made constant, reliable reading can be ensured.

BRIEF DESCRIPTION OF THE DRAWINGS

The present invention will be more clearly understood from the description as set forth below with reference to the accompanying drawings, wherein:

FIG. 3A is a perspective view taken from the rear side of an LTO Medium;

FIG. 3B shows a front view of the LTO medium, a plan view of the LTO medium, a rear view of the LTO medium, and a side view of the LTO medium;

FIG. 4A is a perspective view taken from the rear side of a DLT medium;

FIG. 4B shows a front view of the DLT medium, a plan view of the DLT medium, a rear view of the DLT medium, and a side view of the DLT medium;

FIG. 7A is a perspective view showing the base shown in FIG. 6A from which side plates and actuators are removed;

FIG. 7B is a perspective view showing a guide shown in FIG. 7A in more detail;

FIG. 7C is a perspective view taken from the bottom side of the base shown in FIG. 7A;

FIG. 20A is a bottom view showing the same state as in FIG. 11A in which the hooks are not in contact with the guide by the effect of the actuators;

FIG. 20B is a bottom view showing the same state as in FIG. 11B in which the pins of the hooks reach the straight portions of the guide;

DESCRIPTION OF THE PREFERRED EMBODIMENTS

Figure 1A:
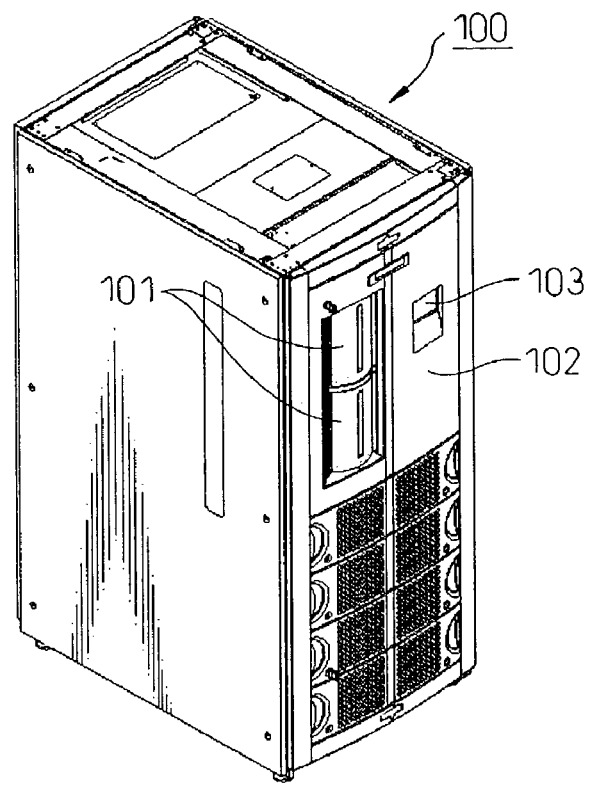
FIG. 1A is a perspective view taken from the front side of a magnetic tape library apparatus to which the present invention is applied.
Figure 1B:
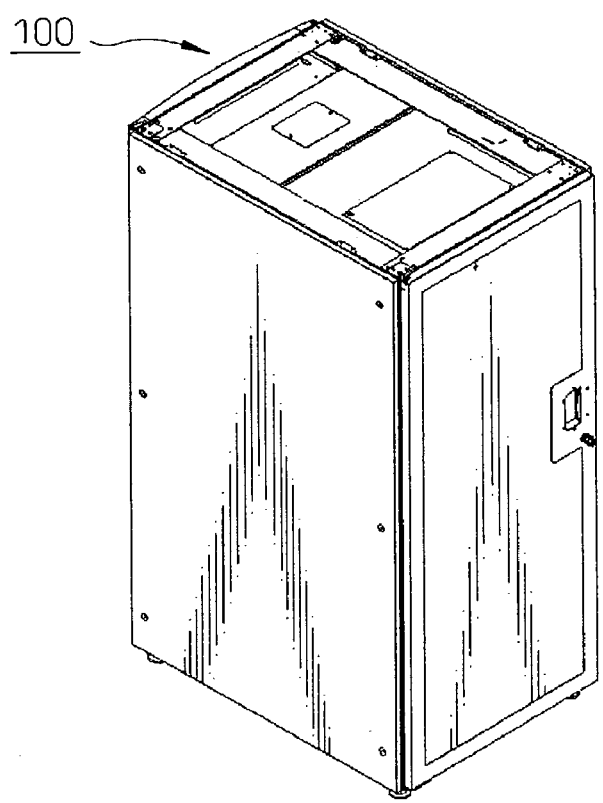
FIG. 1B is a perspective view taken from the rear side of the library apparatus shown in FIG. 1B.

FIG. 1A is a view taken from the front side of a magnetic tape library apparatus 100 to which the present invention is applied, and FIG. 1B is a view of the same apparatus taken from the rear side. On a front panel of the library apparatus 100, there are media access ports 101 for inserting/withdrawing magazines into/from the library apparatus 100, wherein the magazines accommodate a plurality of cartridges each of which in turn contains a magnetic tape. In the library apparatus 100 according to this embodiment, two media access ports 101 are provided and the magazines can be inserted/withdrawn through each media access port 101. Further, also by opening a door 102, the cartridges housed in the library apparatus 100 can be exchanged and internal devices can be checked. Also, on the door 102 of the library apparatus 100, there is provided an operator panel 103, through which operation such as selection of the cartridges housed in the apparatus can be performed.

Figure 2A:
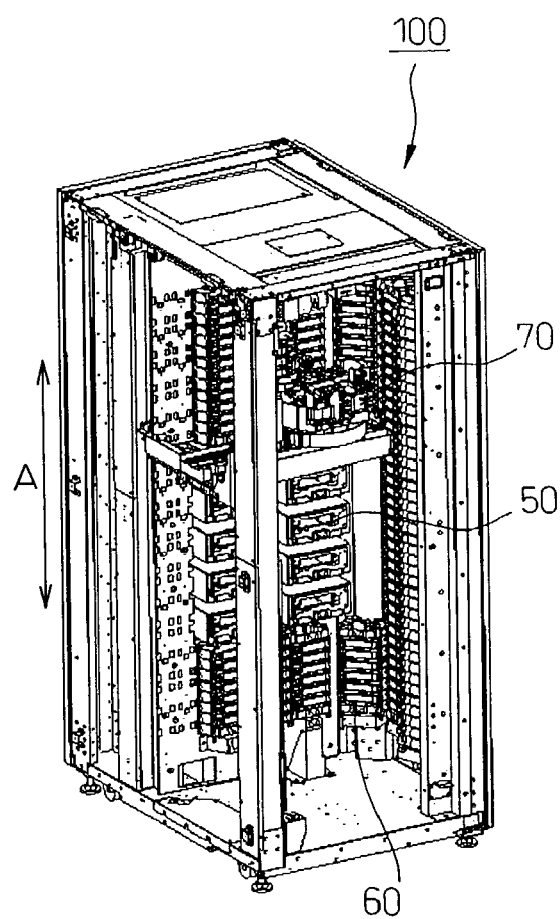
FIG. 2A is a perspective view showing an internal construction of the library apparatus shown in FIG. 1A.
Figure 2B:
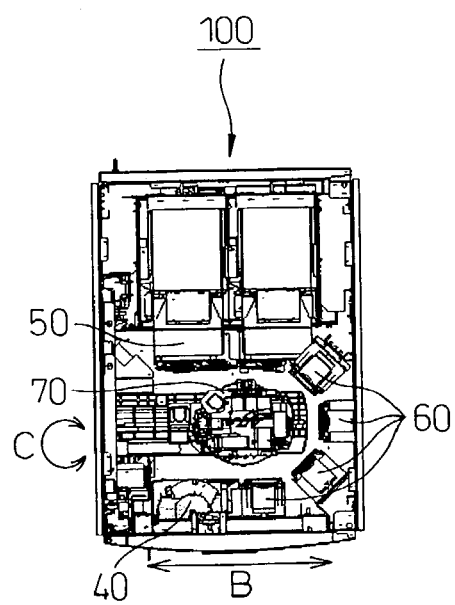
FIG. 2B is a plan view showing the internal construction of the library apparatus shown in FIG. 2A.

FIG. 2A shows an internal construction of the library apparatus shown in FIG. 1A. On the other hand, FIG. 2B is a view of the internal construction of the library apparatus shown in FIG. 2A taken from the top side. Inside the library apparatus 100, recording and reproducing devices 50 for recording and reproducing operation of the cartridge 15, and a plurality of racks for accommodating a plurality of the cartridges 15 are provided. In this embodiment, eight recording and reproducing devices 50 disposed in two rows in a lateral direction and four rows in a longitudinal direction are provided in total. Then, a robot 70 is provided in the apparatus for transferring the cartridges 15 between the recording and reproducing devices 50 and the accommodating racks 60 of the cartridges 15.

Such library apparatus 100 is connected to a computer, a server or a personal computer via a network, and, in response to access from each apparatus, records information on the cartridges and reproduces the information from the cartridges. For such purpose, the plurality of cartridges are accommodated in the racks 60 in the apparatus 100. Further, when additional cartridges are needed, the cartridges are introduced into the library apparatus 100 by employing the magazines 40 through the media access ports 101 so that the cartridges 40 housed in the magazines 40 are transferred to the racks 60 in the apparatus by the robot 70. On the other hand, when the cartridges are withdrawn from the library apparatus 100, the cartridges are moved from the racks 60 in the library apparatus 100 to the magazines 40 by the robot 70, and then the cartridges are withdrawn through the media access ports 101 by employing the magazines 40.

The robot 70 described above can be moved in three dimensional directions in the library apparatus 70. More specifically, as shown by arrows A, B and C in FIGS. 2A and 2B, the robot 70 can perform movement in the vertical direction (the arrow A) and to and fro movement in the direction of the width of the apparatus (the arrow B), and rotation about the mounting axis. It allows the robot 70 to transfer the cartridges and to be moved freely between each of the racks 60, the recording and reproducing devices 50 and the magazines 40.

FIGS. 3A and 3B show an LTO medium 15A that is one type of the cartridges 15 used in the library apparatus 100, wherein FIG. 3A is a view of the LTO medium 15A taken from the rear side, and FIG. 3B is a front view, a plan view, a rear view and a side view of the LTO medium 15A. As shown in the figure, the outer dimensions of the LTO medium 15A are 105.4 mm (W)×102 mm (L)×21.5 mm (H).

The LTO medium 15A has an indentation 41A for identifying the medium at the front side and indentations 41 which are grasped by a robot hand at the rear both sides. Also, a bar code label 44 is attached on the rear side for identifying the cartridge 15. The indentation 41A at the front side of the LTO medium 15A is provided not across the full range of the height of the LTO medium 15A.

FIGS. 4A and 4B show an DLT medium that is another type of the cartridges 15 used in the library apparatus 100, wherein FIG. 4A is a view of the DLT medium 15B taken from the rear side, and FIG. 4B is a front view, a plan view, a rear view and a side view of the DLT medium 15B. As shown in the figure, the outer dimensions of the DLT medium 15B are 105.4 mm (W)×105.8 mm (L)×25.4 mm (H).

The DLT medium 15B also has an indentation 41B for identifying the medium at the front side and indentations 41 at the rear both sides. The robot hand grasps the cartridge 15 at these indentations 41. Also, a cover 42 and a hinge 43 for opening/closing the cover 42 are provided at the front side. Further, a bar code label 44 is attached on the rear side for identifying the cartridge 15. The indentation 41B at the front side of the DLT medium 15B is provided across the full range of the height of the DLT medium 15B.

In library apparatus using magnetic tape cartridges, the bar code label 44 is typically attached on the rear side of the cartridge of the LTO medium 15A or the DLT medium 15B. Information about the data recorded in the medium is written on this bar code label 44, and a CCD camera unit, a bar code reader unit and the like built in the robot hand read the bar code written on the bar code label and perform backup operations by using the information.

Here, operation of the robot hand, in the library apparatus 100 according to the present invention, to grasp the cartridge temporarily by grasping it and to insert the cartridge to a target accommodating rack (or a recording and reproducing device) after transfer will be described, wherein, for ease of understanding of the operation of the robot hand, operation of the detailed parts of the robot hand will be described successively in the order of: (1) a mechanism for performing to and fro movement of a picker and opening and closing movement of hooks built in the robot hand by means of one driving source; (2) a mechanism for stopping the hooks always at an optimal position to perform the closing movement of the hooks at the optimal position; (3) overall operation of the robot hand including a mounter mechanism for adjusting thrust amount of various types of cartridges to the accommodating rack appropriately; and (4) construction of the accommodating rack in which protruding lengths of the cartridges from the cartridge accommodating racks are aligned so that the robot hand can perform withdrawal/insertion of the cartridges from/to the accommodating rack reliably. Here, throughout the several views, like elements are designated by like reference numerals.

(1) [A Mechanism for Performing to and fro Movement of a Picker and Opening and Closing Movement of Hooks by Means of One Driving Source]

Figure 5A:
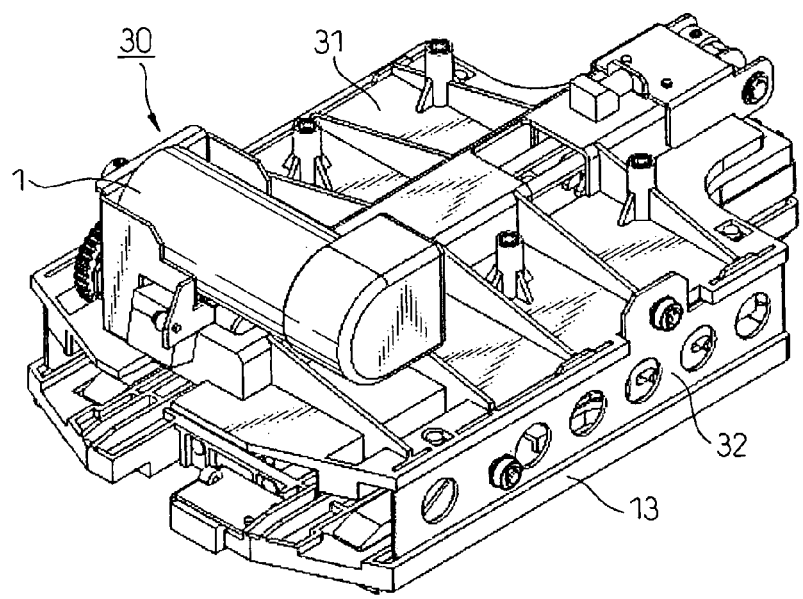
FIG. 5A is a perspective view of a robot hand according to an embodiment of the present invention taken from the front right side.
Figure 5B:
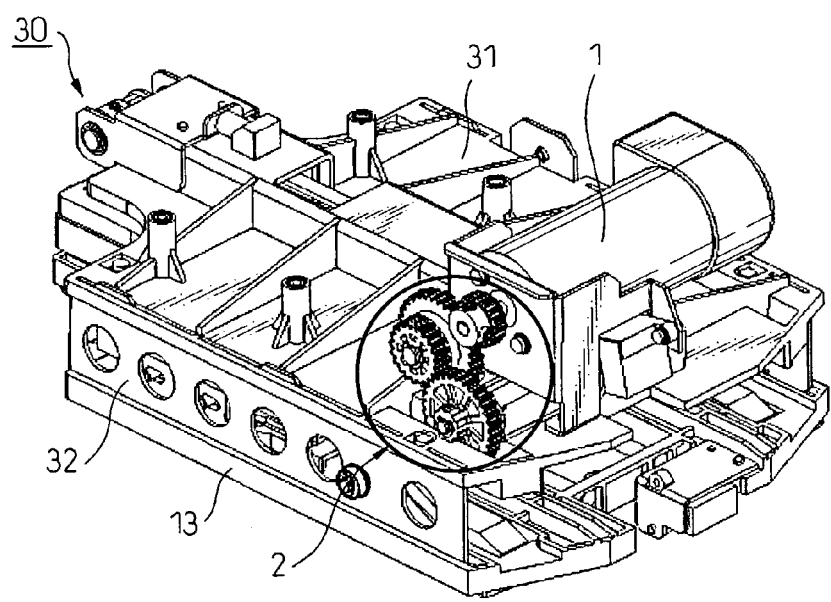
FIG. 5B is a perspective view of the robot hand shown in FIG. 5A taken from the front left side.

FIG. 5A is a view of a robot hand 30 according to an embodiment of the present invention taken from the front right side, and FIG. 5B is a view of this robot hand 30 taken from the front left side. The robot hand 30 is provided with a base 13, two side plates 32 attached on the base 13, and a top housing 31 mounted on the side plates 32, and a picker described later is provided between the base 13 and the top housing 31. Further, a motor 1 that is only one driving source in the robot hand 30 is mounted on the top housing 31. The driving force of the motor 1 is converted to power suitable for use by a reduction gear mechanism 20 and is transferred to the picker therein to move the picker.

Figure 6A:
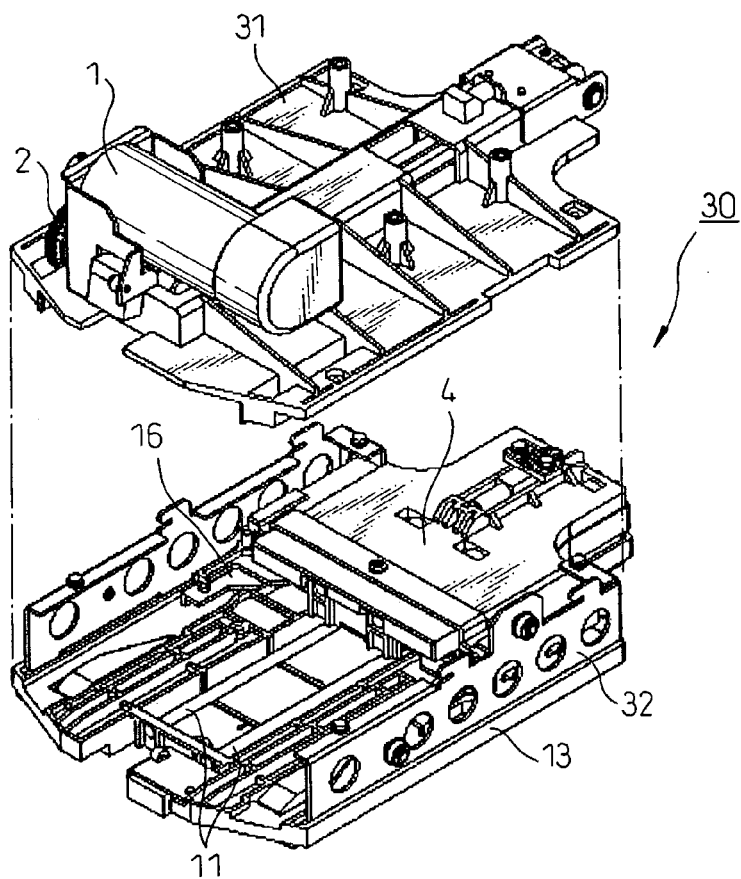
FIG. 6A is an exploded perspective view of the robot hand shown in FIG. 5A in which the robot hand is broken down into a base and a top housing.
Figure 6B:
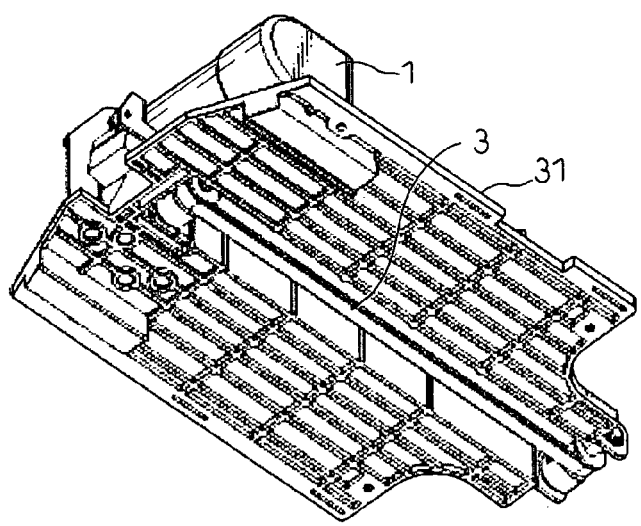
FIG. 6B is a perspective view of the top housing shown in FIG. 6A taken from the bottom side.

FIG. 6A shows the robot hand shown in FIG. 5A wherein the top housing 31 is removed from the base 13. On the other hand, FIG. 6B is a view of the top housing 31 shown in FIG. 6A taken from the bottom side. On the central part of the base 13, two slide shafts 11 are provided in the direction parallel to the side plates 32. The slide shafts 11 act as tracks for the to and fro sliding movement of the picker as mentioned above. The picker is designated by a reference numeral 4 in this figure.

The picker 4 includes hooks and pins and the like, described below, and has features for moving along the slide shafts 11 to withdraw the cartridge from the accommodating rack or the recording and reproducing device, hold the cartridge on the base 13 temporarily and then insert the cartridge that has been held temporarily to the accommodating rack or the recording and reproducing device. Also, as shown in FIG. 6B, at the bottom side of the top housing 31, a driving belt 3 is provided in the longitudinal direction of the top housing 31. The driving belt 3 transfers the driving force of the motor 1 that is converted by the reduction gear mechanism 2 to the picker 4 mentioned above.

In the following description, with reference to the movement of the picker 4 along the slide shafts 11, the movement of the picker 4 to approach the accommodating rack of the cartridge is expressed as "the picker 4 goes forward, or advances", and the movement of the picker 4 to go away from the cartridge accommodating rack is expressed as "the picker 4 retreats or returns". Further, it is assumed that the picker 4 advances when the motor 1 turns in one direction while the picker 4 retreats when the motor 1 turns in opposite direction.

FIG. 7A shows the base 13 shown in FIG. 6A from which the side plates 32 and actuators 16 are removed, FIG. 7B shows only a guide 14 attached to the base 13 shown in FIG. 7A in detail, and FIG. 7C is a view of the base 13 shown in FIG. 7A taken from the bottom side.

Inside the picker 4, two slide shafts 8 are provided in the direction orthogonal to the slide shafts 11 that act as the tracks of the picker 4, and hooks 6 that represent fingers (nails) for grasping (hitching) the cartridge are attached to the slide shafts 8. The slide shafts 8 act as tracks when the hooks 6 perform opening and closing movement. Further, the hooks 6 are provided with pins 7 for allowing the opening and closing movement of the hooks 6 in the neighborhood of the slide shafts 8. The pins 7 are engaged with the guide 14 attached to the base 13 when the picker 4 is moved to allow the opening and closing movement of the hooks 6 by sliding on the side of the guide 14.

The guide 14 is comprised of two members 14A and 14B interconnected by a leaf spring 14a and is attached to the base 13 by a screw 26 from the bottom side. Thus, the two members 14A and 14B of the guide 14 are configured so that they are moved to the bottom side of the base 13 due to deflection of the leaf spring 14a when the two members 14A and 14B are pressed from the top side of the base 13. Further, the two members 14A and 14B of the guide 14 have respective tapered portions 14b, straight portions 14c, inclined portions 14d and top surfaces 14e.

Figure 8A:
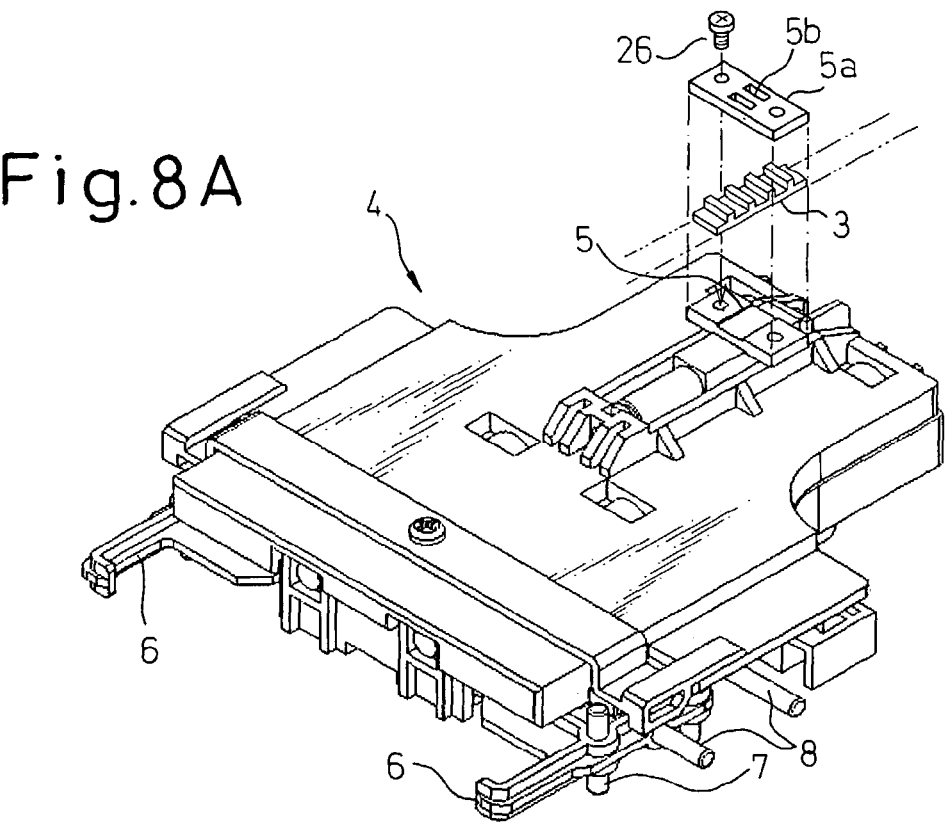
FIG. 8A is a perspective view describing connection of a picker with a driving belt shown in FIG. 7A.
Figure 8B:
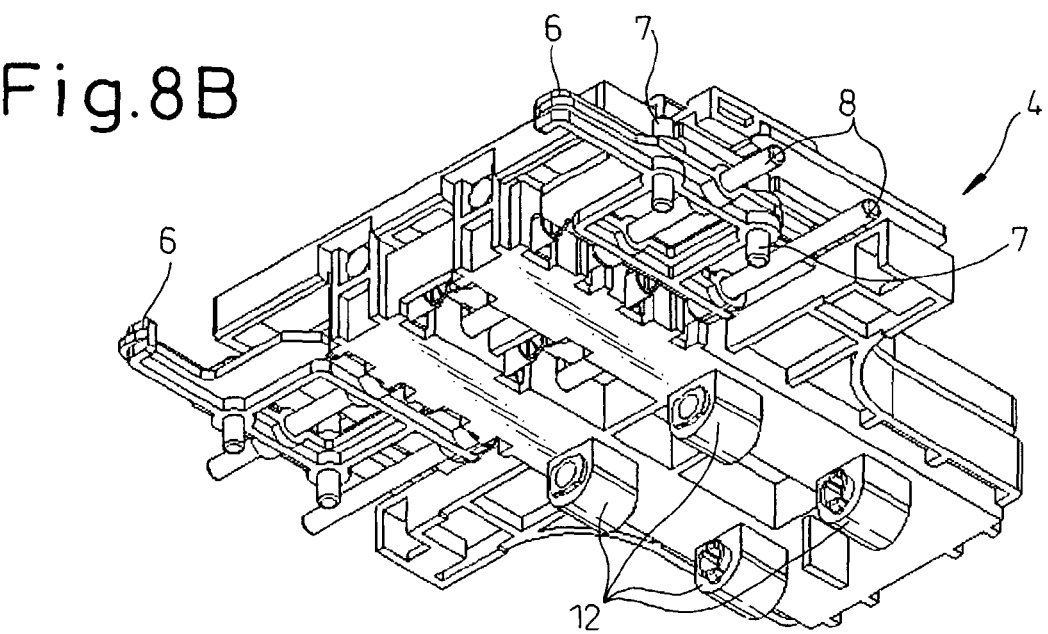
FIG. 8B is a perspective view of the picker shown in FIG. 8A taken from the bottom side.

FIG. 8A shows only the picker 4 selected from FIG. 7A for describing the connection of the picker 4 with the driving belt 3 shown in FIG. 6B. Further, FIG. 8B is a view of the picker 4 taken from the bottom side. On the top surface of the picker 4, a coupling portion 5 for combining with the driving belt 3 is provided. The driving belt 3 is an internal tooth belt in this embodiment and, a coupling plate 5a for securing the driving belt 3 to the coupling portion 5 is provided with slits 5b separated by the same space as the internal teeth. The coupling plate 5a is attached to the coupling portion 5 by the screw 26 so that the internal teeth of the driving belt 3 are inserted to the slits 5b. As a result, the picker 4 is moved with the movement of the driving belt 3.

On the bottom side of the picker 4, the two slide shafts 8 are provided in the direction orthogonal to the moving direction of the picker 4, and the hooks 6 are slidably attached to the slide shafts 8. The hooks 6 and the pins 7 for operating the hooks 6 are described in detail later. Further, four coupling portions 12 are provided on the bottom side of the picker 4. The slide shafts 11 on the base 13 shown in FIG. 7A are inserted through the coupling portions 12.

Figure 9A:
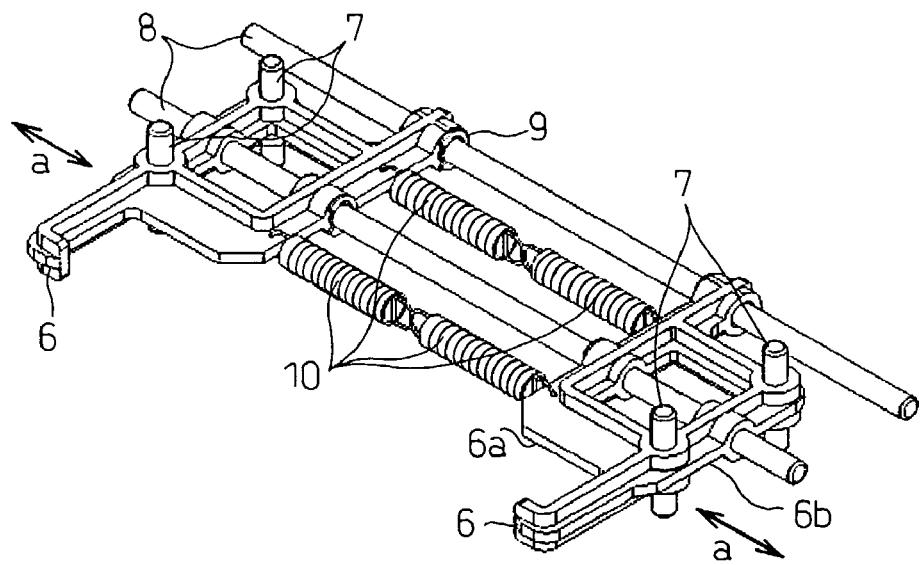
FIG. 9A is a perspective view showing hooks and slide shafts inside the picker shown in FIG. 8A.

FIG. 9A shows relationship between the hooks 6 and the slide shafts 8 inside the picker 4 shown in FIG. 8A. The hooks 6 are formed by inwardly bending extended tip portions of frames 6b that are disposed at the outside of rectangular frames 6a sliding on the tracks of the slide shafts 8. Then, the two pins 7 are implanted into the outward frames 6b therethrough. The arrow "a" indicates the moving direction of the hooks 6 in this figure.

Figure 9B:
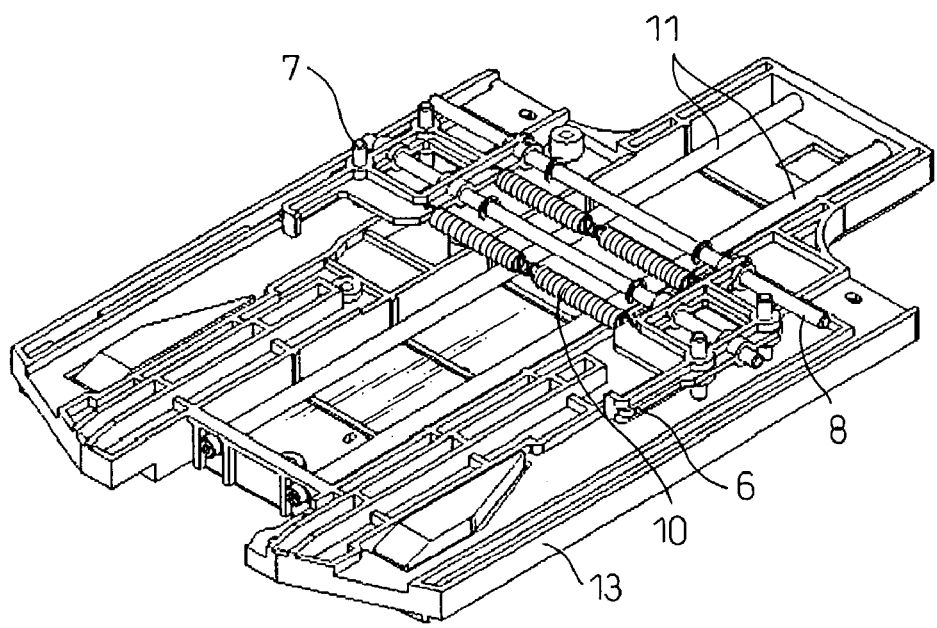
FIG. 9B is a perspective view describing positions of the hooks and the slide shafts shown in FIG. 9A on the base and their positional relationship to the guide.

Further, the two rectangular frames 6a are pulled in the direction so that the frames approach each other by two pairs of springs 10. On the other hand, the slide shafts 8 are provided with stoppers 9 for defining stop positions when the hooks 6 are closed along the slide shafts 8. Therefore, the two rectangular frames 6a pulled by the springs 10 normally stay at the positions of the stoppers 9. The springs 10 act to pull the rectangular frames 6a when the frames move outwardly than the present positions to put the frames 6a back to the positions of the stoppers 9. FIG. 9B shows positions of the hooks 6, the pins 7, the slide shafts 8 and the springs 10 on the base 13, or shows a state in which the cover of the picker 4 is removed from FIG. 7A.

Here, a configuration in which the to and fro movement of the picker 4 and the opening and closing movement of the hooks 6 configured as described above according to the present invention are performed by the motor 1, that is the only one driving source, will be described in detail.

Figure 10A:
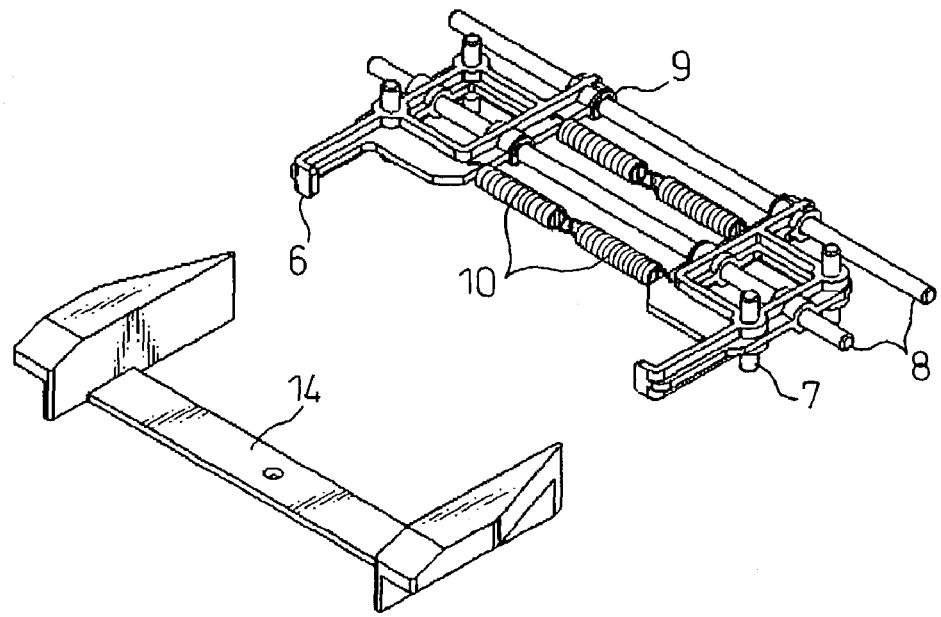
FIG. 10A is a perspective view showing a state in which the base is removed from FIG. 9B.
Figure 10B:
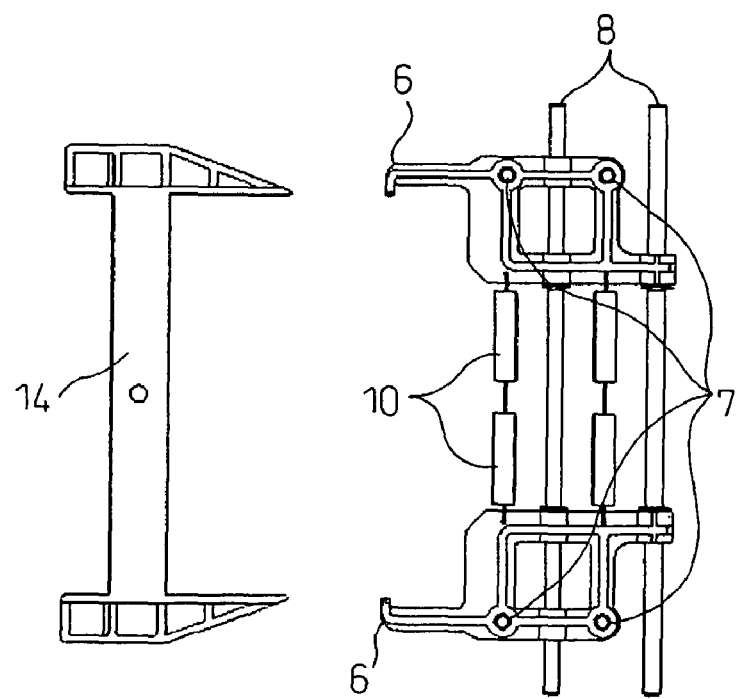
FIG. 10B is a bottom view of the state shown in FIG. 10A taken from the bottom side.

FIG. 10A shows relationship between the hooks 6 and guide 14 in which the base 13 is removed from FIG. 9B, and FIG. 10B is a view showing the relationship between the hooks 6 and the guides 14 taken from the bottom side of the base 13. These figures show a state before actuation of the hooks 6 in which the hooks 6 are closed thanks to the urging force of the springs 10 and rest in abutment on the stoppers 9.

As described in FIGS. 5A–9B, when the motor 1 starts to revolve in the direction to advance the picker 4, the driving force of the motor 1 is transferred to the coupling portion 5 via the reduction gear mechanism 2 and the driving belt 3, and the picker 4 starts movement along the slide shafts 11 with the movement of the driving belt 3. In this state, the hooks 6, the pins 7, the slide shafts 8 and the springs 10 are moved to the left side of FIG. 10B.

Figure 11A:
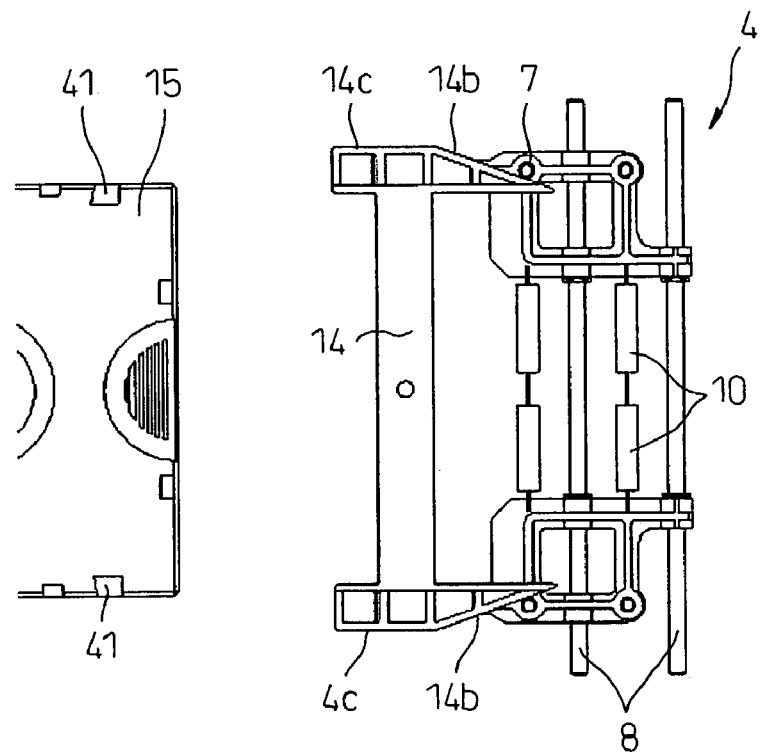
FIG. 11A is a bottom view showing a state in which pins for actuating the hooks are engaged with tapered portions of the guide as a result of movement of the picker.
Figure 11B:
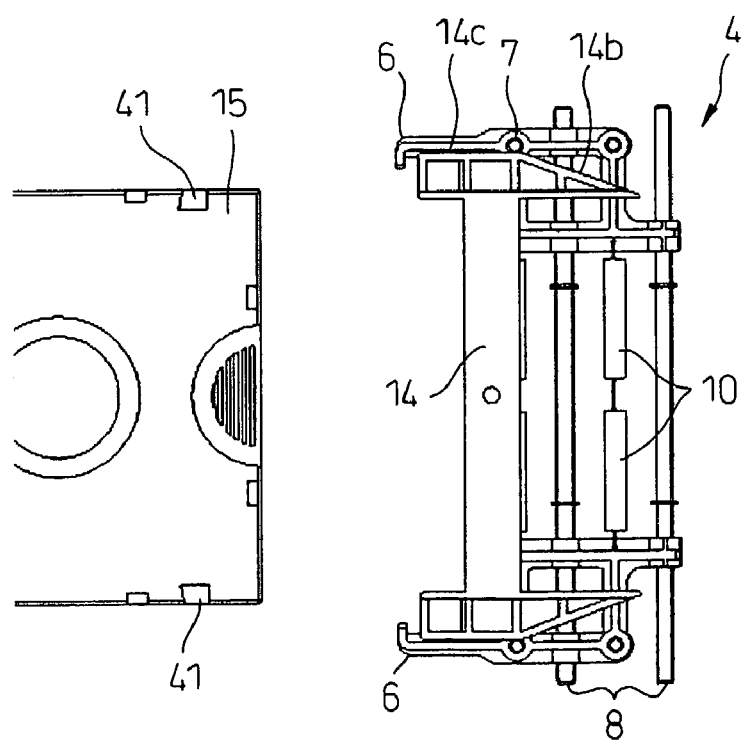
FIG. 11B is a bottom view showing a state in which the pins shown in FIG. 11A are engaged with straight portions of the guide.

FIG. 11A shows a state in which the pins 7 for actuating the hooks 6 are engaged with the tapered portions 14b of the guide 14 as a result of movement of the picker 4. The cartridge 15 which will be grasped by the picker 4 is shown at the left side of this figure. As the picker 4 goes forward, the pins 7 are moved along the tapered portions 14b, as a result of which the hooks 6 that have been closed are gradually opened. As the picker 4 goes forward further, the pins 7 go past the tapered portions 14b of the guide 14 and reach the straight portions 14c. This state is shown in FIG. 11B. After this state, the opening movement of the hooks 6 is stopped and the hooks 6 are moved while maintaining the opening distance between the hooks 6.

In this embodiment, timing of the opening and closing movement of the hooks 6 is adjusted by the two pins 7 disposed side by side in the direction of the to and fro movement of the hooks 6 on each of the hooks 6. The distance between the two pins 7 is determined according to the length of the guide 14 and the like.

Figure 12A:
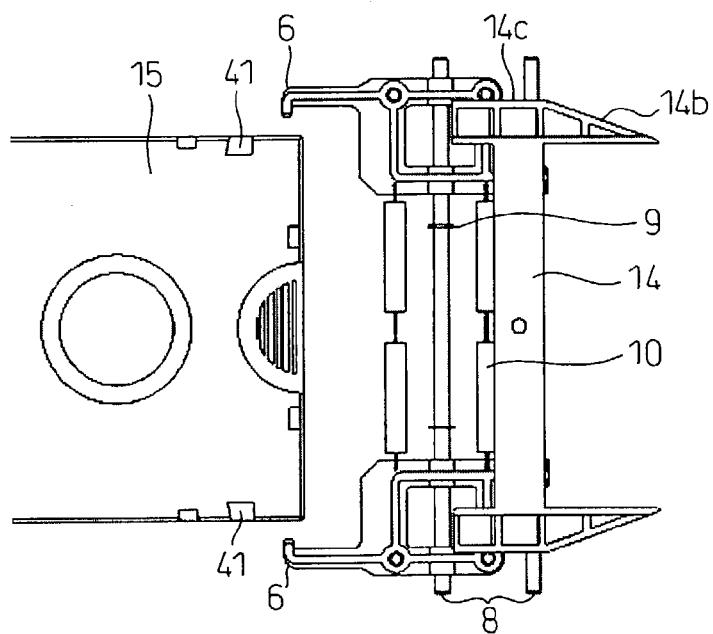
FIG. 12A is a bottom view showing a state in which the hooks advance further than in the state shown in FIG. 11A and approach a cartridge.

As the picker 4 goes forward further due to the rotation of the motor 1, as shown in FIG. 12A, the forward one of the two pins 7 is disengaged from the guide 14. However, as the backward pin 7 is still in contact with the straight portions 14c of the guide 14, the hooks 6 are not closed and continue the movement while remaining open.

Figure 12B:
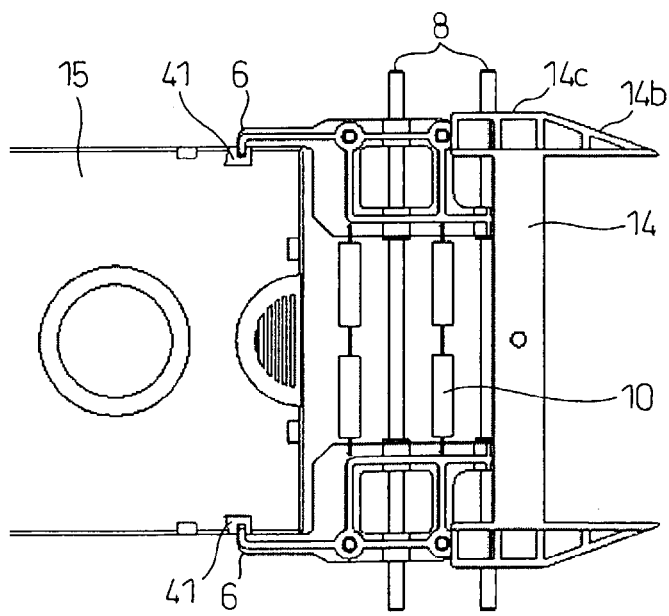
FIG. 12B is a bottom view showing a state in which the hooks advance further than in the state shown in FIG. 12A so that the hooks are disengaged from the guide and engaged with the cartridge.

As the picker 4 goes forward further due to the rotation of the motor 1, as shown in FIG. 12B, the backward one of the two pins 7 is also disengaged from the guide 14. At this moment, the hooks 6 are closed instantaneously due to the urging force of the springs 10. Then, the hooks 6 that have been closed are inserted into the indentations 41 provided on both sides of the cartridge 15 to grasp the cartridge.

Figure 13:
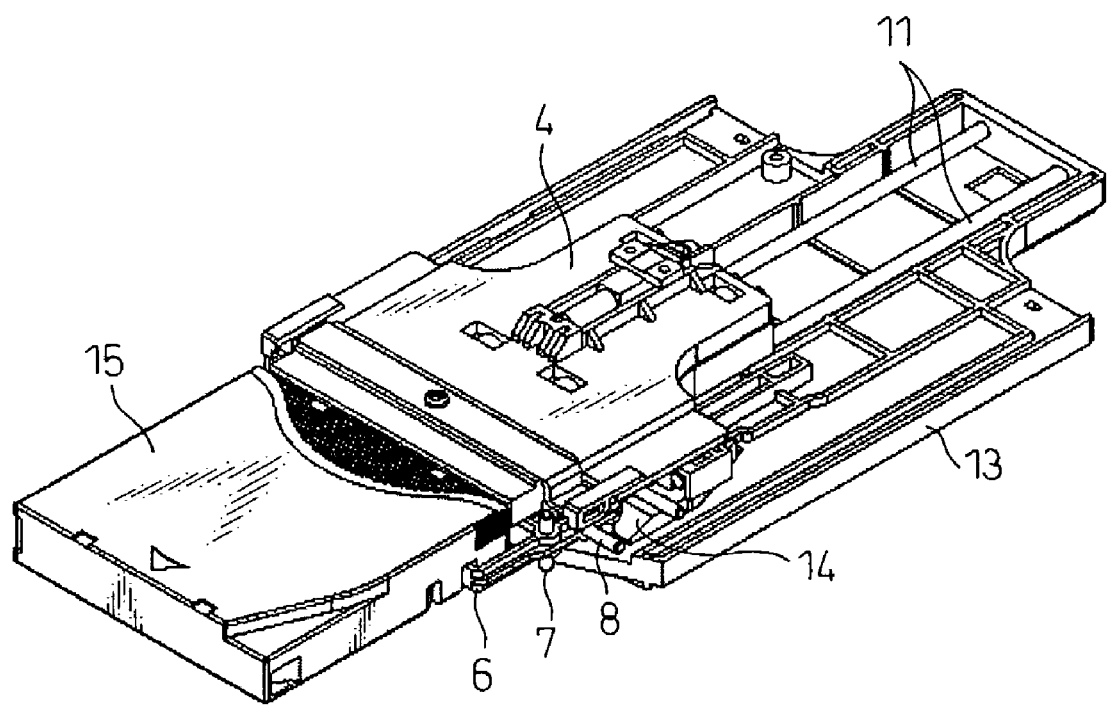
FIG. 13 is a perspective view showing a state in which the picker shown in FIG. 7A moves on the base to reach the same state as in FIG. 12B.

In this case, in order to allow the hooks 6 to be inserted into the indentations 41 of the cartridge 15 at the time when the hooks 6 are closed, high production accuracy of the picker 4, the accommodating rack and the cartridge 15 must be maintained. Here, such higher production accuracy may result in a higher cost. For the purpose of addressing this problem, the hooks 6 may be configured to be closed at the position where the picker 4 advances further than the position where the hooks 6 are inserted into the indentations 41, wherein the hooks 6 are engaged with the indentations 41 by moving back the picker 4 after the hooks 6 are closed. Such construction ensures the engagement between the hooks 6 and the indentations 41 without high production accuracy. FIG. 13 is a view showing a state in which the hooks 6 are inserted into the indentations 41 taken from the same viewpoint as in FIG. 7A, in which the picker 4 grasping the cartridge 15 is shown.

In the foregoing paragraphs, the mechanism of the opening and closing movement of the hooks 6 in the "advancing" movement of the picker 4 (the related movement between the hooks 6 and the guide 14), and in other words, the movement of the picker 4 to grasp the cartridge 15 in the accommodating rack or the recording and reproducing device and withdraw the cartridge 15 from the cartridge accommodating rack has been described. After that, the picker 4 performs the movement to pull the grasped cartridge 15 onto the base 13, or the "returning" movement. With regard to the "returning" movement of the picker 4, only the hooks 6, the pins 7 and the guide 14 will be described with reference to FIGS. 14A–14D.

Figure 14A:
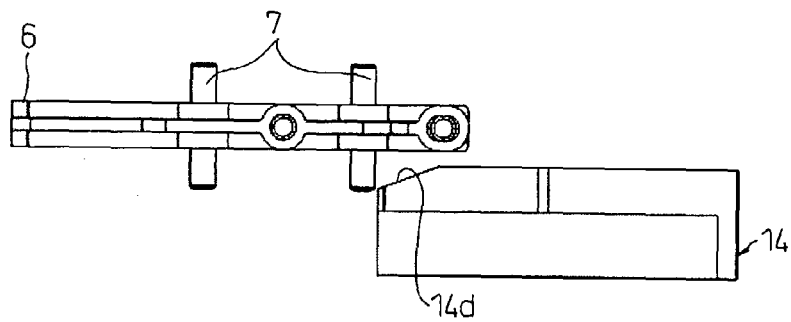
FIG. 14A is a side view showing a state just before the pins are engaged with the guide when the picker returns from the state shown in FIG. 13 in which the hooks grasp the cartridge to the state shown in FIG. 7A.
Figure 14B:
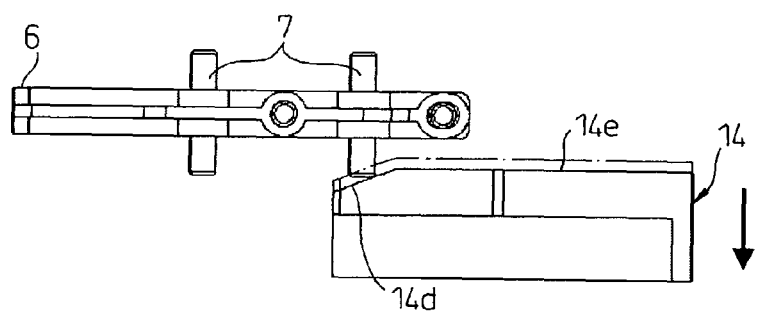
FIG. 14B is a side view showing a state after the state shown in FIG. 14A in which the pins of the hook are engaged with an inclined portion of the guide and the guide is deflected.

FIG. 14A shows the positions of the hooks 6, the pins 7 and the guide 14 in the state shown in FIG. 13 taken from the front right side. In this state, when the motor revolves in the direction to move the picker 4 back, the picker 4 starts the movement to return to the base. As the picker 4 starts to retreat, as shown in FIG. 14B, the backward pins 7 are moved to the right side of the figure in abutment on the tapered portions 14d of the guide 14. As a result, the guide 14 is pushed down to the direction of an arrow in the figure.

As described in FIGS. 7A–7C, this is because the guide 14 is configured to be elastically deformable to the direction of the arrow in the figure. More specifically, the guide 14 can be pushed down because the leaf spring 14a of the guide 14 is secured to the base 13 at its center by the screw 26 while the hooks 6 and the pins 7 are secured to the picker 4, and in turn, the picker 4 is secured by the slide shafts 11 so that it cannot be displaced in vertical direction.

Figure 14C:
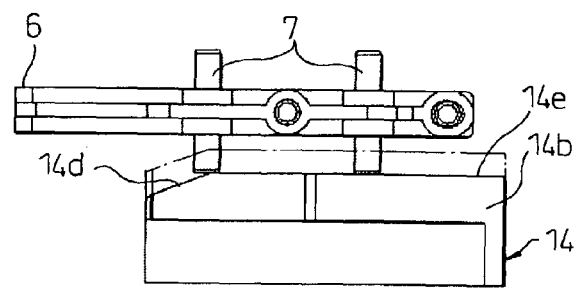
FIG. 14C is a side view showing a state after the state shown in FIG. 14B in which the pins of the hook are engaged with a top surface of the guide and the guide is pushed down.

When the picker 4 retreats further than in the state shown in FIG. 14B, as shown in FIG. 14C, the guide 14 is pushed down further by the pins 7 and the pins 7 slide on the top surfaces 14e of the guide 14. Thus, when the picker 4 retreats, the guide 14 escapes automatically without interfering with the tracks of the picker 4.

Figure 14D:
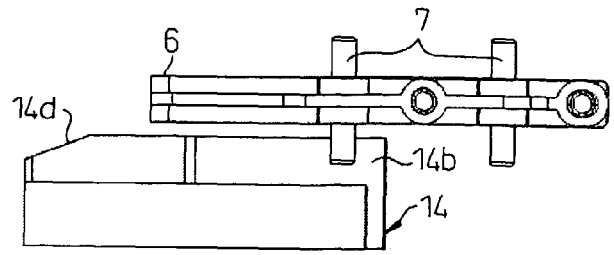
FIG. 14D is a side view showing a state after the state shown in FIG. 14C in which the pins of the hook reach the position of the tapered portion of the guide and the guide returns to the initial position.

As the picker 4 retreats further with the rotation of the motor 1, the outward pins 7 come to the position of the tapered portions 14b of the guide 14, but the forward pins 7 remain on the top surfaces 14e of the guide 14 and therefore the guide 14 is still pushed down. On the other hand, when the picker 4 retreats to the position shown in FIG. 11A, the forward and backward pins 7 are both disengaged from the top surfaces 14e of the guide 14, and therefore pressure of the pins 7 on the guide 14 is released so that the guide 14 that has been pressed downwardly returns to the initial position by elastic force of the leaf spring 14a. This state is shown in FIG. 14D.

Figure 15:
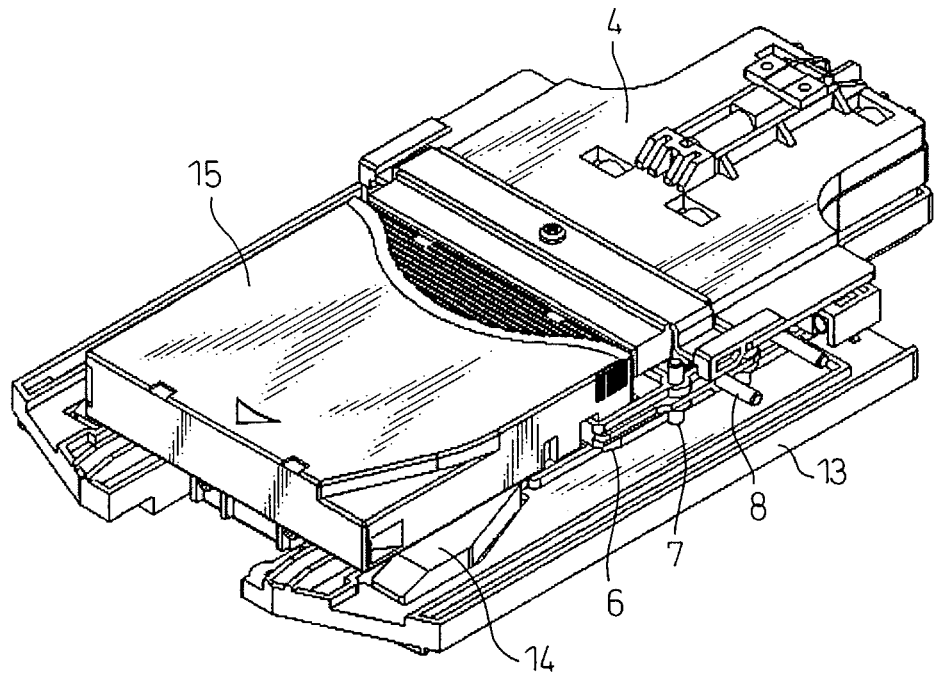
FIG. 15 is a perspective view showing a state in which the picker shown in FIG. 7A pulls the cartridge grasped by the hooks onto the base.

The picker 4 retreats further by the rotation of the motor 1 to return the position of the initial waiting state shown in FIG. 7A and the picker 4 finishes the to and fro movement. The state in which the picker 4 finishes the to and fro movement is shown in FIG. 15, wherein the picker 4 holds the cartridge 15 on the base 13 temporarily. In this state, as the cartridge 15 is held on the base 13 while the hooks 6 are engaged with the indentations 41 of the cartridge 15, the cartridge 15 never drops down even if the robot hand is moved.

Thus, according to the present invention, since the picker 4 is configured as described above, the to and fro movement of the picker 4 and the opening and closing movement of the hooks 6 can be performed by the one motor 1. Also, as the opening and closing movement of the hooks 6 is performed as linear motion using the slide shafts 8, each of three types of magnetic tape cartridges including the ½ inch cartridge, the LTO cartridge and the DLT/S-DLT cartridge that have different width dimensions can be grasped.

In this connection, in the configuration described above, it is necessary to define the position at which the robot hand 30 closes the hooks 6 as a fixed position with respect to the cartridge 15. Therefore, position control of the robot hand 30 must be provided accurately.

However, when the accurate position control of the robot hand 30 cannot be provided, if the distance between the robot hand 30 and the recording and reproducing device 50 or the distance between the robot hand 30 and the cartridge accommodating magazine 60 differs in each apparatus due to cumulative dispersion of dimensional tolerances of the parts in the apparatus or other mechanisms and the like, a phenomenon in which the hooks 6 cannot be closed at an optimal closing position, with regard to the cartridge 15, appears. More specifically, when the specified distance between the robot hand 30 and the recording and reproducing device 50 or the distance between the robot hand 30 and the cartridge accommodating magazine 60 is too long, the hooks 6 are closed before reaching the optimal position and therefore the robot hand 30 cannot grasp the cartridge 15. In contrast, when the distance between the robot hand 30 and the recording and reproducing device 50 or the distance between the robot hand 30 and the cartridge accommodating magazine 60 is too short, the hooks 6 are not closed though the hooks 6 have reached the position where the hooks 6 should be closed, and therefore a malfunction in that the robot hand 30 cannot grasp the cartridge 15 may also occur.

In order to solve the problem, according to the present invention, a mechanism for stopping the hooks 6 always at an optimal position to perform the closing movement of the hooks 6 at the optimal position is added to the mechanism of the robot hand 30 described above. Operation of the added mechanism will be described in the following.

(2) [A Mechanism for Stopping the Hooks Always at an Optimal Position to Perform the Closing Movement at the Optimal Position]

Figure 16:
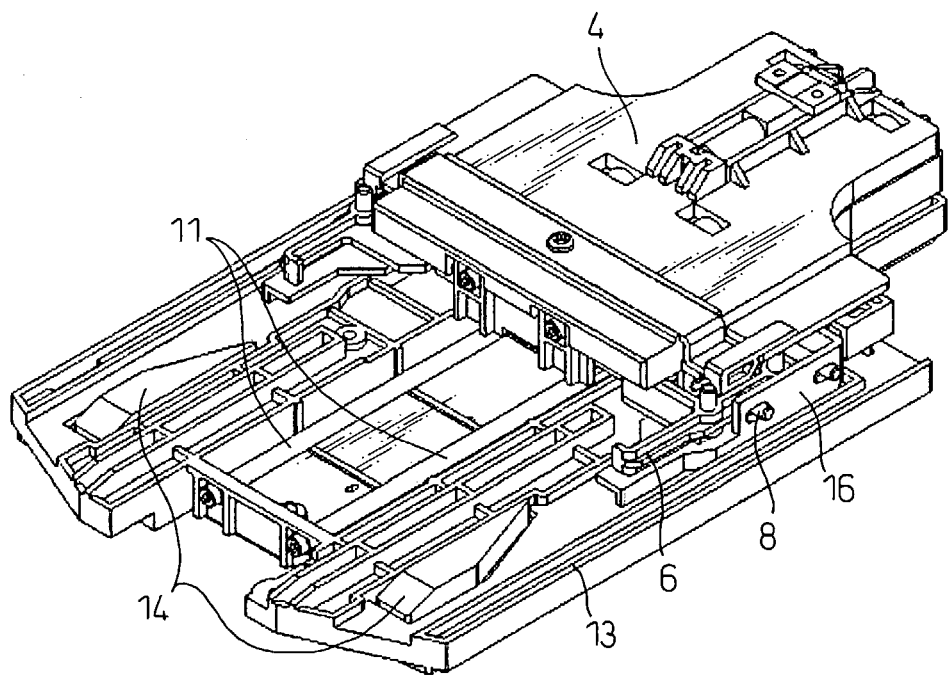
FIG. 16 is a perspective view showing a state in which actuators are added to the picker shown in FIG. 7A.
Figure 17A:
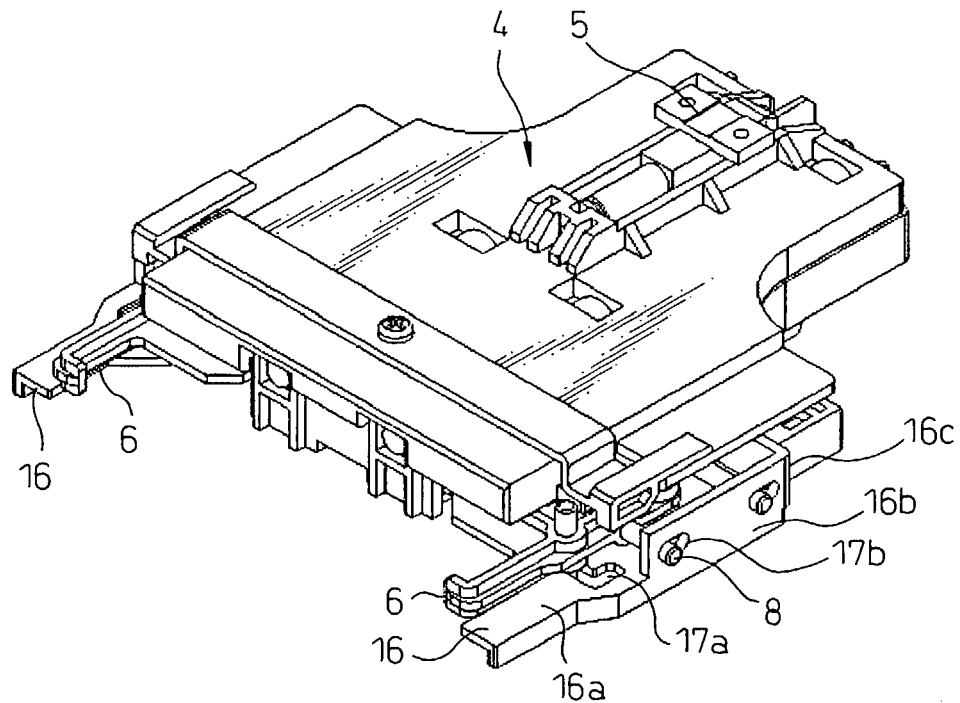
FIG. 17A is a perspective view showing a state in which the base is removed from FIG. 16.
Figure 17B:
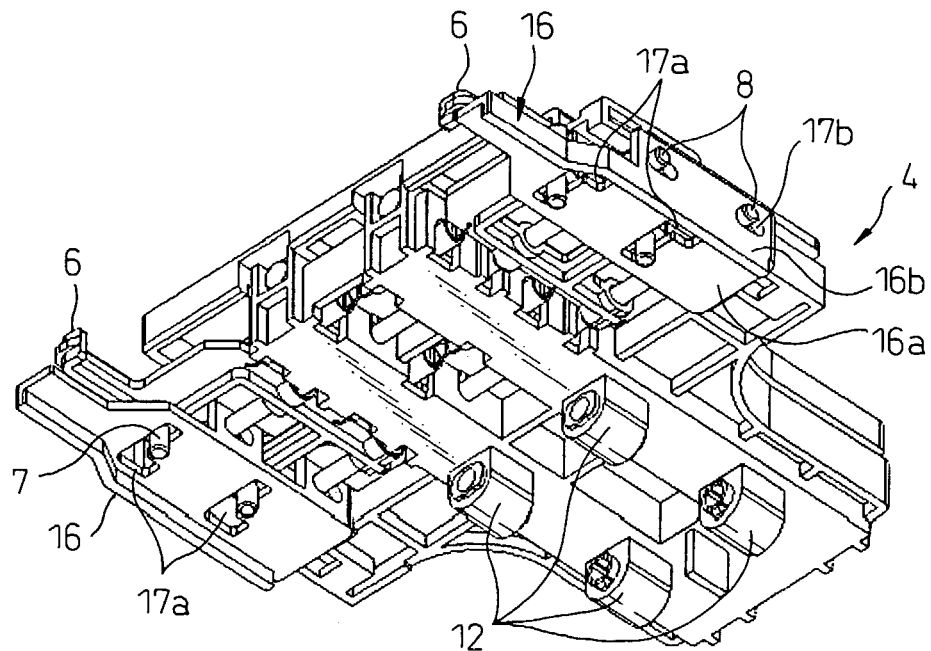
FIG. 17B is a perspective view taken from the bottom side of the FIG. 17A.
Figure 18A:
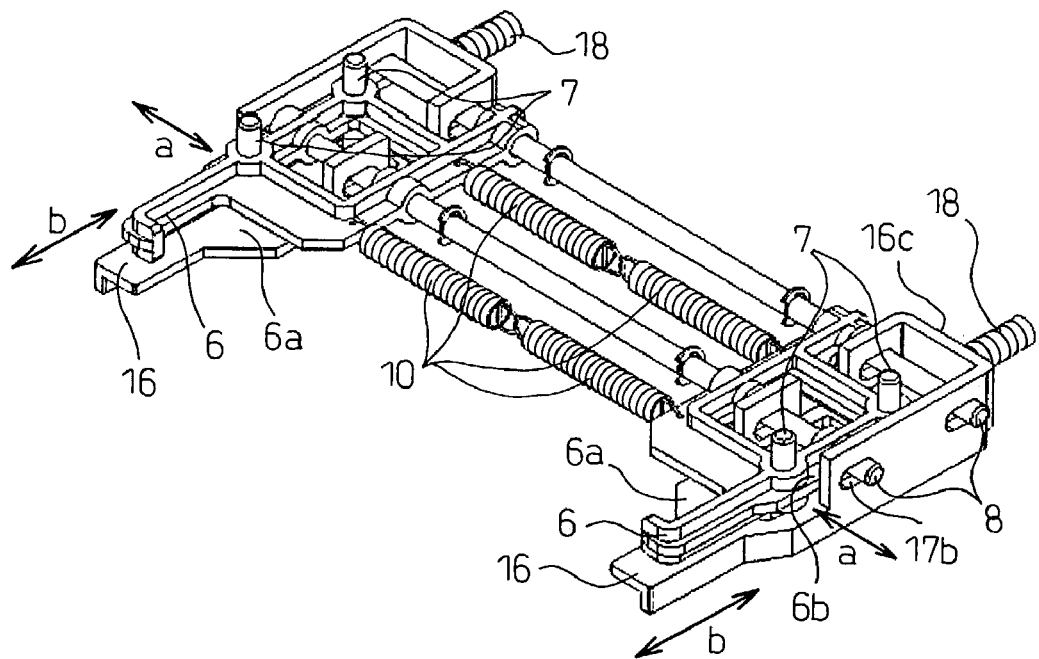
FIG. 18A is a perspective view showing a configuration in which the actuators are added to the hooks and the slide shafts shown in FIG. 18A.

FIG. 16 shows a state in which the actuators 16 for keeping a constant closing position of the hooks 6 with regard to the cartridge 15 are added to the picker 4 shown in FIGS. 7A–7C. Further, for the purpose of showing the shape of the actuators 16 clearly, FIGS. 17A and 17B are views of the picker 4 in which the base 13 is removed from FIG. 16, which are taken from the top side and the bottom side and correspond to FIG. 8A and 8B described above, respectively. Further, FIG. 18A shows a state in which the housing at the top side of the picker 4 is removed from FIG. 17A, or in other words, the actuators 16 are added to the configuration described above in FIG. 9. Further, FIG. 18B shows a state in which the base 13 is added to the configuration shown in FIG. 18A.

As seen from these figures, the actuators 16 are attached to the outside of the rectangular frame 6a, and each of the actuators 16 is comprised of a bottom plate 16a, a side plate 16b, a rear plate 16c and a compression spring 18. Each of the bottom plates 16a are provided with L-shaped grooves 17a through which the two pins 7 are inserted, and each of the side plates 16b are provided with long holes 17ab through which two slide shafts 8 are inserted. On the other hand, the rear plates 16c are urged forward in the direction of the hooks 6. Here, in FIG. 18A, it is to be noted that an arrow a indicates the opening and closing direction of the hooks 6 and an arrow b indicates the moving direction (to and fro direction) of the actuators 16.

Figure 18B:
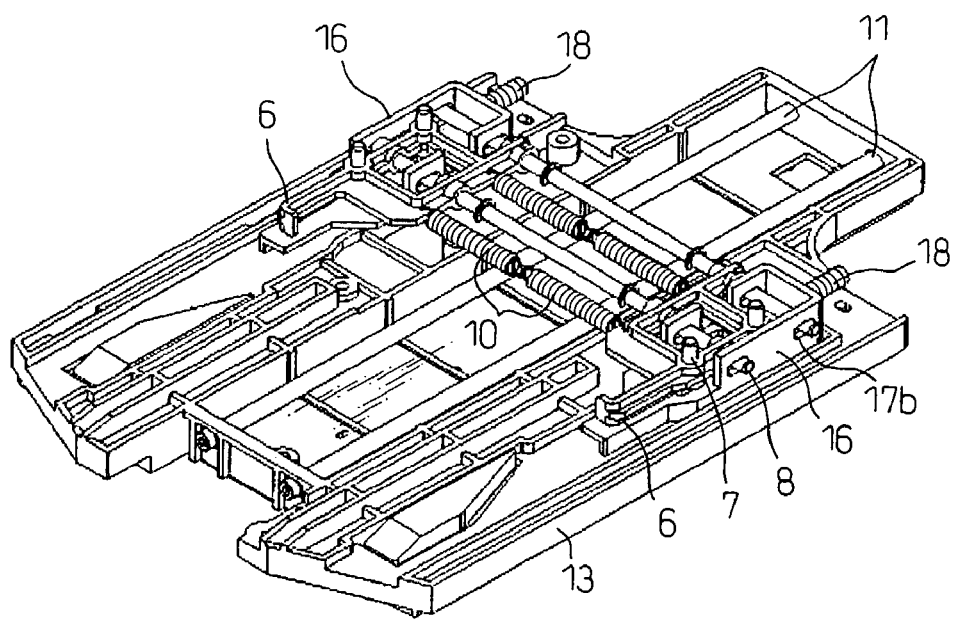
FIG. 18B is a perspective view describing a position of the hooks, the slide shafts and the actuators shown in FIG. 18A on the base and their positional relationship to the guide.
Figure 19A:
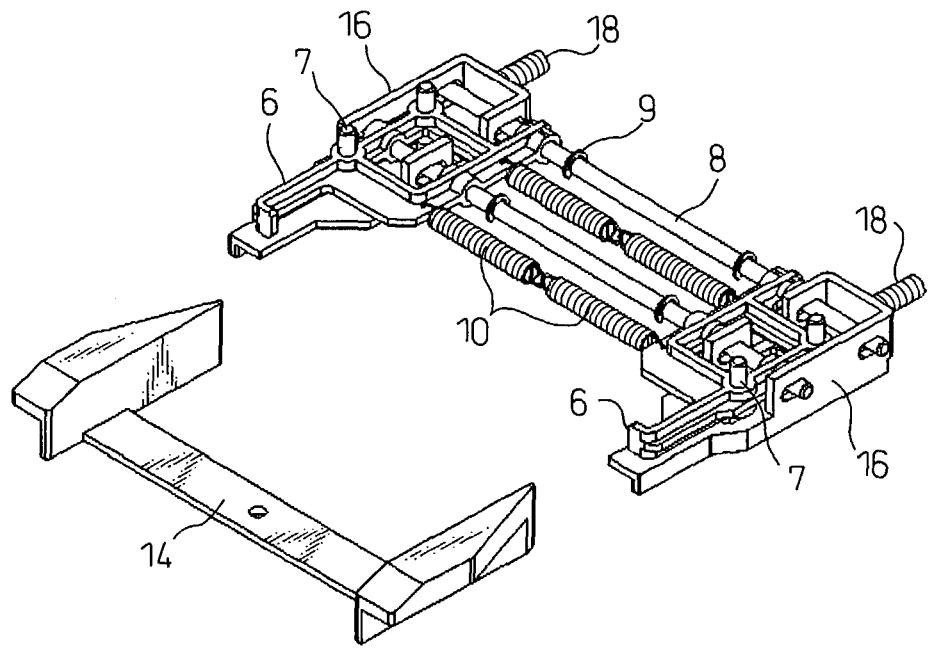
FIG. 19A is a perspective view showing a state in which the base is removed from FIG. 18B.
Figure 19B:
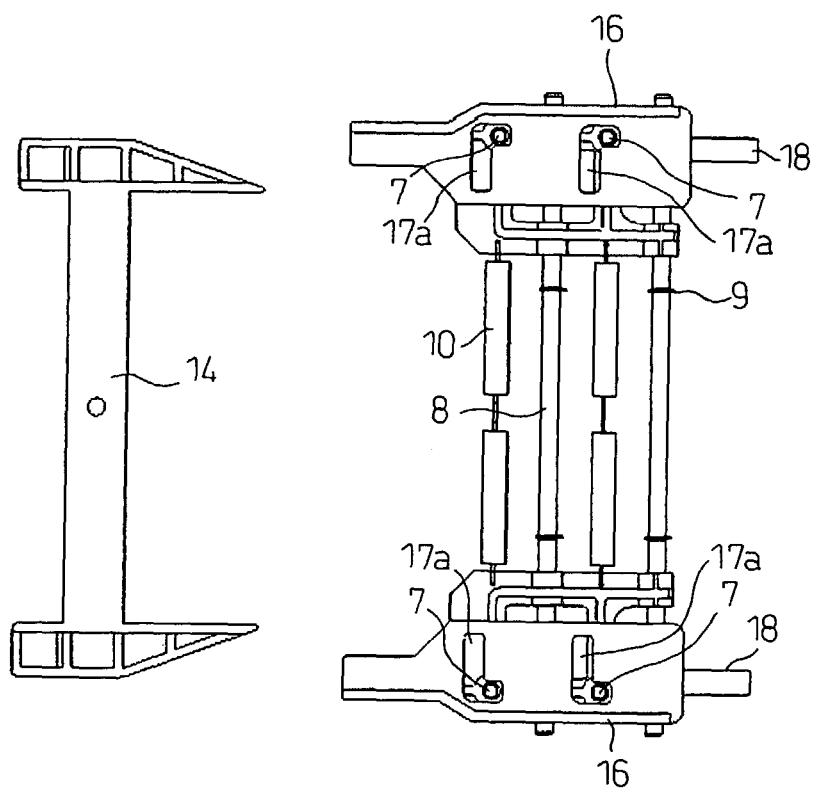
FIG. 19B is a bottom view taken from the bottom side of the FIG. 19A.

FIG. 19A is a view in which the base 13 is eliminated from FIG. 18B to show clearly positional relationship between the hooks 6, the actuators 16 and the guide 14 which are important elements in the present invention. On the other hand, FIG. 19B is a view showing the same state as in FIG. 19A taken from the bottom side of the base 13. The shown elements are in the state before actuation of the hooks 6, wherein the actuators 16 protrude in the forward direction of the picker 4 (or in a protruding condition) due to urging force of the springs 18. On the other hand, though the hooks 6 are urged in the closing direction by the springs 10, the hooks 6 are opened because the pins 7 are placed at the shown position in the L-shaped grooves 17a provided in the actuators 16(at the shorter side of the L-shape).

Just as in the embodiment described above, when the motor 1 starts to revolve in the direction to advance the picker 4, the driving force of the motor 1 is transferred to the coupling portion 5 via the reduction gear mechanism 2 and the driving belt 3, and the picker 4 starts movement along the slide shafts 11. In this state, the actuators 16, the pins 7, the slide shafts 8 and the springs 10 and the like are moved to the left side of FIG. 19B.

As the picker 4 starts to move in the advancing direction due to the rotation of the motor 1, these elements are disposed in a relationship as shown in FIG. 20A. This positional relationship corresponds to the one in FIG. 11A in the embodiment described above. In the embodiment described above in which the actuators 16 are not provided, since the hooks 6 are "closed" in the initial state, the pins 7 are in contact with the tapered portions 14b of the guide 14, and, as the picker 4 advances further from this position, the pins 7 are moved along the tapered portions 14b and the hooks 6 that have been closed are opened gradually. On the other hand, in this embodiment, as the hooks 6 are "opened" in the initial state by the action of the L-shaped grooves 17a in the actuators 16, the pins 7 are not in contact with the tapered portions 14b of the guide 14.

Further, the cartridge 15 and the accommodating rack 19 for accommodating the cartridge 15 are also shown in FIG. 20A. Then, in this embodiment, actuator abutting surfaces 20 that are needed for operating the actuators 16 are provided at the front side of the cartridge accommodating rack 19.

As the picker 4 moves further, with the rotation of the motor 1, these elements are disposed in a relationship as shown in FIG. 20B. This positional relationship corresponds to the one in FIG. 11B in the embodiment described above. In this position, the hooks 6 are opened by the actuators 16, but in contact with the straight portions 14c of the guide 14.

Figure 21A:
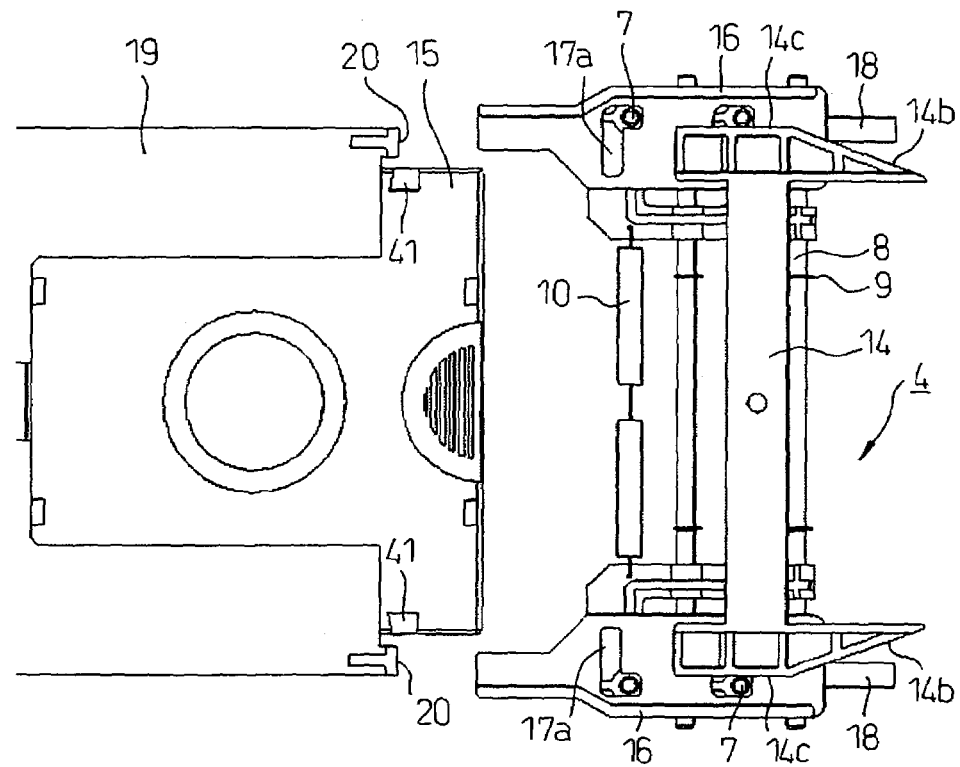
FIG. 21A is a bottom view showing a state in which the hooks advance further than in FIG. 20B, but the pins still remain on the straight portions of the guide.
Figure 21B:
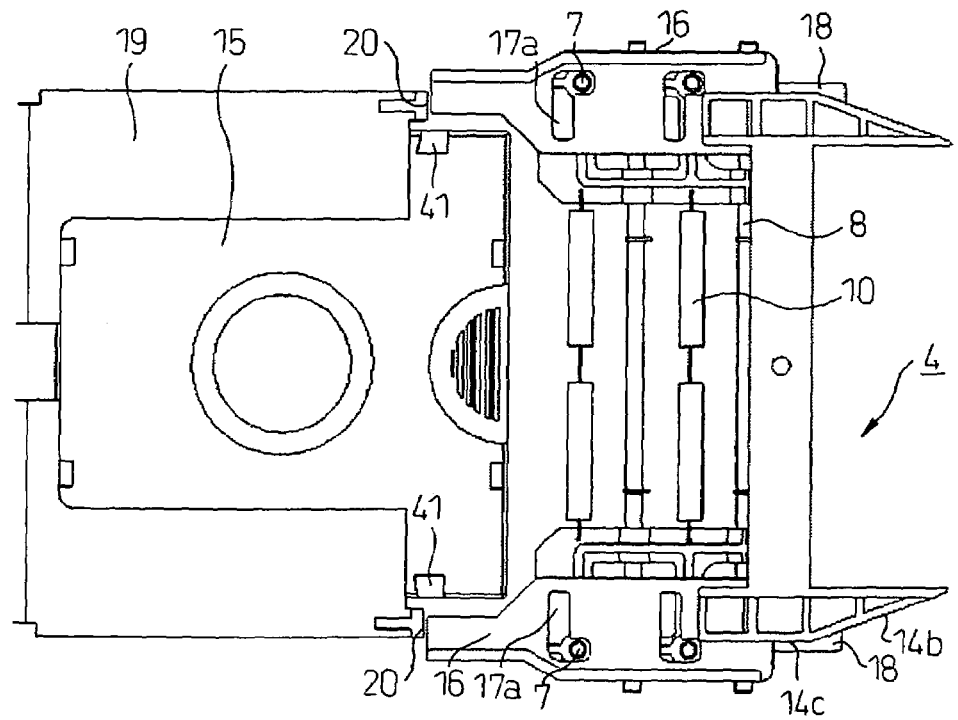
FIG. 21B is a bottom view showing a state in which the pins of the hooks has passed through the straight portions of the guide but the hooks still remain opened by the actuators.

As the picker 4 goes forward further due to the rotation of the motor 1, these elements are disposed in a relationship as shown in FIG. 21A. This positional relationship corresponds to the one in FIG. 12A in the embodiment described above. Here, as in the embodiment described above, the hooks 6 continue the movement while remaining open. As the picker 4 goes forward further, these elements are disposed in a relationship as shown in FIG. 21B. This positional relationship corresponds to the one in FIG. 12B in the embodiment described above. In the state without the actuators 16, the pins 7 are disengaged from the guide 14 completely, and the hooks 6 are closed due to the urging force of the springs 10. With the help of the urging force of the springs 10, the hooks 6 grasp the cartridge. But, in this embodiment, though the hooks 6 are urged in the closing direction by the springs 10, the hooks 6 still remain open since the pins 7 are placed at the shown position in the L-shaped grooves 17a in the actuators 16.

Figure 22A:
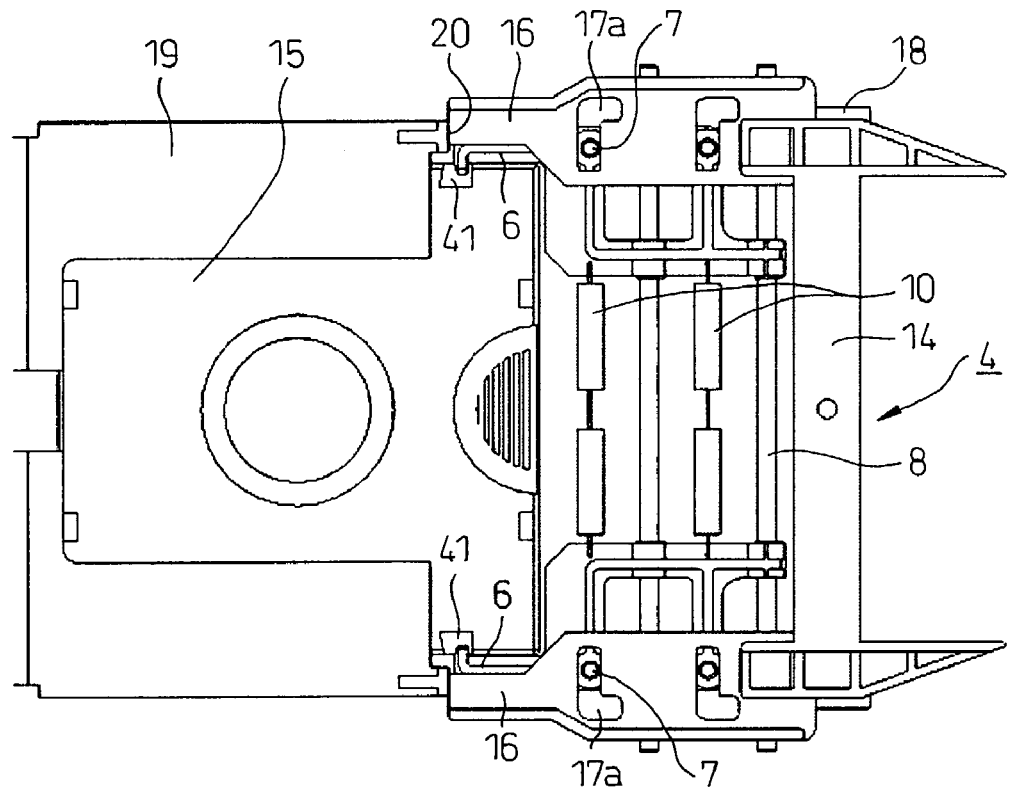
FIG. 22A is a bottom view showing a state in which tip portions of the actuators abut on a cartridge accommodating rack so that the pins of the hooks move in L-shaped grooves of the actuators and the hooks are closed to grasp the cartridge.

As the picker 4 moves further, with the rotation of the motor 1, these elements are disposed in a relationship as shown in FIG. 22A. In this position, tip portions of the actuators 16 abut on the actuator abutting surfaces 20 of the cartridge accommodating rack 19. In fact, the actuators 16 have already abutted on the actuator abutting surfaces 20 immediately before the position shown in FIG. 22A. At the moment when the actuators 16 abut on the actuator abutting surfaces 20, it becomes impossible for the actuators 16 to advance further. Therefore, after the actuators 16 abut on the actuator abutting surfaces 20, all elements included in the picker 4 excluding the actuators 16 advance further than the position shown in FIG. 22B.

Figure 22B:
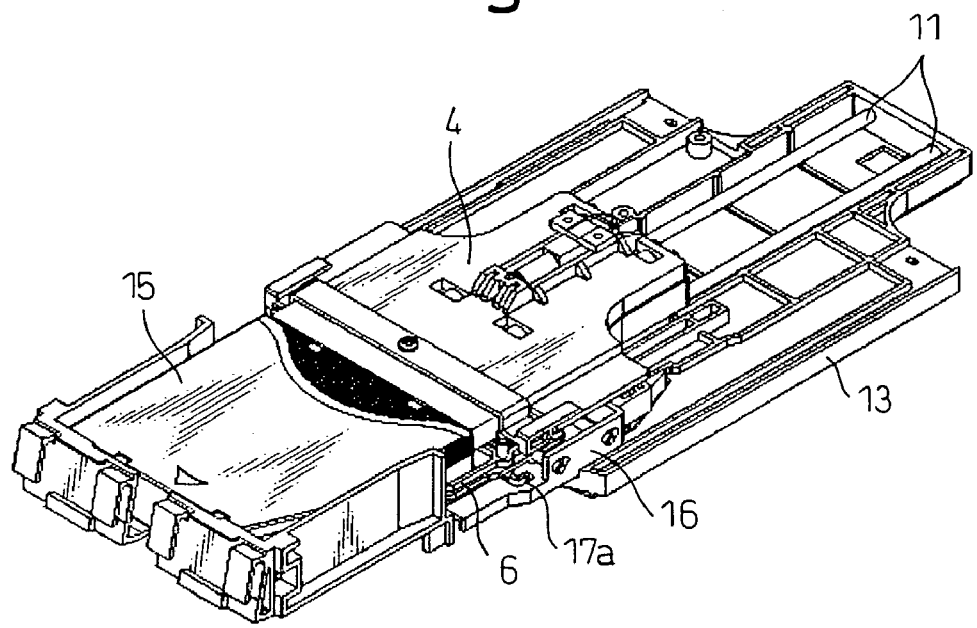
FIG. 22B is a perspective view showing a state in which the picker shown in FIG. 16 moves on the base to reach the same state as in FIG. 22A.

As all the elements included in the picker 4 excluding the actuators 16 advance further than the position shown in FIG. 22B, the springs 18 begin to be compressed, thus, all the elements included in the picker 4 excluding the actuators 16 advance as much as the springs 18 are compressed. Then, as the pins 7 are positioned in the grooves perpendicular to the moving direction of the pins 7 (in the longer side of the L-shaped grooves) due to the advance of all the elements included in the picker 4 excluding the actuators 16, the hooks 6 come to the state in which the hooks 6 are closed instantaneously due to the urging force of the springs 10 (in the state in FIG. 22A).

In fact, due to the urging force of the springs 10, the hooks 6 are closed at the position in which the hooks 6 advance further than in the state in FIG. 22A, or at the position in which the tips of the hooks 6 abut on the side of the cartridge 15. In this state, the picker 4 turns to the retreating movement. During the retreating movement, the picker 4 comes to the state shown in FIG. 22A, in which the hooks 6 are engaged with the indentations 41. It allows the dispersion of dimensional tolerances of the parts in the hooks 6 and the cartridge 15 in to and fro direction to be absorbed.

As a result, the cartridge 15 is grasped by the hooks 6. FIG. 22B shows this state from the same viewpoint as in FIG. 13.

As described above, in this embodiment in which the actuators 16 are added to the embodiment described before, if only the actuators 16 are configured to abut on the actuator abutting surfaces 20 of the cartridge accommodating rack 19 surely at the position where the pins 7 are disengaged from the guide 14 while allowing for the cumulative dispersion of dimensional tolerances, even when the distance between the robot hand 30 and the recording and reproducing device 50 or the distance between the robot hand 30 and the cartridge accommodating rack 19 differs in each apparatus due to the cumulative dispersion of dimensional tolerances, it is possible to allow the hooks 6 to perform the closing movement always at the fixed position and grasp the cartridge 15 securely.

Here, it is to be noted that operation of the guide 14 and the hooks 6 in the retreating movement of the cartridge 15 (in the "returning path") after the hooks 6 have grasped the cartridge 15 is similar to the one in the "returning path" in the embodiment described above since the actuators 16 are not concerned and the hooks 6 and the actuators 16 are kept in the state shown in FIG. 22A, and therefore the description of the operation in the "returning path" is omitted here.

Next, operation of the picker 4 to transport the cartridge 15 to the target cartridge accommodating rack 19 after the picker 4 draws the cartridge 15 onto the base 13 will be described.

Figure 23A:
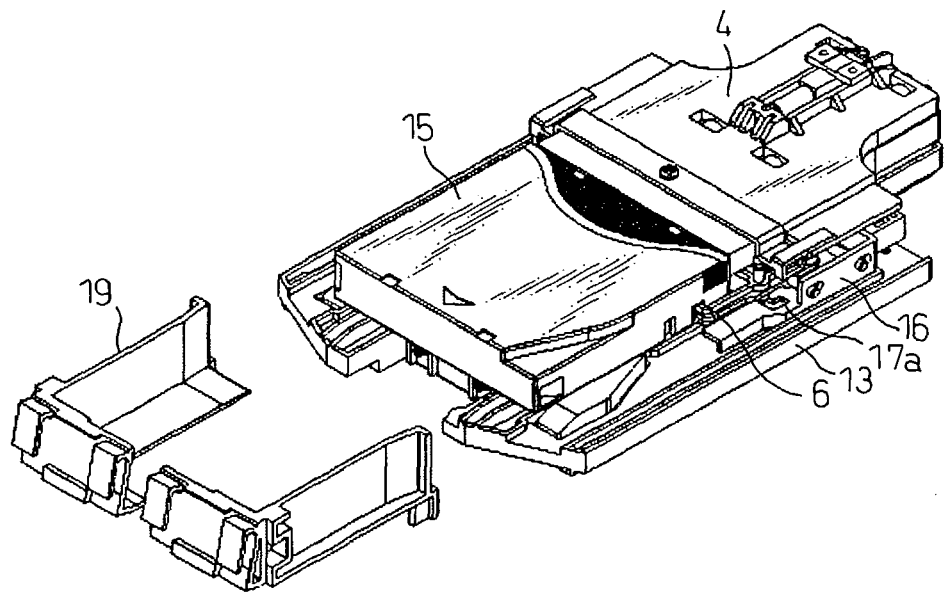
FIG. 23A is a perspective view showing a state in which the picker shown in FIG. 16 pulls the cartridge grasped by the hooks onto the base.
Figure 23B:
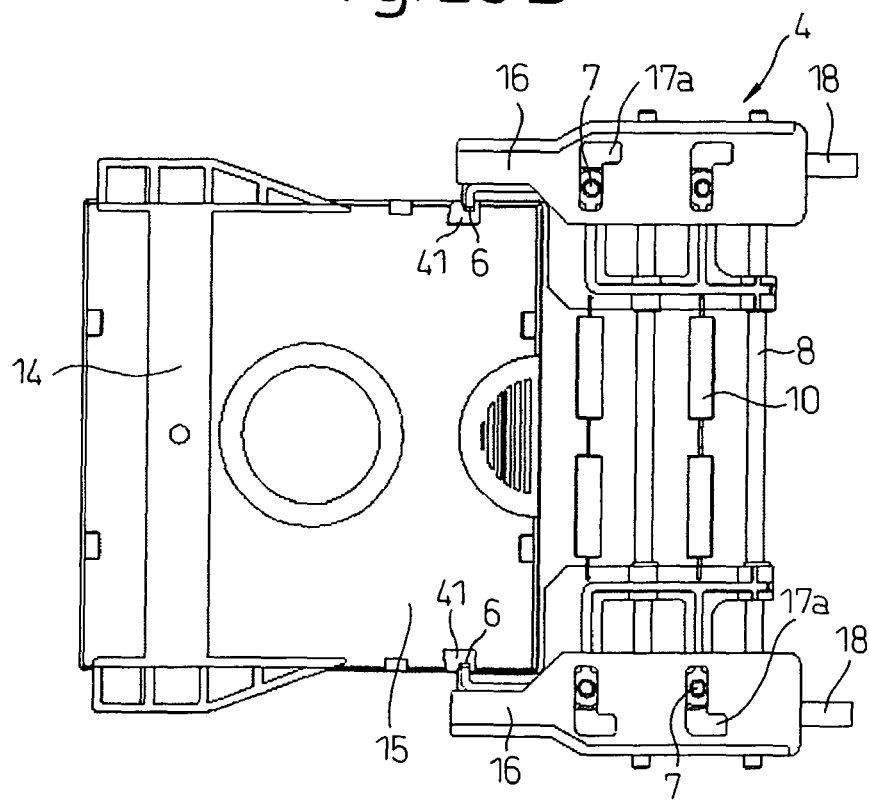
FIG. 23B is a bottom view taken from the bottom side of the hooks, the actuators and the cartridge shown in FIG. 23A.

FIG. 23A shows a state immediately after the cartridge 15 is drawn onto the base 13, and FIG. 23B is a view showing a positional relationship between the guide 14, the cartridge 15 and the picker 4 at this time taken from the bottom side of the base 13. In this state, the hooks 6 are closed to grasp the cartridge 15. Also, the actuators 16 still remain in the state of FIG. 22A.

Figure 24A:
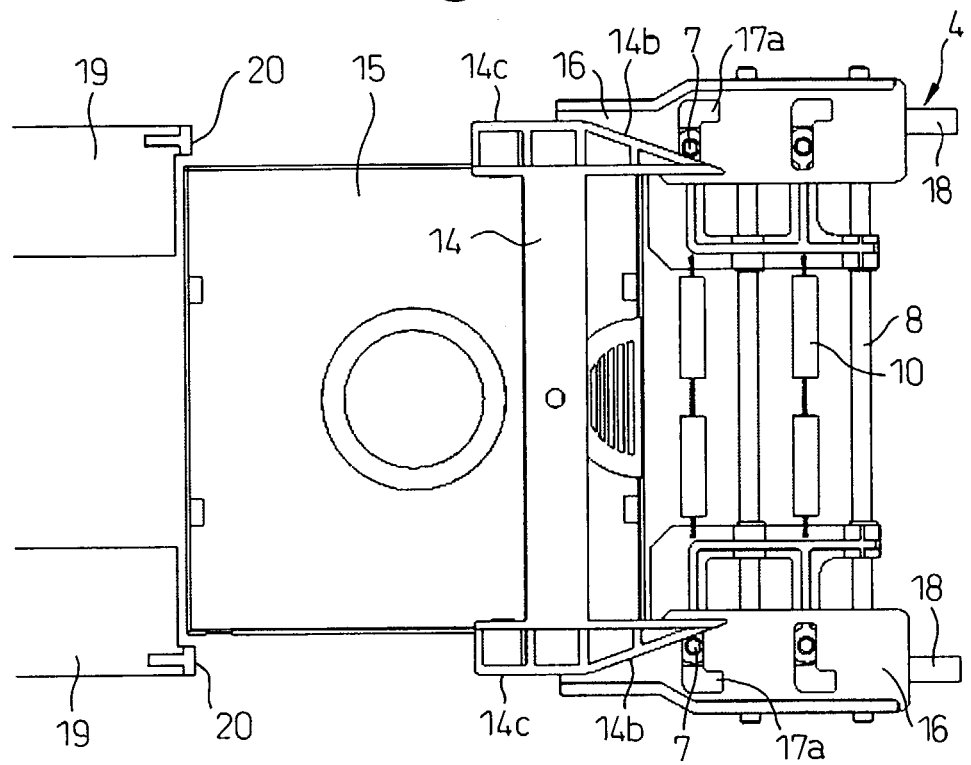
FIG. 24A is a bottom view describing a state in which the cartridge is returned to the accommodating rack from the state shown in FIG. 23B, wherein the pins for actuating the hooks are engaged with the tapered portions of the guide due to the movement of the picker.

As the picker 4 starts to move in the direction of the cartridge accommodating rack 19 due to the rotation of the motor 1, these elements are disposed in a relationship as shown in FIG. 24A. This positional relationship corresponds to the one in FIG. 11A in the embodiment described above. Just as in the embodiment described above, since the hooks 6 are "closed" in the initial state, the pins 7 are in contact with the tapered portions 14b of the guide 14, and as the picker 4 goes further from this position, the pins 7 are moved along the tapered portions 14b and the hooks 6 that have been closed are opened gradually.

Figure 24B:
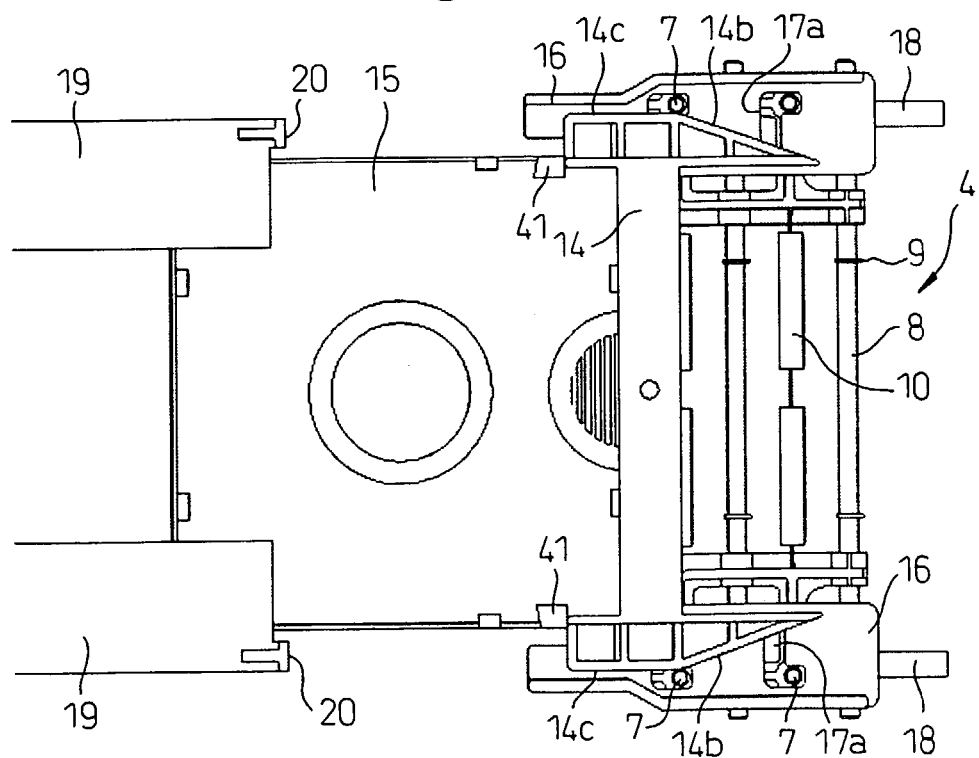
FIG. 24B is a bottom view showing a state in which the pins shown in FIG. 24A are engaged with the straight portions of the guide to open the hooks and the hooks in the opened state are held in the L-shaped grooves of the actuators.

As the picker 4 moves further with the rotation of the motor 1, these elements are disposed in a relationship as shown in FIG. 24B. This positional relationship corresponds to the one in FIG. 11B in the embodiment described above. The pins 7 go past the tapered portions 14b of the guide 14 and reach the straight portions 14c. The opening movement of the hooks 6 is completed at this stage. On the other hand, the pins 7 are positioned in the grooves in the same direction as the movement of the pins 7 of the L-shaped grooves 17a at this time. Then, the actuators 16 that are urged by the compression springs 18 are moved forward in the moving direction of the picker 4 instantaneously, and the hooks 6 are kept in the opened state by the L-shaped grooves 17a. At this time, the hooks 6 come to the state in which the cartridge 15 that was grasped is released completely.

In this state, though it seems that there is no means for holding the cartridge 15, since a part, several cm at the front side of the cartridge 15, is already inserted into the cartridge accommodating rack 19, the side walls, the top wall and the bottom wall of the cartridge accommodating rack 19 act as a guide (a holding means) for the cartridge 15, and therefore the attitude of the cartridge 15 will not be disturbed.

Figure 25A:
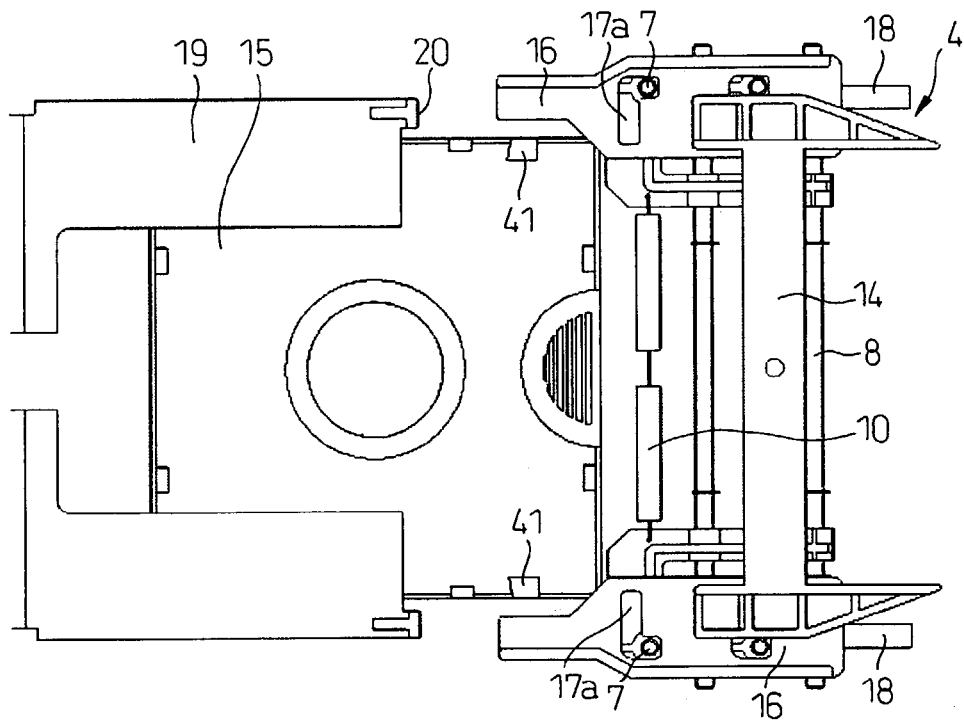
FIG. 25A is a bottom view showing a state in which the picker approaches the cartridge accommodating rack further than in the state shown in FIG. 24B.
Figure 25B:
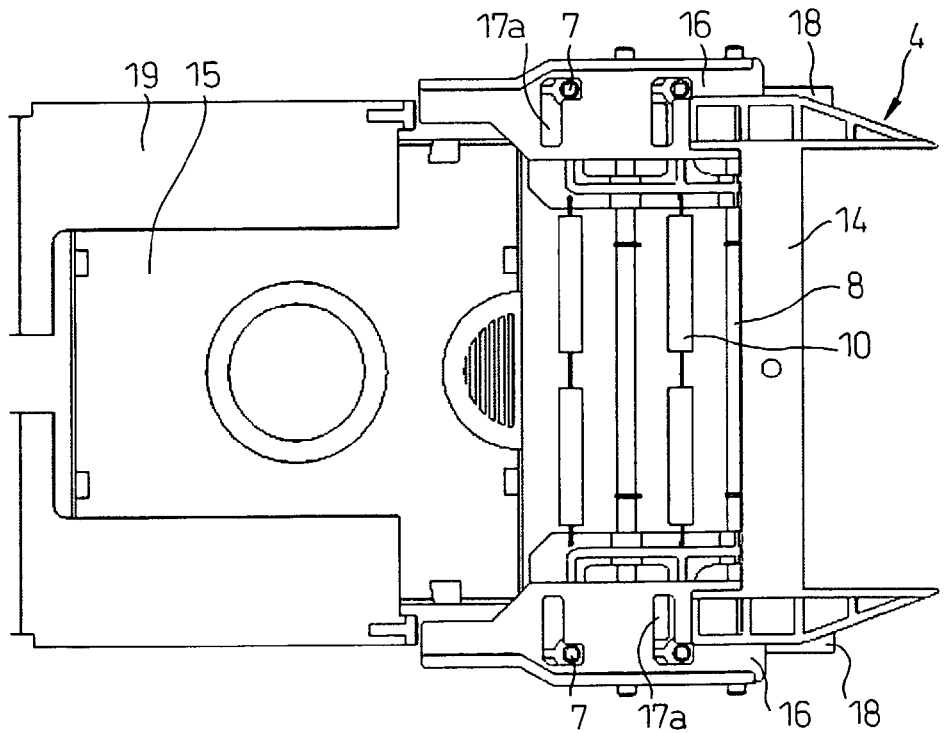
FIG. 25B is a diagram showing a state in which the tip portions of the actuators approach the accommodating rack just before the position where the tip portion abut on the rack.

Then, as the cartridge 15 is further inserted into the cartridge accommodating rack by being pushed by the picker 4, these elements are disposed in a relationship as shown in FIGS. 25A and 25B. The positional relationship shown in FIG. 25B corresponds to the one in FIG. 21B in this embodiment. The hooks 6 are urged in the closing direction by the springs 10, but as the pins 7 are placed at the shown position in the L-shaped grooves 17a, the hooks 6 are still kept in the opened state.

Here, when the cartridge 15 is returned to the cartridge accommodating rack 19, if the cartridge 15 remains in the current position with respect to the cartridge accommodating rack 19, the actuators 16 collide with the actuator abutting surfaces 20 of the cartridge accommodating rack 19, as a result of which the hooks 6 are closed to grasp the cartridge 15 again.

In order to solve this problem, when the cartridge 15 is returned to the cartridge accommodating rack 19, the picker 4 is configured so that almost all part of the cartridge 15 is disposed inside the cartridge accommodating rack 19 when the picker 4 advances up to the position shown in FIG. 25B and the cartridge 15 is moved along with the robot hand in the thickness direction of the cartridge 15 (for example, in either the upward or downward direction). On the other hand, the cartridge accommodating rack 19 is provided with indentations that are recessed more deeply than the actuator abutting surfaces 20 at a position in the thickness direction of the cartridge 15 (for example, above or below the surfaces 20). More specifically, the indentations are provided in the vicinity of the surfaces 20 as much as possible within a range where the picker 4 can push the cartridge 15, or within a range of the thickness dimension of the cartridge 15. The depth of the indentations is defined so that the actuators 16 do not collide with the indentations even when the picker 4 advances up to the position corresponding to FIG. 22A in this embodiment. After the cartridge 15 is moved along with the robot hand in the thickness direction of the cartridge 15 (for example in either upward or downward direction), the picker 4 is advanced up to the position corresponding to FIG. 22A to push the cartridge 15 into the cartridge accommodating rack 19.

Figure 26:
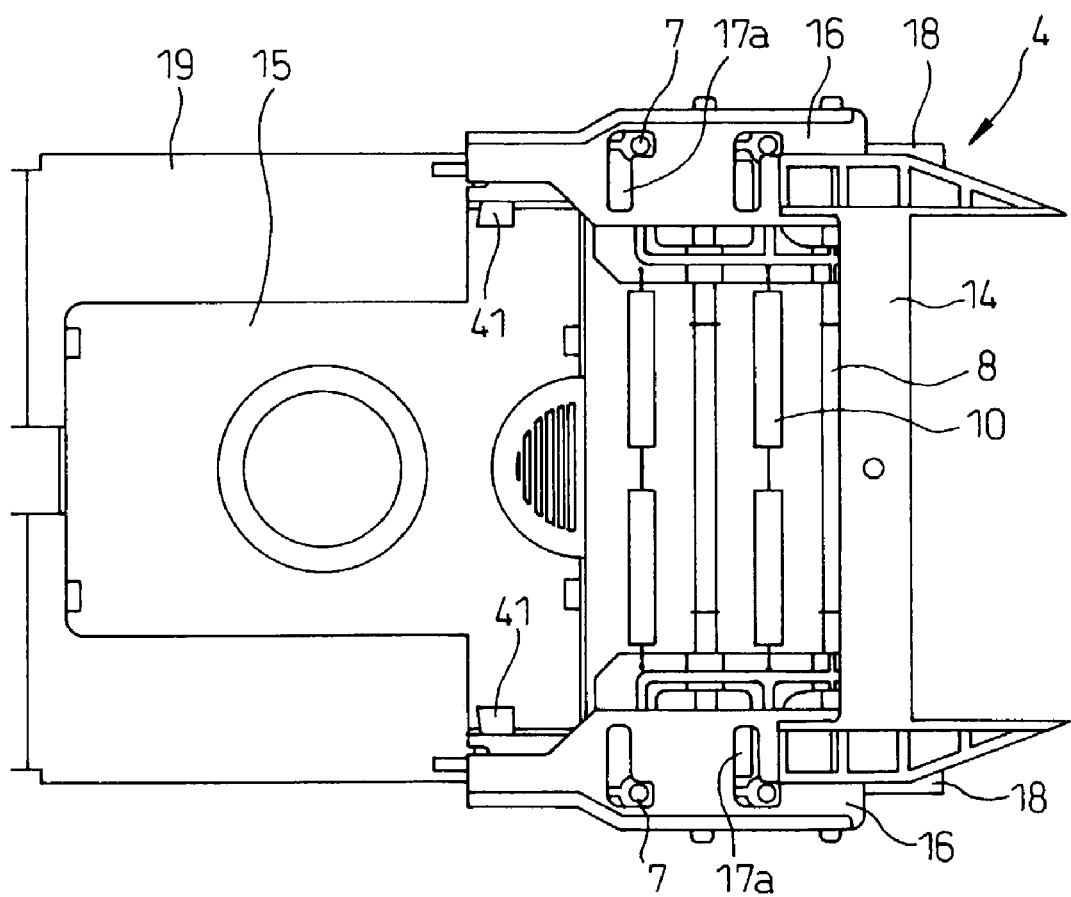
FIG. 26 is a bottom view showing a state in which the picker moves in vertical direction with respect to the accommodating rack and the cartridge is accommodated in the accommodating rack while the tip portions of the actuators do not abut on the accommodating rack.

FIG. 26 shows a state in which the cartridge 15 is pushed into the cartridge accommodating rack 19 by advancing the picker 4 up to the position corresponding to FIG. 22A after the robot hand is moved to the bottom side of the cartridge 15.

By controlling the robot hand as described above, when the cartridge 15 is inserted into the cartridge accommodating rack 19, the actuators 16 never collide with the actuator abutting surfaces 20 of the cartridge accommodating rack 19 and the hooks 6 are never closed to grasp the cartridge 15.

After the cartridge 15 is accommodated in the cartridge accommodating rack completely, the picker 4 is moved back straight to the positions shown in FIGS. 21B, 21A, 20B, 20A and 19B in sequence and, then, it reaches the initial state shown in FIG. 16. This action concludes the operation for accommodating the cartridge 15 in the cartridge accommodating rack 19.

However, the configuration to which the actuators 16 are added is not ready for insertion of the cartridge into all types of recording and reproducing devices, because it may have a problem in the following case. For example, though the library apparatus are usually developed so that recording and reproducing devices manufactured not only by the manufacturer of the library apparatus but also by other manufacturers can be mounted, it is difficult to provide the recording and reproducing devices of other manufacturers with the "the indentations for avoiding collision with the actuators 16 at specified positions of cartridge insertion apertures" because it may result in a higher cost. Further, as described above, the magnetic tape cartridges may be broadly divided into three types and insertion amounts into the recording and reproducing devices or the accommodating racks may differ depending on the types of the used cartridges, it is also difficult to provide the recording and reproducing devices and the accommodating racks with indentations that are suitable for all types of the cartridges.

In order to solve these problems, a mounter for adapting to various cartridge thrust amounts is provided according to a third embodiment of the present invention, the configuration and operation of which will be described hereinafter.

(3) [Overall Operation of the Robot Hand Including the Mounter Mechanism]

Figure 27A:
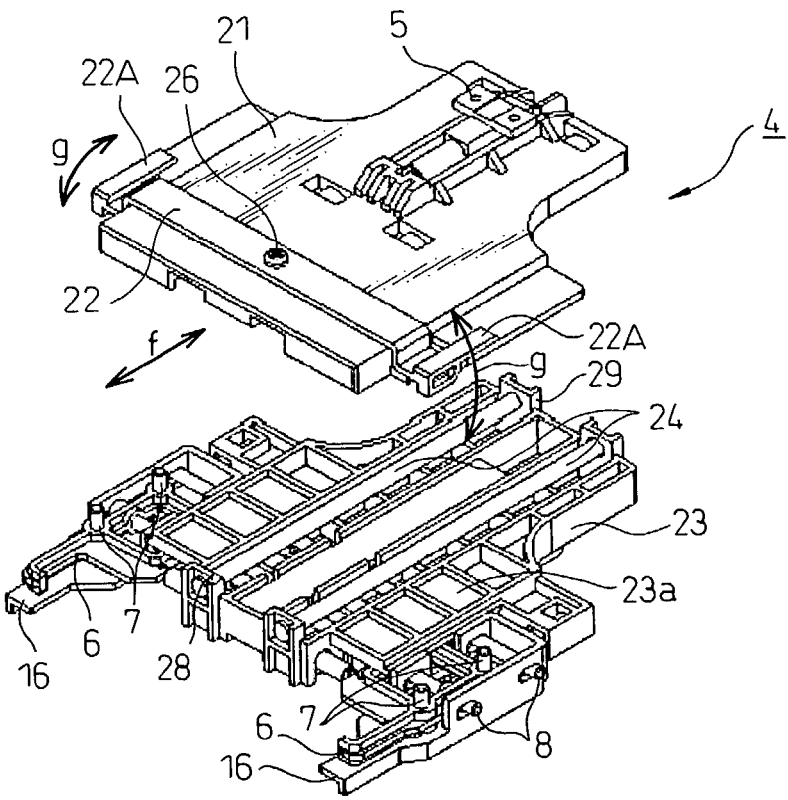
FIG. 27A is an exploded perspective view in which the picker is broken down into a mounter and a picker main body.
Figure 27B:
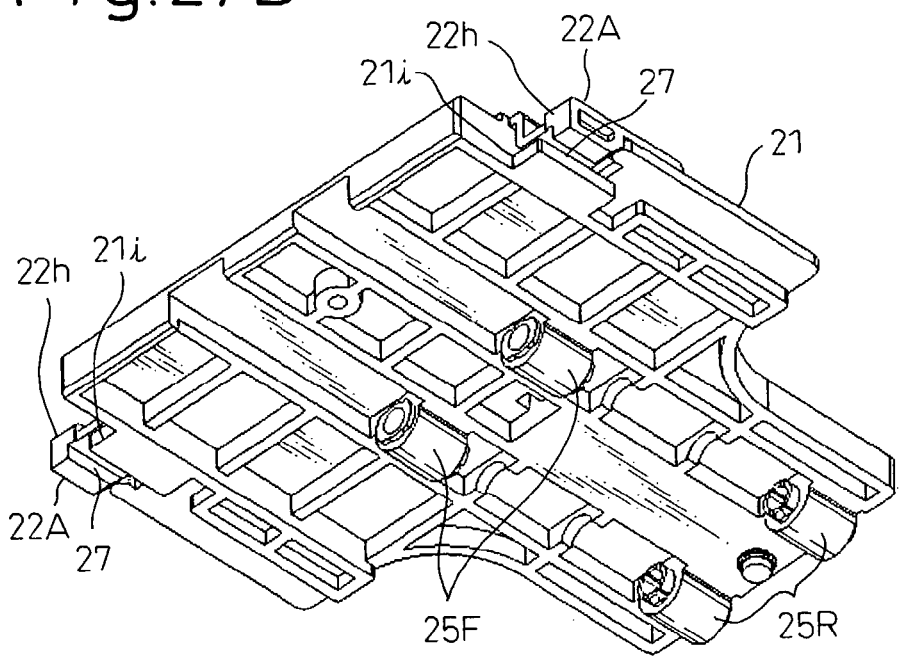
FIG. 27B is a perspective view taken from the bottom side of the mounter shown in FIG. 27A.

FIG. 27A is a view of the picker 4 shown in FIG. 17A in which the picker 4 is broken down into a mounter 21 and a picker main body 23, and FIG. 27B is a view of the mounter 21 taken from the bottom side. The picker main body 23 is a part to which the members described above such as the hooks 6, the pins 7, the slide shafts 8, the stoppers 9, the springs 10, the coupling portions 12 through which the slide shafts 11 are inserted, the actuators 16 and the springs 18 are attached. A middle bottom part 23a is provided at the upper side of these members of the picker main body 23 and on the middle bottom part 23a, another two slide shafts 24 are provided in the direction orthogonal to the slide shafts 8. Further, a leaf spring 22 is attached to the top side of the mounter 21 by a screw 26 and guide members 22A for the pins 7 are provided at both sides of the leaf spring 22.

These guide members 22A play an important role in operational relationship of the mounter 21 with the hooks 6 and the pins 7. These guide members 22A can oscillate due to elastic force of the leaf spring 22 in the direction of an arrow g. On the other hand, the back of the mounter 21 is provided with coupling portions 25 (front coupling portions 25F and rear coupling portions 25R) through which two slide shafts 24 provided on the middle bottom part 23a of the picker main body 23 are inserted. Then, the mounter 21 is attached to the picker main body 23 while the slide shafts 24 are inserted through the coupling portions 25. When the mounter 21 overlaps the picker main body 23, the rear coupling portions 25R abut on an inner wall 29 at the rear side of the picker main body 23. The mounter 21 can advance along the slide shafts 24 in the direction of an arrow f from this position to the position where the front coupling portions 25F abut on an inner wall 28 at the front side of the picker main body 23.

Figure 28A:
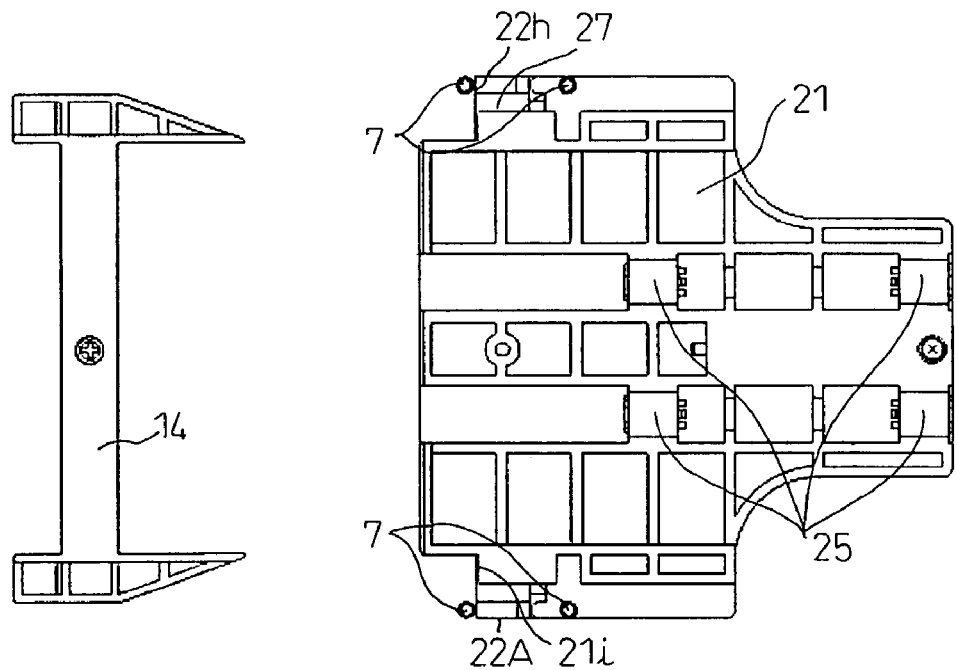
FIG. 28A is a bottom view showing relationship between the mounter and the pins of the hooks in the same position as in FIG. 19A.

FIG. 28A is a view showing relationship between the mounter 21 and the pins 7 of the hooks 6 in the same position as in FIGS. 19A and 19B taken from the bottom side. In this figure, the hooks 6 and the actuators 16 are not shown, and only the positions of the pins 7 and the guide 14 relative to the mounter 21 and the guide members 22A are shown. This is a state before hooks 6 are actuated wherein the hooks 6 are opened by the effect of the L-shaped grooves 17 of the actuators 16.

In this embodiment, a driving force of the motor 1 is transferred to the reduction gear mechanism 2, the driving belt 3, the coupling portion 5, the mounter 21, the leaf spring 22 and the guide members 22A in sequence. Then, as seen from the positional relationship between the guide members 22A provided on the leaf spring 22 and the pins 7, the picker main body 23 as well as the hooks 6 and the actuators 16 are moved when the guide members 22A push the pins 7.

Figure 28B:
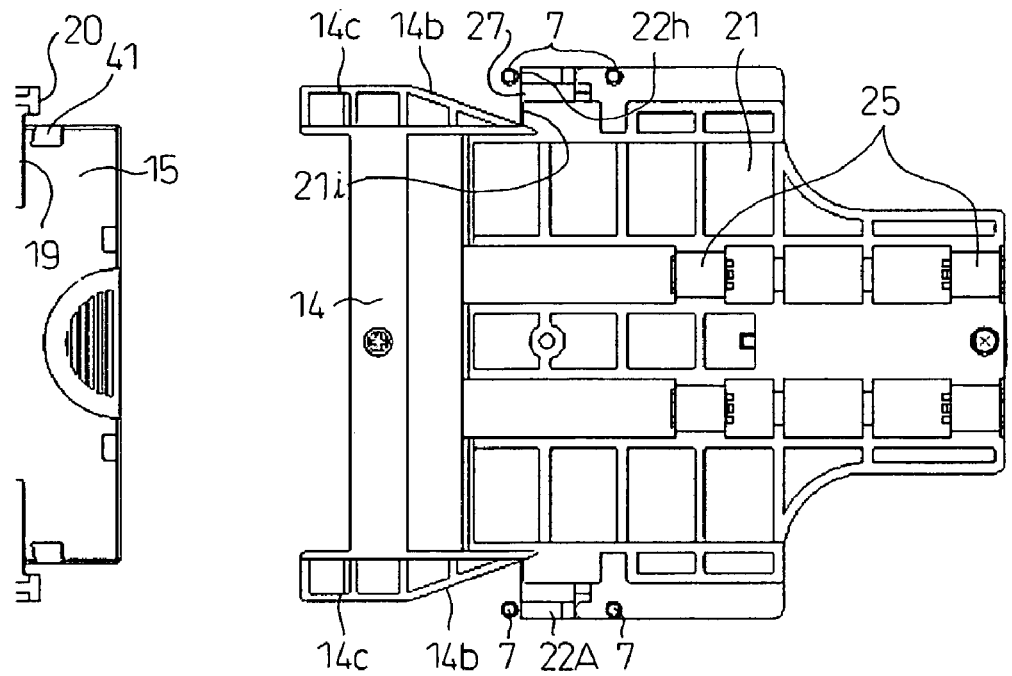
FIG. 28B is a bottom view showing the relationship between the mounter and the pins of the hooks in the same position as in FIG. 20A.

As the picker 4 starts to advance from the position in FIG. 28A due to the rotation of the motor 1, the elements are disposed in a relationship as shown in FIG. 28B. This positional relationship corresponds to the one in FIG. 22A in the embodiment using the actuators 16. Also in this embodiment, as the hooks 6 are "opened" in the initial state just as in FIG. 20A, the pins 7 are not in contact with the tapered portions 14b of the guide 14. The cartridge accommodating rack 19 is also shown here.

Figure 29A:
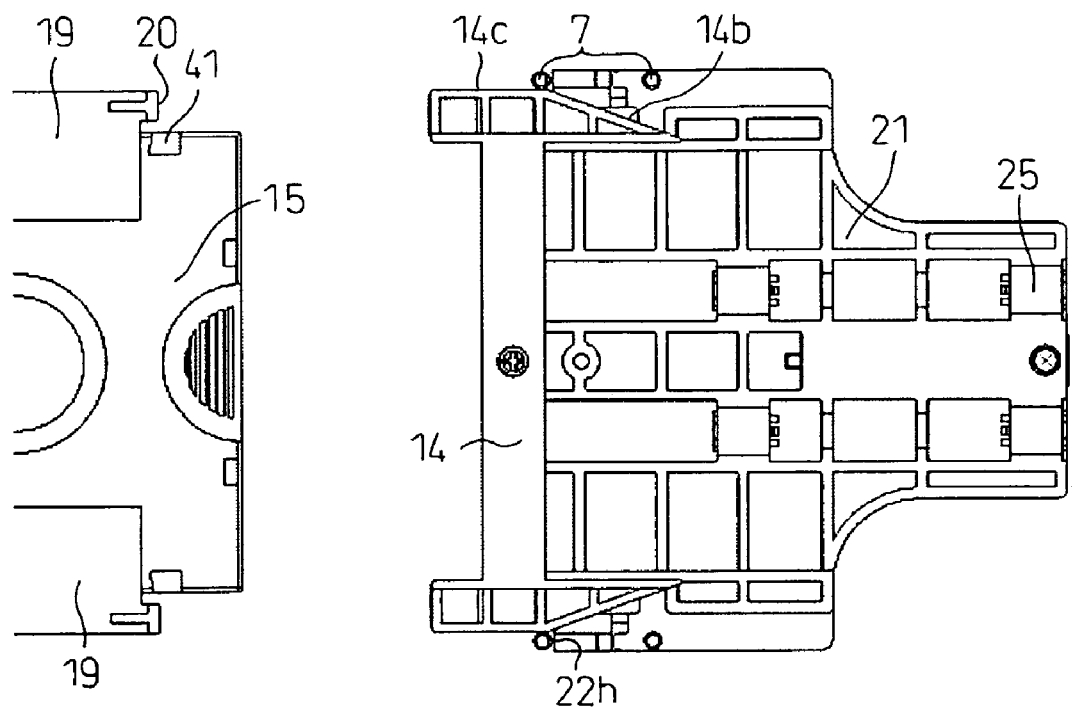
FIG. 29A is a bottom view showing the relationship between the mounter and the pins of the hooks in the same position as in FIG. 20B.
Figure 29B:
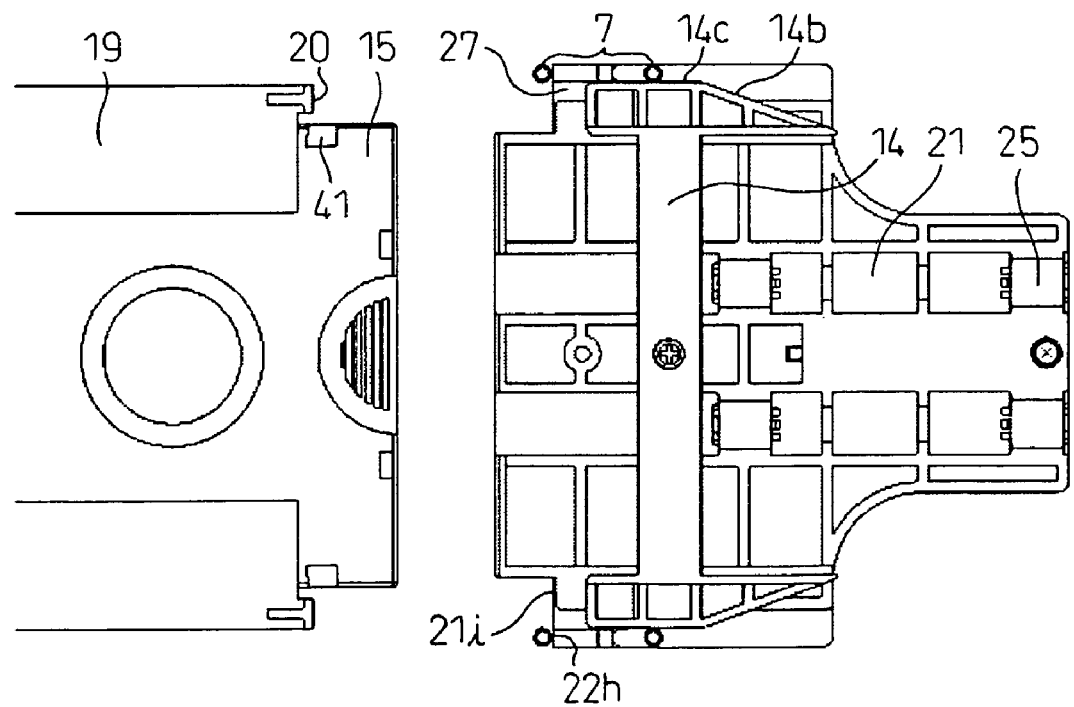
FIG. 29B is a bottom view showing the relationship between the mounter and the pins of the hooks in the same position as in FIG. 21A.

As the picker 4 moves further with the rotation of the motor 1, the elements are disposed in a relationship as shown in FIG. 29A. This positional relationship corresponds to the one in FIG. 20B in the embodiment using the actuators 16. Here, the hooks 6 are opened by the actuators 16, and further, the pins 7 are in contact with the straight portions 14c of the guide 14. As the picker 4 goes further due to the rotation of the motor 1, the elements are disposed in a relationship as shown in FIG. 29B. This positional relationship corresponds to the one in FIG. 21A in the embodiment using the actuators 16. Here, the hooks 6 are still opened, and the picker 4 further continues to move while the pins 7 are still in contact with the straight portions of the guide 14.

Figure 30A:
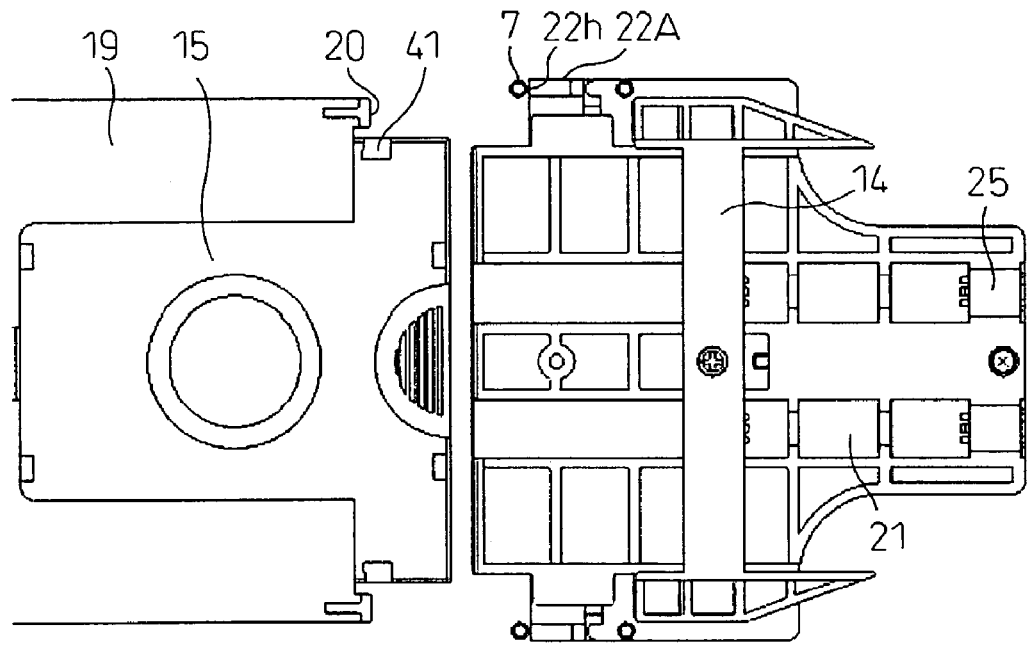
FIG. 30A is a bottom view showing the relationship between the mounter and pins of the hooks in the same position as in FIG. 21B.

As the picker 4 goes further with the rotation of the motor 1, the elements are disposed in a relationship as shown in FIG. 30A. This positional relationship corresponds to the one in FIG. 21B in the embodiment using the actuators 16. In the first embodiment without the actuators 16, the pins 7 are disengaged from the guide 14 completely and the hooks 6 are closed due to the urging force of the springs 10. But, since the actuators 16 are used also in this embodiment, the hooks 6 still remain open.

Figure 30B:
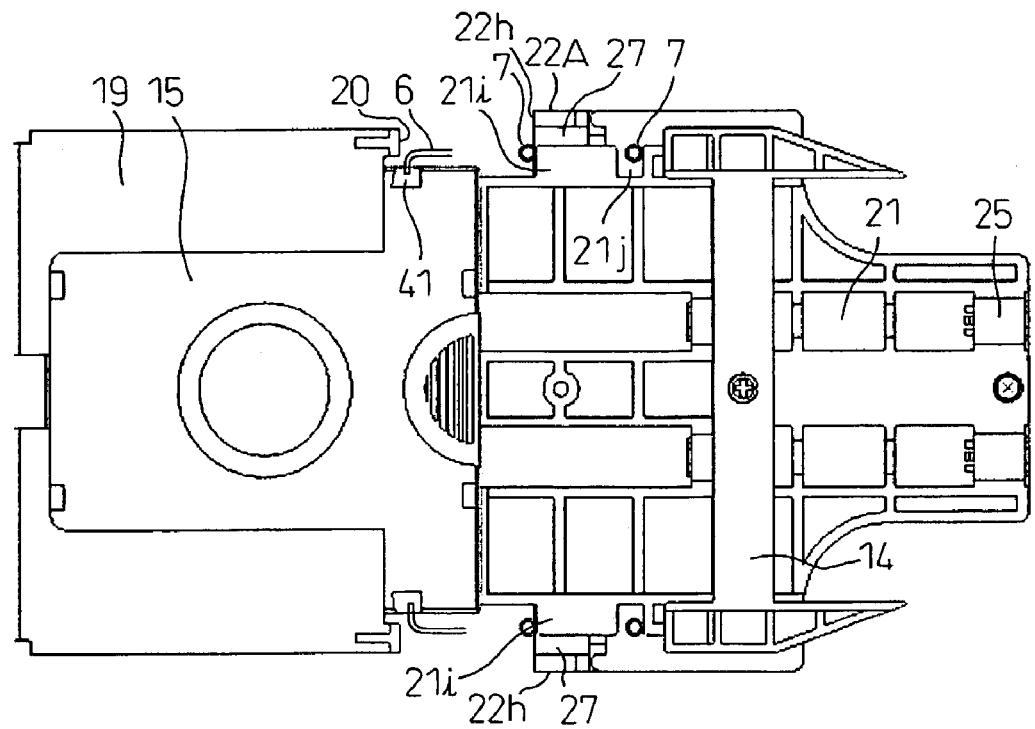
FIG. 30B is a bottom view showing the relationship between the mounter and the pins of the hooks and engagement of the hooks with the cartridge in the same position as in FIG. 22.

As the picker 4 goes further, the elements are disposed in a relationship as shown in FIG. 30B. This positional relationship corresponds to the one in FIG. 22A in the embodiment using the actuators 16. Thus, the advance of the actuators 16 is stopped by the actuator abutting surfaces 20 of the cartridge accommodating rack 19 and the hooks 6 are closed as a result of movement of the pins 7 in the L-shaped grooves 17a in this state. At this time, the pins 7 are disengaged from pin abutting surfaces 22h of the guide members 22A which the pins 7 have been pressed on (have been in contact with) hitherto. However, in this state, the pins 7 at the front side are now in contact with pin abutting surfaces 21i of the mounter 21 and the pins 7 at the rear side are inserted into indentations 21j provided on the mounter 21. In the state shown in FIG. 30B, the hooks 6 are closed to grasp the cartridge 15. This state is also shown in FIG. 22B.

Hereinabove, a mechanism for grasping the cartridge 15 by the hooks 6 when the mounter 21 is used in addition to the actuators 16 has been described. Here, it is to be noted that operation of the guide 14, the hooks 6 and the pins 7 in the retreating movement of the cartridge 15 (in the "returning path") after the cartridge 15 has been grasped is similar to the one in the "returning path" in the first embodiment and the mounter 21, the guide members 22A of the leaf spring 22 and the pins 7 remain in the state shown in FIG. 30B through this stage, and therefore the description of this operation is omitted.

Next, the operation to insert the cartridge 15 into the target cartridge accommodating rack 19 after the cartridge 15 is drawn onto the base 13 will be described.

The state immediately after the cartridge 15 is drawn onto the base 13 is shown in FIG. 23A. At this time, hooks 6 are closed to grasp the cartridge 15. Therefore, the cartridge 15 never escapes from the base 13. On the other hand, the actuators 16 remain in the state of FIG. 30B or FIG. 23B. Therefore, the pins 7 at the front side are in contact with the pin abutting surfaces 21i of the mounter 21 and the pins 7 at the rear side are disposed in the indentations 21j.

Figure 31A:
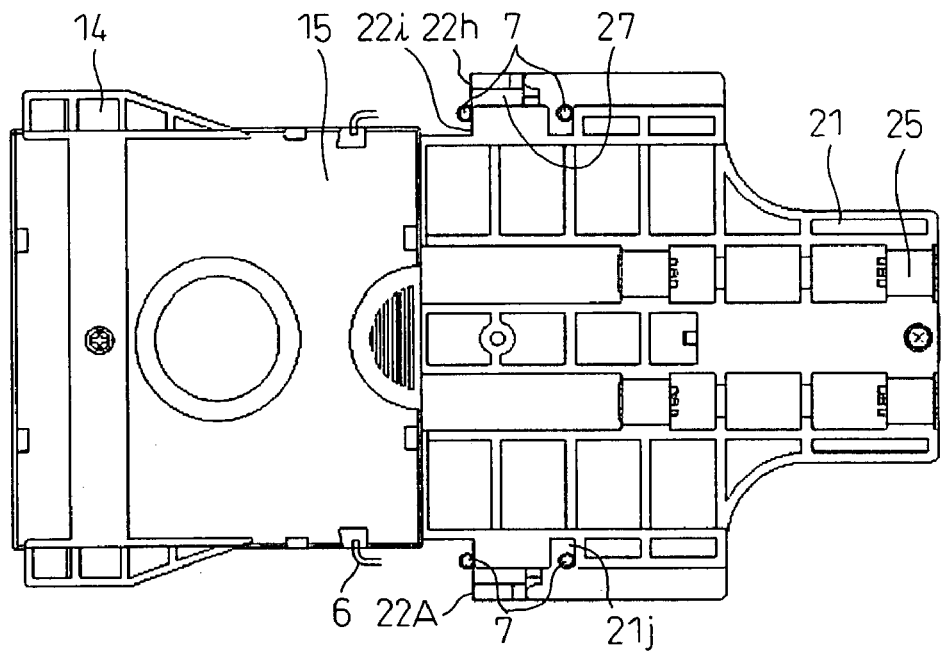
FIG. 31A is a bottom view showing the relationship between the mounter, the pins of the hooks, the cartridge and the guide in the same position as in FIG. 23B.

FIG. 31A shows only the pins 7, the guide 14, the cartridge 15, the mounter 21 and the guide members 22A of the leaf spring 22 as well as portions of the hooks 6 in the same state as in FIG. 23B. In this state, as shown in FIGS. 2A and 2B, by moving the robot hand in the vertical direction (an arrow A), in the width direction (an arrow B) and in the rotation direction (an arrow C), the cartridge can be moved to an arbitrary position.

Hereinafter, with reference to FIGS. 31A–34B, operation of the pins 7 and the mounter 21 when the picker 4 inserts the cartridge 15 into the target cartridge accommodating rack 19 will be described.

Figure 31B:
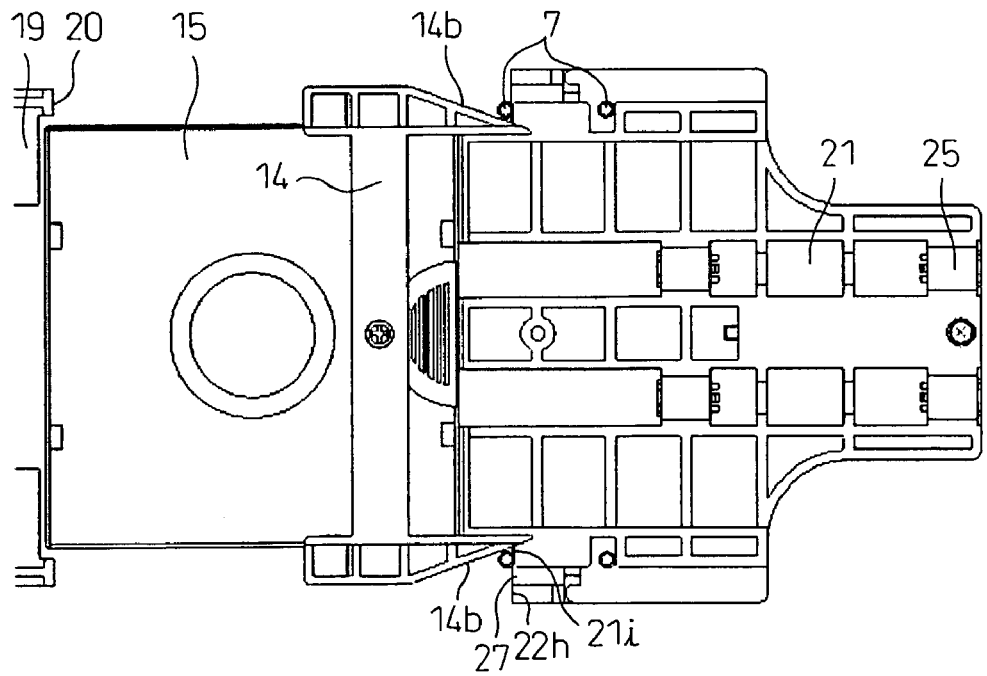
FIG. 31B is a bottom view showing the relationship between the mounter, the pins of the hooks, the cartridge and the guide in the same position as in FIG. 24A.

As the motor 1 starts to revolve in the direction to advance the picker 4 and the picker 4 starts to move from the state in FIG. 31A, the pins 7 are pushed by the pin abutting surfaces 21i (or the indentations 21j) of the mounter 21 to achieve a state shown in FIG. 31B. This positional relationship corresponds to the one in FIG. 24A in the embodiment using the actuators 16 wherein the cartridge 15 approaches the cartridge accommodating rack 19. As described above, as the hooks 6 have been "closed" in the initial state, the pins 7 are in contact with the tapered portions 14b of the guide 14 at this position, and as the picker 4 goes further from this position, the pins 7 are moved along the tapered portions 14b and the hooks 6 that have been closed are opened gradually.

Figure 32A:
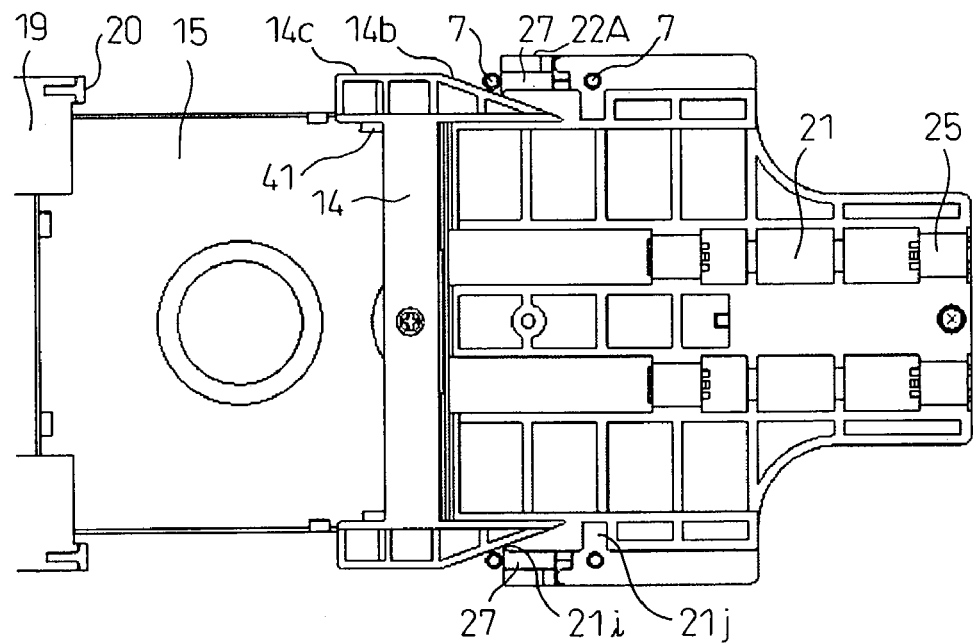
FIG. 32A is a bottom view showing a state in which the picker approaches the accommodating rack further than in the state shown in FIG. 31B, wherein the pins of the hooks that has been pressed by the mounter are now inserted into the grooves on the mounter and not pressed by the mounter.

As the picker 4 goes further due to the rotation of the motor 1, the elements are disposed in a relationship as shown in FIG. 32A. This is the state during the opening movement of the hooks 6, wherein a front end portion of the cartridge 15 is pushed into the cartridge accommodating rack 19 partially. Due to the subsequent rotation of the motor 1, the portion of the cartridge 15 is pushed further into the cartridge accommodating rack 19. As the motor 1 continues to revolve, the picker 4 advances further and, consequently, the pins 7 at the front side are disengaged from the pin abutting surfaces 21i of the mounter 21 before the hooks 6 are opened completely and the pins 7 at the rear side are withdrawn from the indentations 21j, while the pins 7 at the front side reach the position where grooves 27 are disposed between the mounter 21 and the guide members 22A. At this position, as the pins 7 are not pushed by the mounter 21, only the mounter 21, to which the urging force of the motor 1 is transferred, directly advances.

Thus, though the picker main body 23 (in FIG. 32A, it is disposed at the position where it is engaged with the coupling portions 25 but not shown) has been moved hitherto by being pushed by the pin abutting surfaces 21i (or the indentations 21j) of the mounter 21, at the moment when it comes in the state shown in FIG. 32A, the pins 7 fit into the grooves 27 of the mounter 21 and already are not pushed by the mounter 21, and therefore the picker main body 23 stops movement once at this time.

Figure 32B:
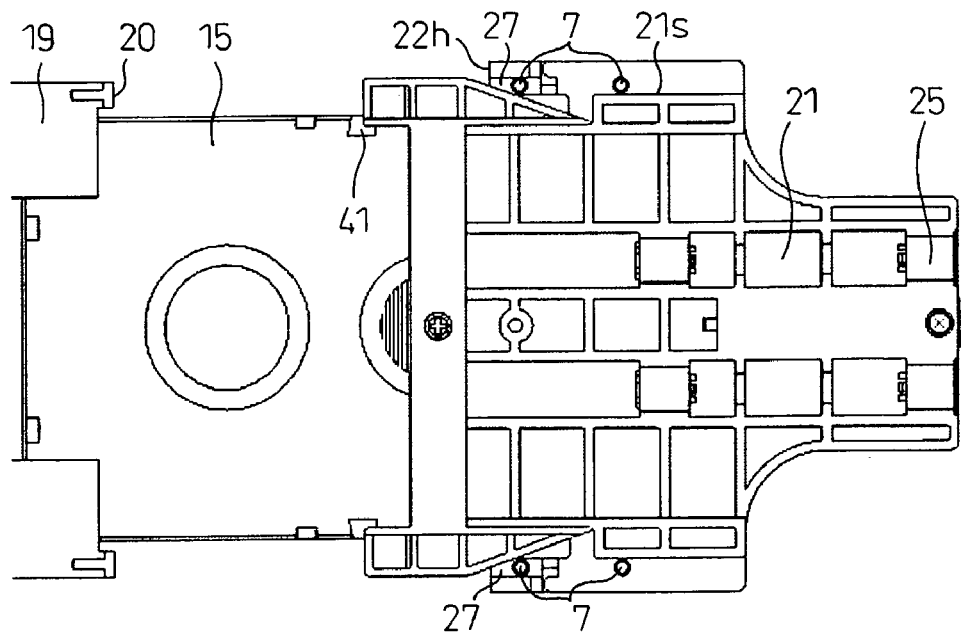
FIG. 32B is a bottom view showing a state in which only the mounter approaches the accommodating rack while pushing the cartridge after the state shown in FIG. 32A.

As the driving force from the motor 1 is still transferred to the mounter 21 continuously after that, only the mounter 21 advances as shown in FIG. 32B (it can be seen that the picker main body 23 is not moved from the fact that the pins 7 remain in the same position as in FIG. 32A.) At this time, the pins 7 at the front side are disposed in the grooves 27 while the other two pins 7 are disposed on surfaces 21s of the mounter 21. On the other hand, at the position shown in FIG. 32A, the hooks 6 come into a state in which the cartridge 15 that has been grasped is released completely. At the same time, the mounter 21 comes into a state in which it goes further while pushing the cartridge 15 that has been disengaged from the hooks 6. After that, even if the mounter 21 advances, the hooks 6 are never closed since the two pins are disposed on the side surfaces 21s of the mounter 21.

Figure 33A:
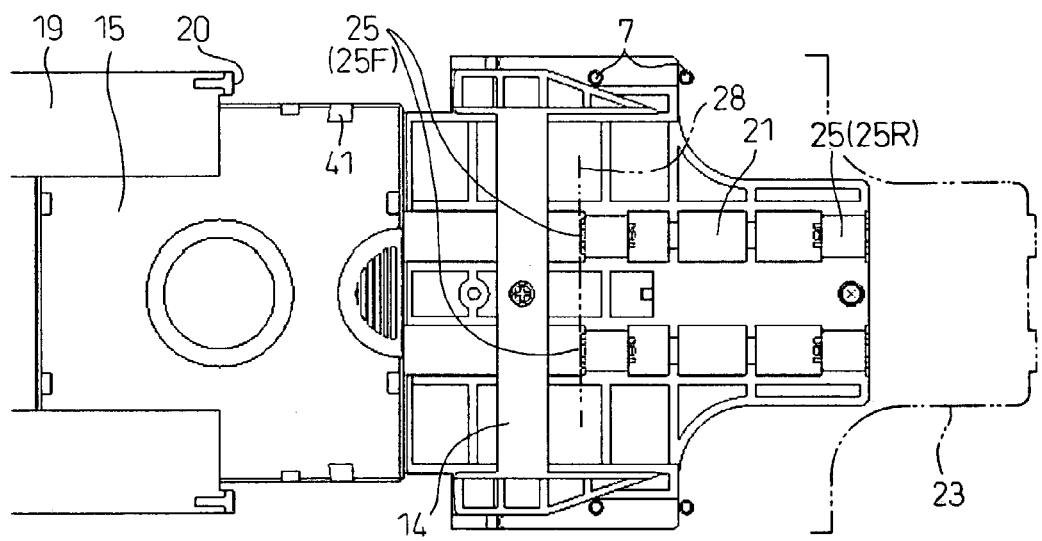
FIG. 33A is a bottom view showing a state in which the mounter that has been moved with respect to the picker main body abuts on an inner wall at the front side of the picker main body to stop the movement.

As the mounter 21 moves further due to the rotation of the motor 1, the elements are disposed in a relationship as shown in FIG. 33A. In this positional relationship, the mounter 21 has been moved to the limit of the length of the slide shafts 11 that are not shown, and front surfaces of the coupling portions 25F provided on the mounter 21 abut on the inner surface 28 of the picker main body 23. At this position, the mounter 21 protrudes forward more than the position of the picker main body 23 indicated by a chain double-dashed line. Thereafter, the inner wall 28 of the picker main body 23 is pushed by the coupling portions 25 of the mounter 21 so that the picker main body 23 starts to move again along with the mounter 21.

Figure 33B:
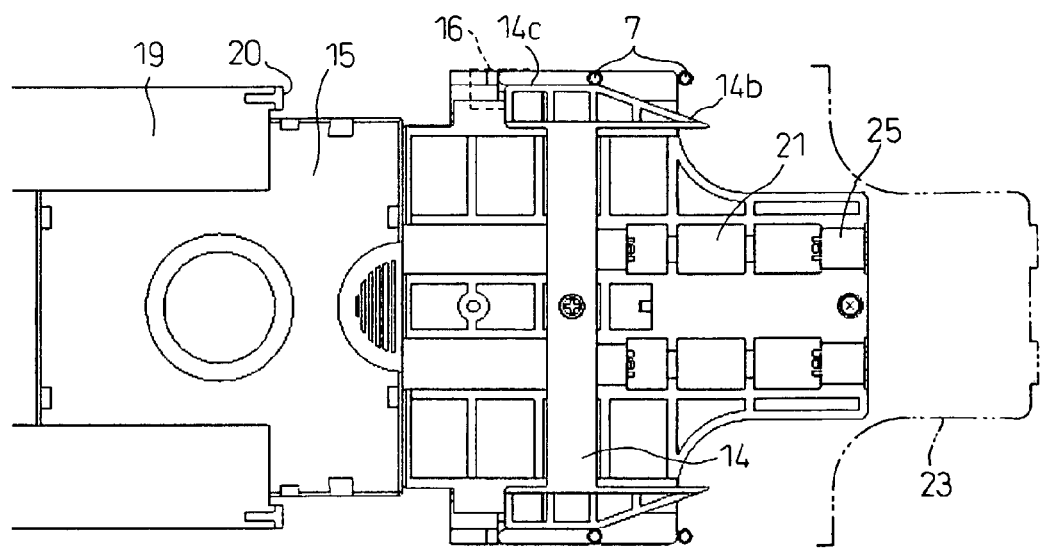
FIG. 33B is a bottom view showing a state in which the hooks are moved with the mounter so that the pins of the hooks reach the straight portions of the guide.

While the mounter 21 protrudes forward from the picker main body 23, as the picker 4 goes forward further due to the rotation of the motor 1, the elements are disposed in a relationship as shown in FIG. 33B. The pins 7 that have started to move pass through the tapered portions 14b of the guide 14 at this position and reach the straight portions 14c. Thus, as described above, the hooks 6 (not shown) are opened completely here. Here, with regard to only the pins 7 (the hooks 6) and the actuators 16, the positional relationship between these elements is same as the one shown in FIG. 24B. However, in this state, the front end portion of the mounter 21 is nearer to the cartridge accommodating rack 19 than the tip portions of the actuators 16 indicated by a broken line, and the tip portions of the actuators 16 are apart from the rear end portion of the cartridge 15 by a predetermined distance.

Figure 34A:
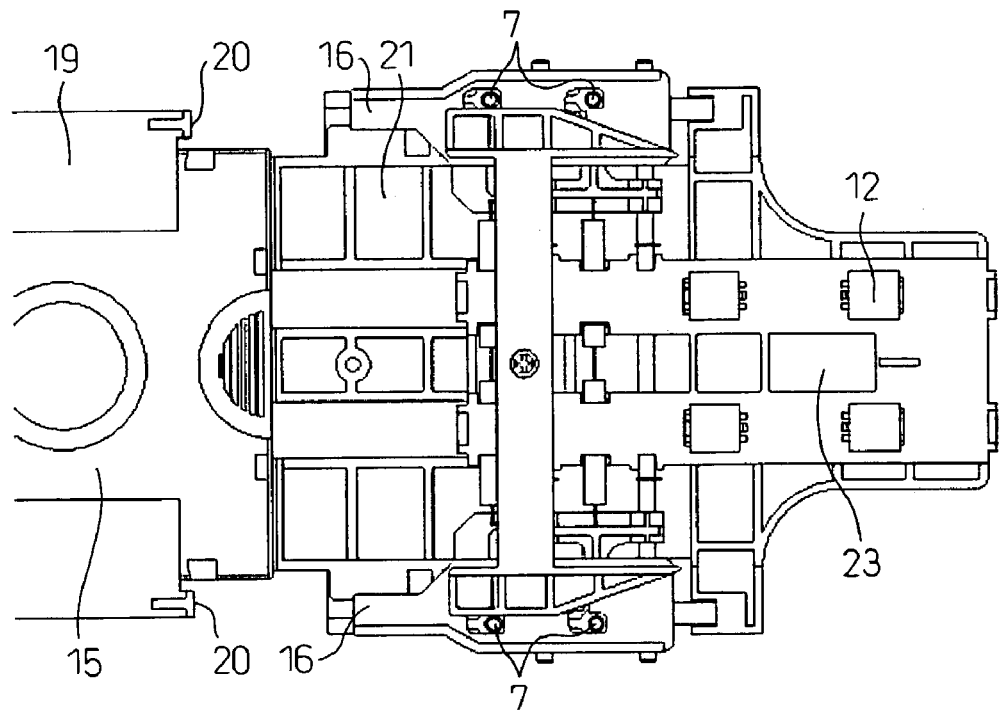
FIG. 34A is a bottom view showing a state of the cartridge that is pushed by the mounter and inserted into the accommodating rack completely along with the actuators and the picker main body.
Figure 34B:
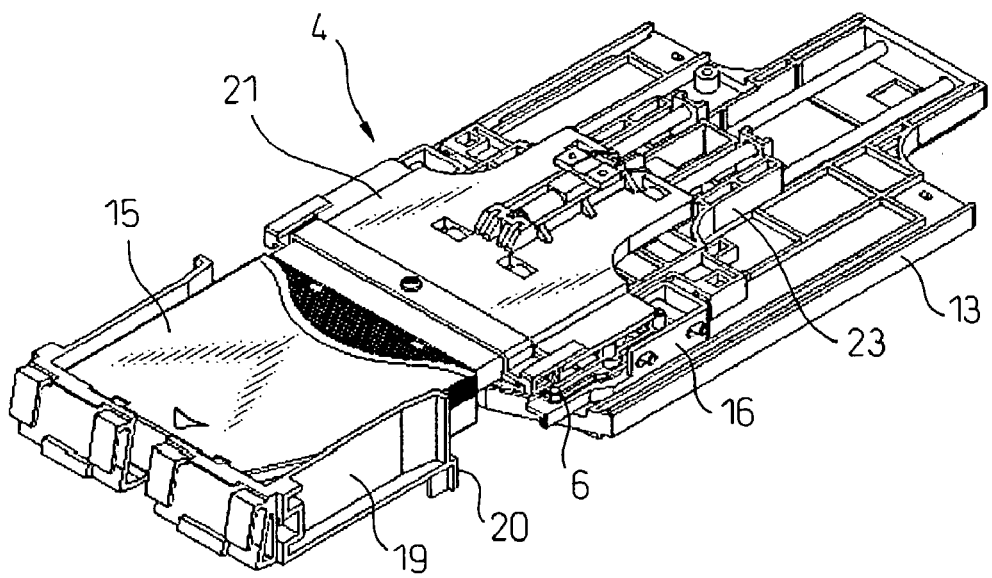
FIG. 34B is a perspective view showing the state in FIG. 34A taken from the same viewpoint as in FIG. 23A.

After that, the cartridge 15 is inserted into the cartridge accommodating rack 19 gradually by being pushed by the mounter 21 to reach a positional relationship as shown in FIG. 34A. Here, it is to be noted that the picker main body 23 as well as the actuators 16 and the hooks 6 are shown in this figure. At this position, the cartridge 15 is inserted into the cartridge accommodating rack 19 completely. As described above, as the mounter 21 goes forward more than the picker main body 23, the tip portions of the actuators 16 do not abut on the actuator abutting surfaces 20 of the cartridge accommodating rack 19. FIG. 34B shows this state from the same viewpoint as in FIG. 22B.

As described above, this embodiment using the mounter 21 can "adapt to various cartridge insertion amounts" because the moving length of the mounter 21 (including the picker main body 23) can be adjustable within the range of the distance from the actuator abutting surfaces 20 of the cartridge accommodating rack 19 to the tip portions of the actuators 16 as can be seen from FIGS. 34A and 34B.

Here, though the cartridge 15 is inserted into the cartridge accommodating rack 19 in this embodiment, the cartridge 15 may be inserted into the recording and reproducing device in a similar manner, and the latter case may also be described with reference to the completely same mechanism only by replacing the actuator abutting surfaces 20 with a surface of the recording and reproducing device. Further, insertion of the magazine 40 into the media access ports 101 may also be described similarly. Thus, so long as the actuators 16 are not in contact with the actuator abutting surfaces 20 (the surface of the recording and reproducing device), even if the insertion amount (thrust length) of the cartridge 15 into the recording and reproducing device differs, the cartridge 15 can be inserted securely.

Hereinabove, a mechanism for inserting the cartridge 15 into the cartridge accommodating rack 19 in which the to and fro movement of the picker 4, the opening and closing movement of the hooks 6 and the operation of the mounter 21 are driven by the motor 1, that is the only driving source, has been described.

Next, operation of the guide 14, the hooks 6 (the pins 7), the mounter 21 and the leaf spring 22 in the retreating movement of the picker 4 (in the returning path) after the insertion of the cartridge 15 into the cartridge accommodating rack 19 is completed, will be described.

Figure 35A:
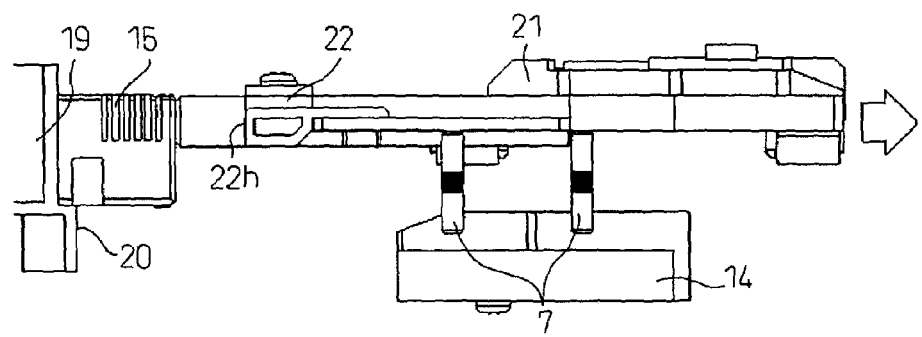
FIG. 35A is a side view taken from the lateral side of the state in FIG. 34A in which the pins of the hooks, the guide, the cartridge and the mounter are extracted.

FIG. 35A is a view showing the state shown in FIG. 34B taken from the right front side. Hereinafter, the operation of the guide 14, the pins 7 for operating the hooks 6, the mounter 21 and the leaf spring 22 shown in FIG. 34A in the "returning path" will be described from this viewpoint.

In the state shown in FIG. 35A in which the mounter 21 has inserted the cartridge 15 into the cartridge accommodating rack 19 completely, as the motor 1 revolves in the direction to make the picker 4 retreat, only the mounter 21 begins to retreat first. Thus, the picker main body 23 does not move till it is pushed by the mounter 21 because only the mounter 21 slides with respect to the picker main body 23 from the state shown in FIG. 32A to the state shown in FIG. 33A as described above.

In this connection, as the hooks 6 are opened completely, the pins 7 are positioned behind the guide members 22A on which the pin abutting surfaces 22h are provided in the leaf spring 22 and just on a path along which the guide members 22A will retreat. Therefore, due to the subsequent retreating movement of the mounter 21, tapered portions 22j formed at the rear side of the guide members 22A make contact with the pins 7 at the front side as shown in FIG. 35B.

On the other hand, as described above, the leaf spring 22 can be elastically deformable in the vertical direction but, here, the leaf spring 22 is not deformed unless a force larger than necessary to deform the leaf spring 22 is applied to the tapered portions 22j. In order to deform the leaf spring 22 so that it is put on the pins 7, a large force must be applied to the tapered portions 22j of the leaf spring 22 such as in the case when the picker main body 23 including the pins 7 is fixed, but at this time, the leaf spring 22 is not deformed because the picker main body 23 is designed so that it can be movable along the slide shafts 11, with a force that is small, to the extent that the leaf spring 22 is not deformed.

Figure 35B:
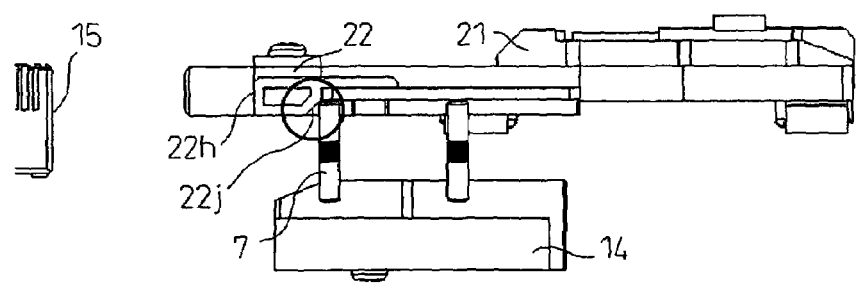
FIG. 35B is a side view showing a state in which only the mounter retreats more than in the state shown in FIG. 35A.

Therefore, in the state as shown in FIG. 35B, the tapered portions 22j of the leaf spring 22 are pushing the pins 7, and consequently, the picker main body 23 is pushed via the tapered portions 22j of the leaf spring 22 provided on the mounter 21 and, starting from the state shown in FIG. 35B, the mounter 21 retreats along with the picker main body 23.

Figure 35C:
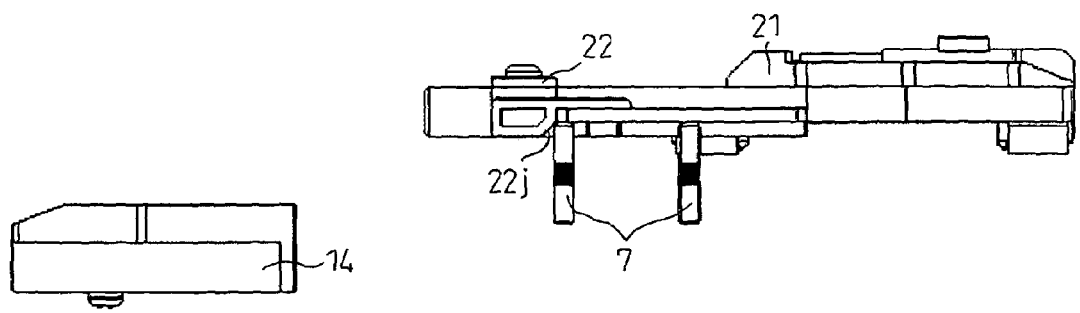
FIG. 35C is a side view showing a state in which the hooks are pushed by the mounter further than in the state shown in FIG. 35B and the picker retreats.

Here, since the state or the positional relationship between the hooks 6 (the pins 7), the actuators 16 and the guide 14 is same as in FIG. 33B, there is no obstacle in the path of the picker main body 23 including the pins 7 and the mounter 21 and the picker main body 23 can retreat smoothly. As the mounter 21 retreats further, these elements are disposed in a relationship as shown in FIG. 35C. In this state, the picker main body 23 has retreated completely (to the waiting state) and the positional relationship between the mounter 21 and the picker main body 23 remains unchanged.

Figure 36A:
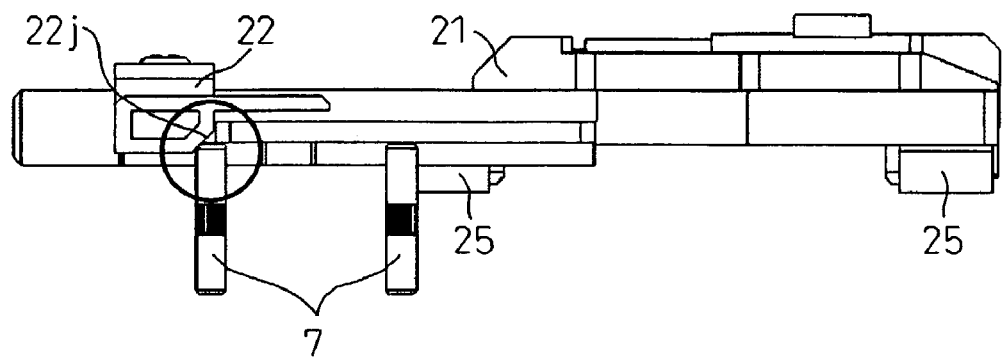
FIG. 36A is a side view showing a state in which the picker cannot retreat but the mounter further retreats.
Figure 36B:
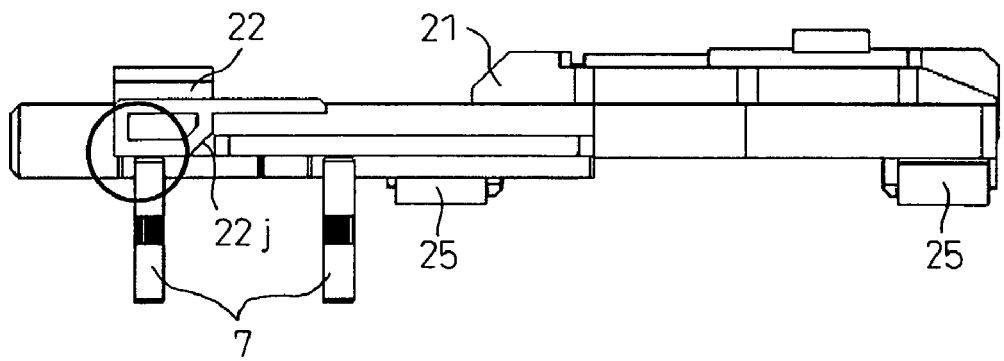
FIG. 36B is a side view showing a state in which the mounter further retreats while deforming a leaf spring elastically.

As the motor 1 further revolves in the direction to make the picker 4 retreat and the driving force of the motor 1 is further transferred to the mounter 21, these elements are disposed in a relationship as shown in FIG. 36A. In this state, as the picker main body 23 cannot retreat further as if it were fixed, only the mounter 21 continues to retreat, and a sufficient force is applied to the tapered portions 22j on the guide members 22A of the leaf spring 22 so that the leaf spring 22 is put on the pins 7. As a consequence, the leaf spring 22 is elastically deformed, and the tapered portions 22j on the guide members 22A are deformed by being pushed by the pins 7 and are moved upward to move to a state shown in FIG. 36B. The mounter 21 retreats straight while pushing the guide members 22A down.

Figure 36C:
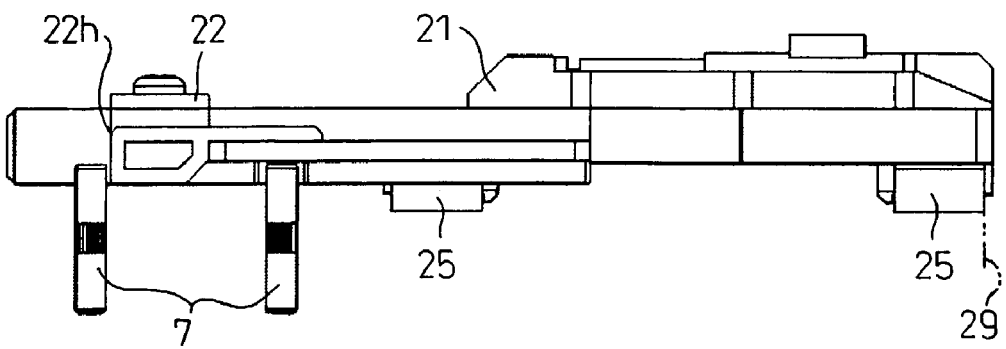
FIG. 36C is a side view showing a state in which the mounter abuts on an inner wall at the rear side of the picker main body to stop the movement.

As the mounter 21 continues to retreat in the state in which the guide members 22A of the leaf spring 22 are put on the pins 7, at the time when the pins 7 pass through the guide members 22A, the leaf spring 22 is restored to the initial state shown in FIG. 36C by its own elastic force. On the other hand, at the same time when the leaf spring 22 is restored to the initial state, the rear surfaces of the backward coupling portions 25 on the mounter 21 collide with the inner wall 29 (at the rear side) of the picker main body 23 and the retreating movement of the mounter 21 is ended. In this state shown in FIG. 36C, the rear end face of the mounter 21 coincide with the position of the rear end face of the picker main body 23, or in other words, the retreating movement of the mounter 21 is concluded, and thus this is entirely the same state as the one before the picker 4 initiates all movement that is shown in FIG. 16.

As described above, by using the mechanism that is adopted into the picker 4 according to the present invention, the to and fro movement of the picker 4, the opening and closing movement of the hooks 6 and the operation of the mounter 21 can be driven by one driving source (the motor 1). Also, as the opening and closing movement of the hooks 6 is configured as linear movement, each of three types of magnetic tape cartridges including the ½ inch cartridge, the LTO cartridge and the DLT16/S-DLT cartridge that have different width dimensions can be grasped by the hooks 6. Further, by providing the mounter 21 that can be moved on the main body 23 of the picker 4, even when the insertion amount of the cartridge 15 into the cartridge accommodating rack 19 or the recording and reproducing device 50 differs, the cartridge 15 can be inserted securely.

(4) [Construction of the Accommodating Rack in Which Protruding Lengths of the Cartridges are Aligned]

Figure 37A:
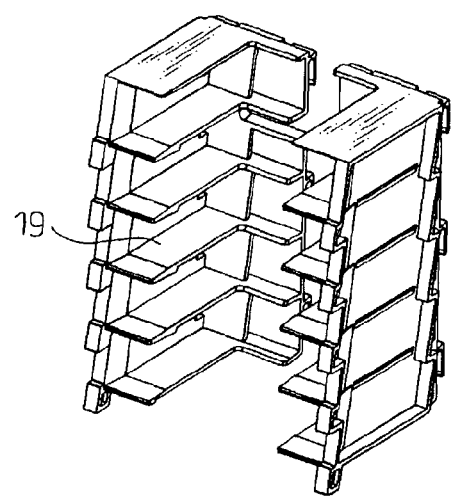
FIG. 37A is a perspective view showing a configuration of conventional cartridge accommodating racks.
Figure 37B:
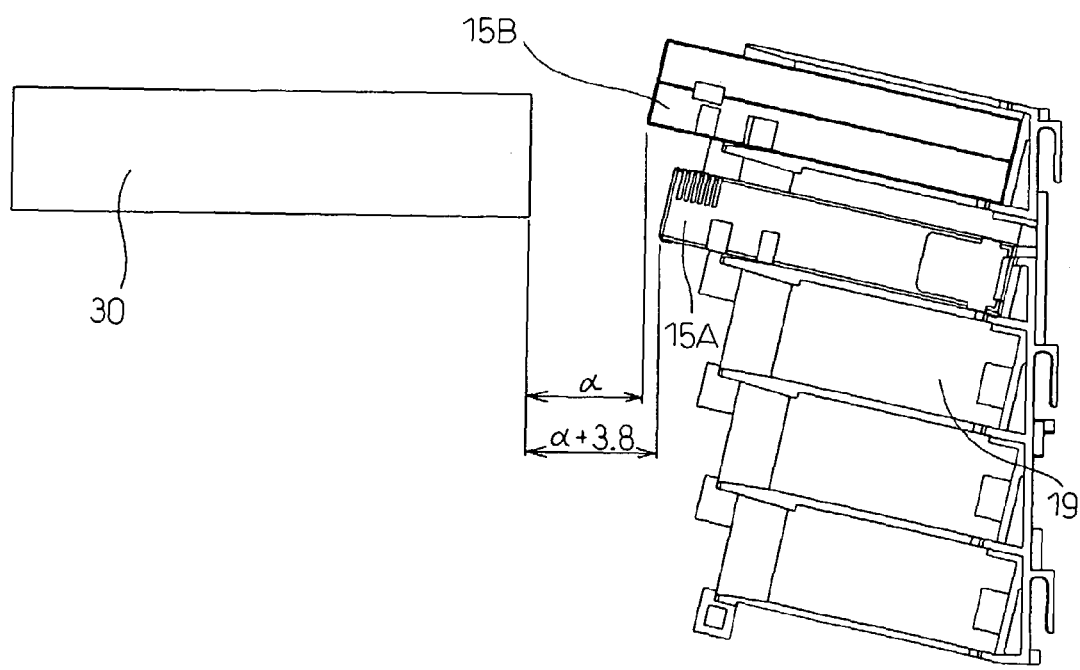
FIG. 37B is a side view showing a state in which various types of cartridges are accommodated in the cartridge accommodating racks shown in FIG. 37A.

FIG. 37A shows a configuration of the cartridge accommodating racks 19. As shown in FIG. 37B, each of the cartridge accommodating racks 19 is configured to have such dimensions that either the LTO medium 15A or the DLT medium 15B can be inserted. However, as described with reference to FIGS. 3 and 4, the LTO medium 15A and the DLT medium 15B have different lengths, and more specifically, the length of the DLT medium 15B is 3.8 mm larger. Therefore, when the both media are inserted into vertically adjoining racks 19, difference of 3.8 mm in the distance to the robot hand 30 is created.

Because of this difference, when the LTO cartridge and the DLT16/S-DLT cartridge are accommodated in the cartridge accommodating racks 19, as the distance between the indentations 41 provided on each cartridge and the tip of the robot hand in the home position differs depending upon the type of the cartridges, control for positioning the robot hand may be complicated, errors may be increased when the cartridge is withdrawn, or there may also be a problem when the robot hand 30 reads the bar code attached to the cartridge.

In this connection, the DLT medium 15B shown in FIG. 4 is provided with a cover structure that can be opened and closed by means of a hinge 43. When the cartridge 15 is inserted into the recording and reproducing device 50 shown in FIG. 2, this cover 42 is opened by the recording and reproducing device 50 and the tape is withdrawn from the cartridge 15B. For such a purpose, this cover structure part has a unique shape so that the cover 42 can be opened by the recording and reproducing device 50 easily, wherein a triangular prism like indentation 41B having a height substantially equal to the one of the cartridge 15B is provided in the vicinity of the hinge 43 of the cover structure.

On the other hand, the LTO medium 15A shown in FIG. 3 is also provided with a triangular prism like indentation 41A, which differs from the case of the DLT medium 15B in that the height of the indentation 41A is about one-half of the one on the cartridge 15A. Here, it is to be noted that the indentations 41A and 41B are disposed at the same position in the longitudinal direction of the front side of each cartridge.

Figure 38A:
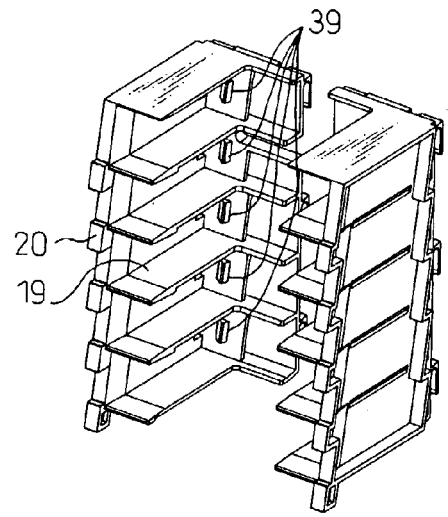
FIG. 38A is a perspective view showing a configuration of the cartridge accommodating racks used for the library apparatus according to the present invention.

Under the circumstances, according to the present invention, so as to utilize the difference of the shape between these indentations 41A and 41B, a projection 39 is provided on the bottom surface of each cartridge accommodating rack 19 as shown in FIG. 38A. The projection 39 is positioned and configured so that when either the LTO medium 15A or the DLT medium 15B is inserted into the cartridge accommodating rack 19, it fits snugly in the indentation 41B of the DLT medium 15B but does not fit in the indentation 41A of the LTO medium 15A at all. Further, the height of the projection 39 is defined to be 3.8 mm, which corresponds to the difference of the length between the LTO medium 15A and the DLT medium 15B.

Figure 38B:
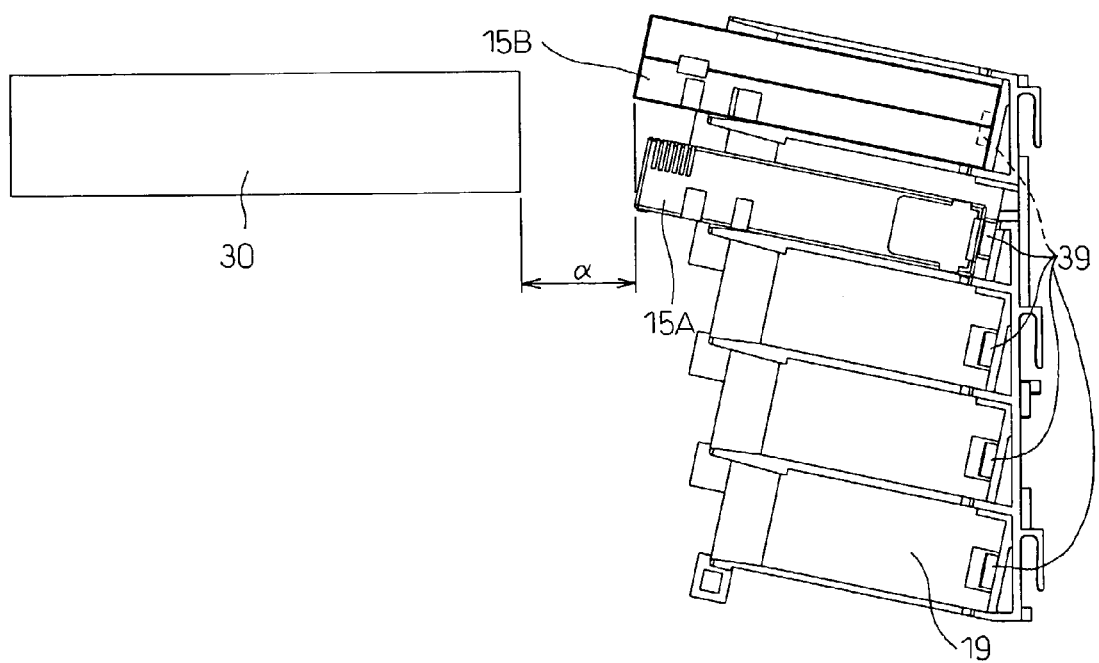
FIG. 38B is a side view showing a state in which various types of cartridges are accommodated in the cartridge accommodating racks according to the present invention.

As a result, as shown in FIG. 38B, when the DLT medium 15B is inserted into the cartridge accommodating rack 19, this projection 39 fits in the indentation 41B of the DLT medium 15B so as to define the distance α between the robot hand 30 and the rear end portion of the DLT medium 15B. On the other hand, when the LTO medium 15A is inserted into the cartridge accommodating rack 19, since this projection 39 does not fit in the indentation 41A of the LTO medium 15A, the LTO medium 15A is away from the bottom of the cartridge accommodating rack 19 by 3.8 mm. Consequently, the distance between the robot hand 30 and the LTO medium 15A can also be defined to be α so that the LTO medium 15A and the DLT medium 15B have the same positional relationship with the robot hand 30.

As a result, regardless of whether the LTO cartridge or the DLT16/S-DLT cartridge is inserted into the cartridge accommodating rack 19, the distance between the indentation 41 provided on each cartridge and the tip of the robot hand in the home position is always constant, and therefore the control for positioning the robot hand can be simplified and the errors can be reduced when the cartridge is withdrawn. Further, the simplification of the control may result in increase of processing speed of the library apparatus. Still further, as the reading distance of the optical non-contact bar code reader attached to the robot hand can be made constant, defocus of the optical system in the bar code reader will never occur and reliable reading can be ensured.

In the above example, though the projection 39 that reflects the difference of the shape between the indentations 41A and 41B of the LTO medium 15A and the DLT medium 15B, respectively, is provided on the bottom surface of each cartridge accommodating rack 19 so as to equalize the protruding length of both media from each cartridge accommodating rack 19, it goes without saying that this technique for aligning the protruding lengths of the different media cartridges by providing the projection that reflects the difference of the shape between the different media cartridges can be applied to cartridges of other types.

Further, though the construction of the robot hand for transferring the cartridges containing magnetic tapes has been described in the above embodiments, it is to be noted that the recording media contained in the cartridges are not limited to any specific type.

What is claimed is:

1. A robot hand for transferring an article, from a rack accommodating the article to be transferred, to another position, comprising:
   a housing consisting of a base, a side wall, and a ceiling plate;
   a hand mechanism configured to be slidable in to and fro directions in internal space of said housing;
   a pair of hooks provided on said hand mechanism that is able to perform opening and closing movement in a direction perpendicular to the movement of the hand mechanism and grasp the article in a closed state;
   a pair of left and right guides provided on said base for allowing the opening and closing movement of said hooks when said hand mechanism is moved; and
   only one driving source for allowing the to and fro movement of said hand mechanism and the opening and closing movement of the hooks,
   wherein said hand mechanism comprises second shafts in a direction orthogonal to two first shafts provided on said base, and each of said pair of hooks is provided in a protruding manner on two frames that can be moved along the second shafts.

2. A robot hand according to claim 1, wherein said two frames are interconnected by springs in a state in which said two frames are urged in a direction to approach each other and, at the same time, are stopped at the positions where said hooks typically grasp the article, by stoppers that are typically provided at their specified positions.

3. A robot hand according to claim 2, wherein each of said two frames is implanted with at least one respective pin, which allows opening and closing movement of said hooks by engaging with said guides when said hand mechanism performs the to and fro movement.

4. A robot hand according to claim 3, wherein each of said guides comprises:
   a tapered portion for moving each of said hooks to the opening direction by engaging with each of said pins when said hand mechanism advances;
   a straight portion that continues to the tapered portion;
   and an inclined portion for allowing each of said pins to be put on each of a plurality of top surfaces of the guide when said hand mechanism retreats, and
   when said hand mechanism advances, said hooks are closed to grasp the article at the time when said pins pass through said straight portions of said guides.

5. A robot hand according to claim 4, wherein said hand mechanism further comprises:
   actuator plates that are engaged with said pins and said second shafts and, at the same time, urged by springs in the advancing direction of said hand mechanism, front end portions of which are positioned more forward than front end portions of said hooks, and
   wherein the actuator plates are configured to prevent said hooks from being closed after said hand mechanism advances so that said pins pass through said straight portions of said guides and to close said hooks to grasp the article after said hand mechanism further advances and the front end portions of said actuator plates abut on portions of said rack.

6. A robot hand according to claim 5, wherein
said hand mechanism is configured so that, due to an effect of said actuator plates, when said hand mechanism performs two round-trip to and fro slide movements, the hooks are certainly in an opened state.

7. A robot hand according to claim 1, wherein:
said hand mechanism further comprises a mounter for pushing the article when the article is inserted into said recording and reproducing device or said rack, and
the mounter is configured to be moved on third shafts provided in the same direction as two first shafts that are laid on a base of a main body of said hand mechanism, and connected to a driving belt that transfers driving force of said driving source at coupling portion.

8. A robot hand according to claim 7, wherein
a pair of guide members is provided on both sides in the neighborhood of a front portion of said mounter, wherein each of the guide members is attached to both ends of a leaf spring secured to said mounter at its central part,
said front portions of the guide members are provided at positions to abut pins in a state in which said hooks are opened,
said mounter further comprises abutting surfaces which are flush with said front portions and abut said pins in a state in which said hooks are closed;
grooves for allowing said pins to pass through are provided between said front portions and said abutting surfaces,
when the article is grasped by said hooks, the main body of said hand mechanism is moved by said front portions, and when the article grasped by said hooks is inserted into said rack or said recording and reproducing device, the main body of said hand mechanism is moved by said abutting surfaces, and then, at the time when said pins are engaged with the tapered portions of said guides and said hooks release the grasp of the article, by allowing said pins to pass through said grooves, advancing movement of the main body of said hand mechanism is suspended, and then, by allowing said mounter to go more forward than said main body, the article is inserted into said rack or said recording and reproducing device by the mounter.

9. A library apparatus, comprising:

a recording and reproducing device for recording and reproducing data on cartridges containing recording media therein;

a plurality of racks that can accommodate the cartridges; and a robot hand for a cartridge from a rack accommodating the article to be transferred to other position, the robot hand comprising:

a housing consisting of a base, a side wall, and a ceiling plate;

a hand mechanism configured to be slidable in to and fro directions in internal space of said housing;

a pair of hooks provided on said hand mechanism that is able to perform opening and closing movement in a direction perpendicular to the movement of the hand mechanism and grasp the cartridge in a closed state;

a pair of left and right guides provided on said base for allowing the opening and closing movement of said hooks when said hand mechanism is moved; and only one driving source for allowing the to and fro movement of said hand mechanism and the opening and closing movement of the hooks, wherein said hand mechanism comprises second shafts in a direction orthogonal to said first shafts, and each of said pair of hooks is provided in a protruding manner on two frames that can be movable along the second shafts.

10. A library apparatus according to claim 9, wherein said two frames are interconnected by springs in a state in which said two frames are urged to a direction to approach each other and, at the same time, are stopped at the positions where said hooks grasp said cartridge, by stoppers that are provided at their specified positions.

* * * * *

UNITED STATES PATENT AND TRADEMARK OFFICE
CERTIFICATE OF CORRECTION

PATENT NO. : 7,016,144 B2 Page 1 of 1
APPLICATION NO. : 10/375849
DATED : March 21, 2006
INVENTOR(S) : Kengo Yamakawa It is certified that error appears in the above-identified patent and that said Letters Patent is hereby corrected as shown below:

Title page, item [54] and Column 1, line 4,
Title, delete "AND ARTICLE STORED IN A RACK" and insert -- AN ARTICLE STORED IN A RACK --.

Signed and Sealed this

Twentieth Day of June, 2006

JON W. DUDAS
*Director of the United States Patent and Trademark Office*